United States Patent [19]

Hamilton, Jr. et al.

[11] Patent Number: 5,297,217

[45] Date of Patent: * Mar. 22, 1994

[54] TILE-ORIENTED TECHNIQUE FOR COLLECTIVELY PERFORMING IMAGE ROTATION SCALING AND DIGITAL HALFTONE SCREENING

[75] Inventors: John F. Hamilton, Jr., Rochester; Anthony J. Leone, III, Pittsford, both of N.Y.

[73] Assignee: Eastman Kodak Company, Rochester, N.Y.

[*] Notice: The portion of the term of this patent subsequent to Apr. 20, 2000 has been disclaimed.

[21] Appl. No.: 934,090

[22] Filed: Aug. 21, 1992

Related U.S. Application Data

[63] Continuation of Ser. No. 741,877, Aug. 6, 1991, Pat. No. 5,204,916.

[51] Int. Cl.$^5$ .............................................. G06K 9/36
[52] U.S. Cl. ...................................... 382/41; 382/46; 382/47; 358/456
[58] Field of Search ........................... 382/41, 46, 47; 358/451, 456, 458, 460, 298; 395/132, 137, 139

[56] References Cited

U.S. PATENT DOCUMENTS

| | | | |
|---|---|---|---|
| 4,556,918 | 12/1985 | Yamazaki et al. | 358/298 |
| 4,790,025 | 12/1988 | Inoue et al. | 382/41 |
| 4,975,977 | 12/1990 | Kurosu et al. | 382/46 |
| 4,985,779 | 1/1991 | Gall | 358/456 |
| 5,166,809 | 11/1992 | Surbrook | 358/456 |
| 5,204,916 | 4/1993 | Hamilton, Jr. et al. | 382/41 |

Primary Examiner—Joseph Mancuso
Assistant Examiner—Steven P. Klocinski
Attorney, Agent, or Firm—Robert L. Randall

[57] ABSTRACT

A tile-oriented technique and associated apparatus for manipulating a continuous tone (contone) image through image rotation, anamorphic scaling and digital halftone screening for use in illustratively implementing a page description language. Specifically, an incoming contone image is first partitioned into aligned non-abutting tiles (e.g. $215_1, 215_2, \ldots, 215_9$). Overlapping blocks (e.g. $217_1, 217_2, \ldots, 217_9$) are then defined which will hold output data for corresponding tiles. Two dimensional sampling increments, in fast and slow scan directions, are defined to relate movement between successive pixels in an output block to movement between corresponding pixels in the contone image. Similar, though independent, sampling increments, also in the fast and slow scan directions and based in part upon screen angle and screen ruling, are defined for movement between successive pixels in a halftone reference cell. To generate output data for each successive pixel location in a block, incremental sampling occurs in the contone image to yield a corresponding sampled contone value. This value, in conjunction with incremental halftone sampling addresses, then defines a sampling location that is read in a halftone reference plane (e.g. $242_{181}$), the resulting output of which is single bit halftone data that defines a writing spot. Each tile in the contone image is successively processed, using two nested loops (1950, 1960), with resulting output data for that tile being written into appropriate pixel locations in a corresponding block in the output image.

22 Claims, 33 Drawing Sheets

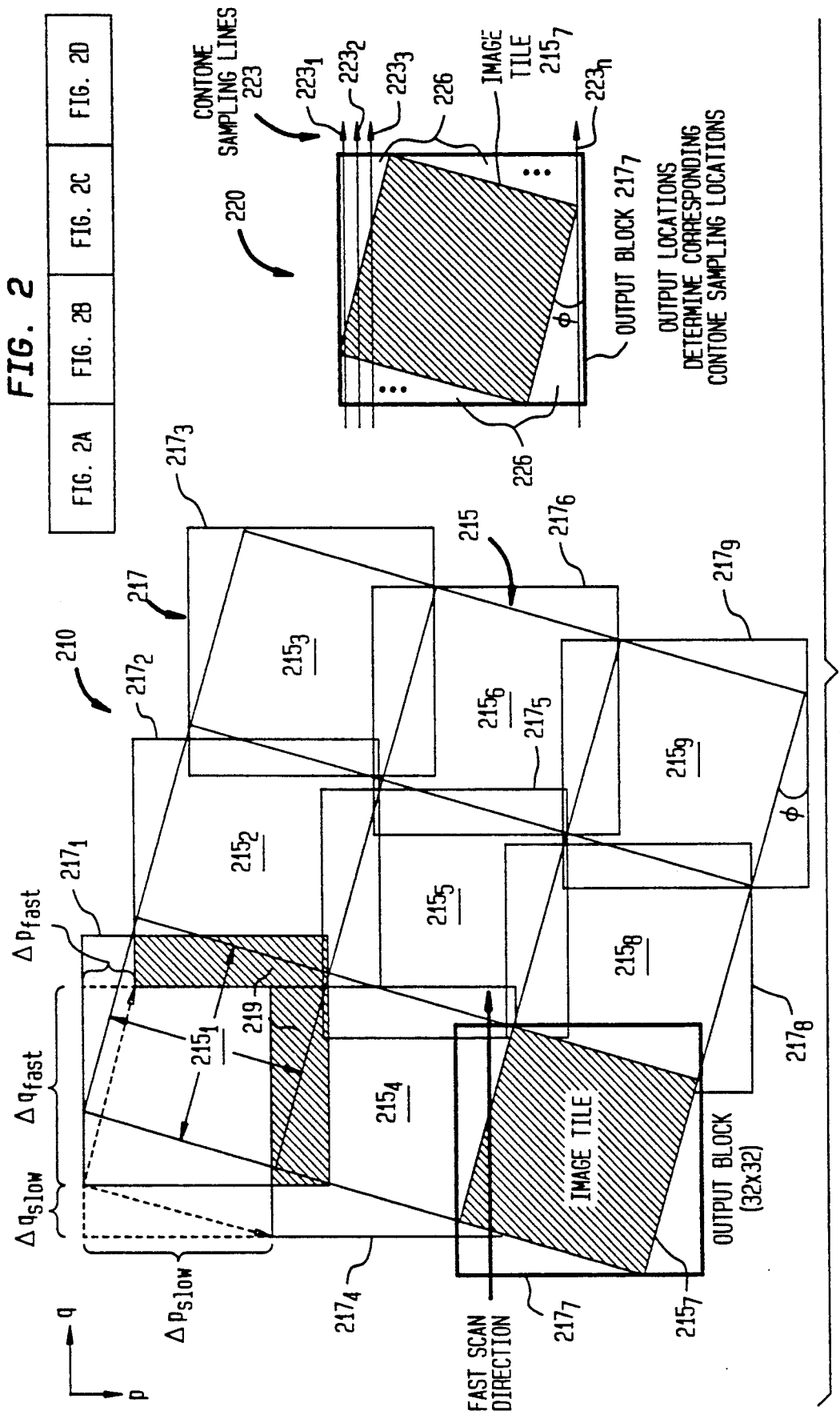

FIG. 7

| FIG. 7A | FIG. 7B |

OUTPUT BUFFER & MEMORY MANAGEMENT UNIT

PAGE RAM 768
768 A RAM
768 B RAM

OUTPUT BUFFERS

766 DATA
761
762 ADDRESS GENERATOR
763 BLOCK ADDR
767
MEMORY CONTROLLER
769 ADDR

772 OUTPUT DATA
TO MARKING ENGINE

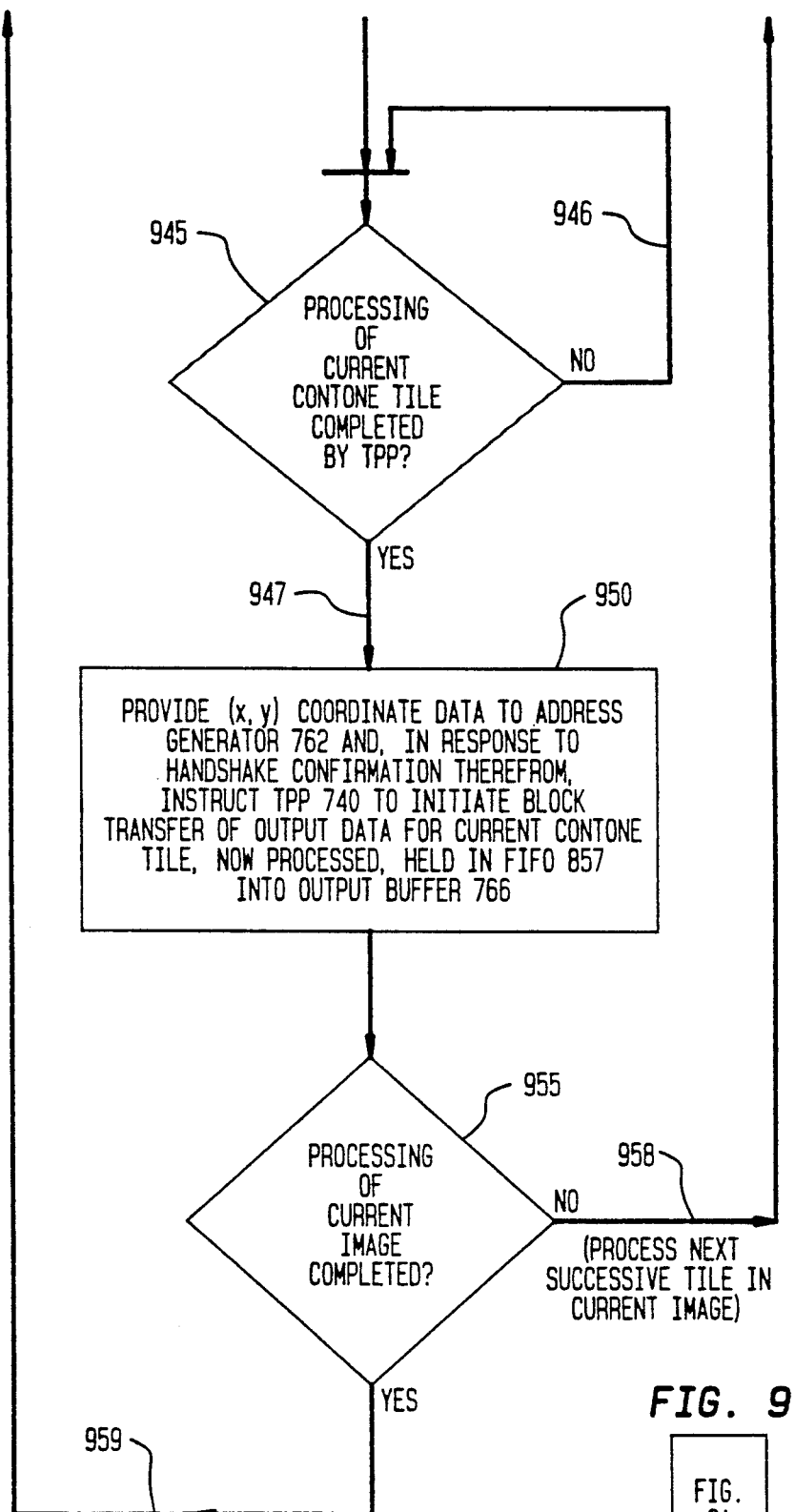

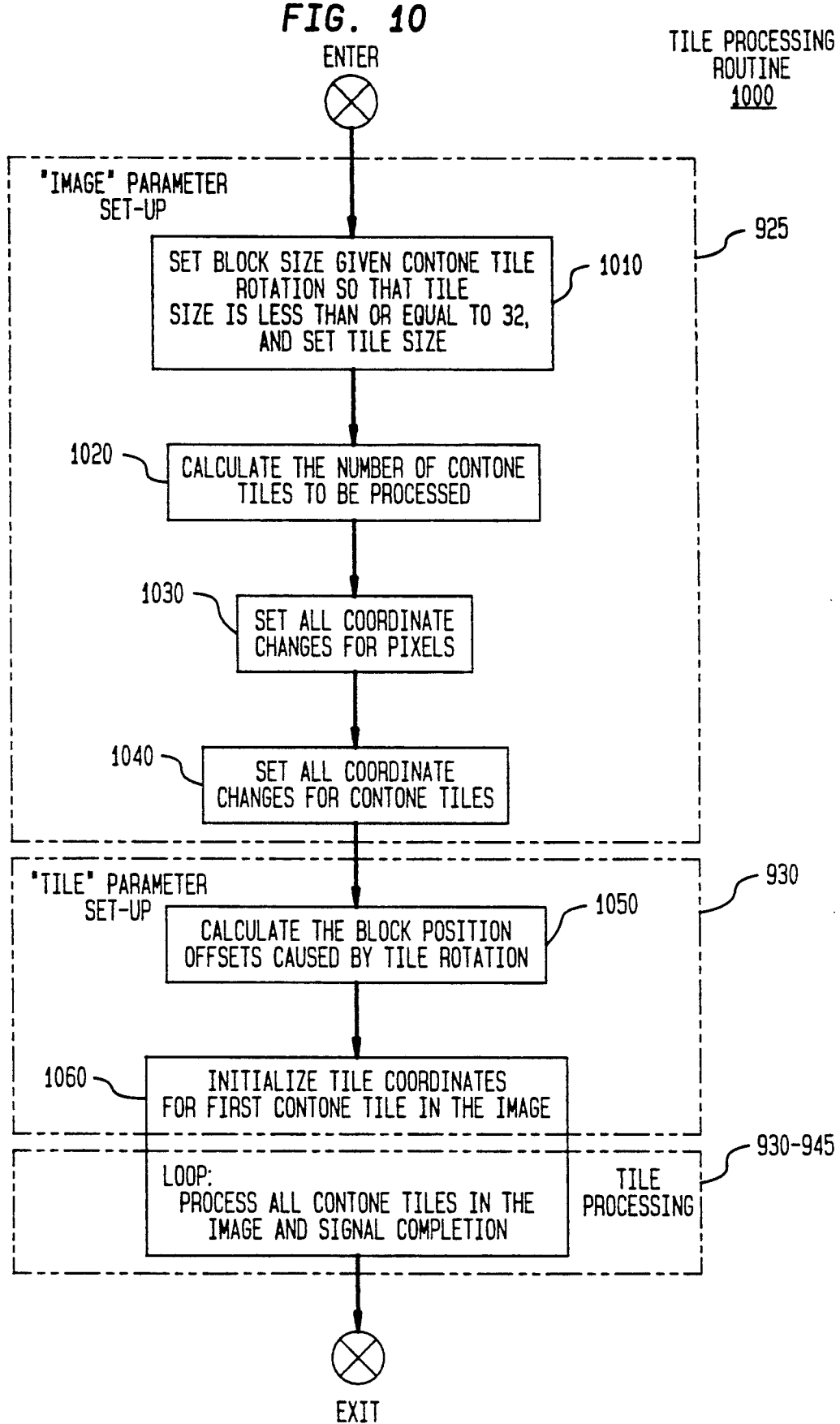

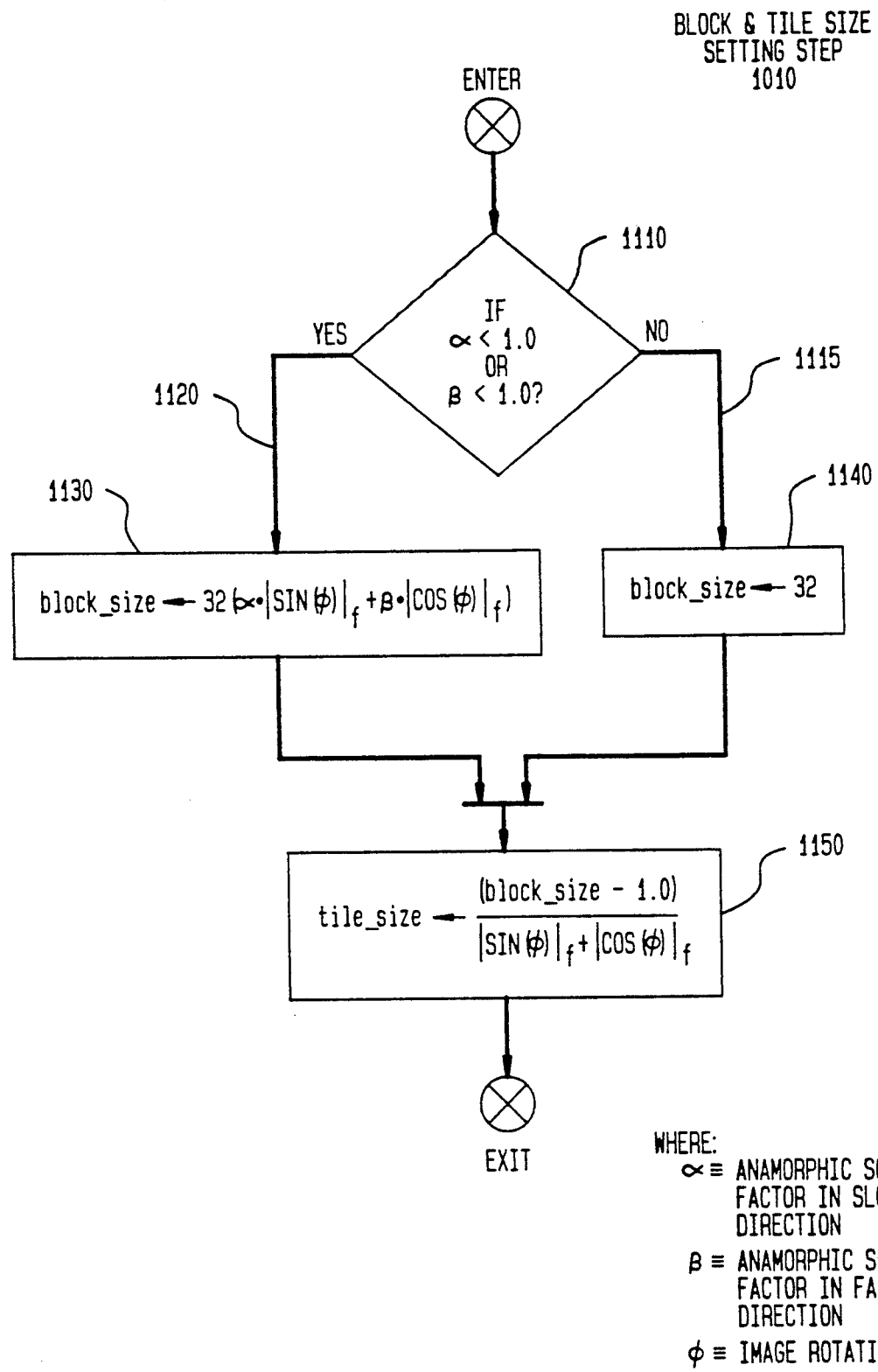

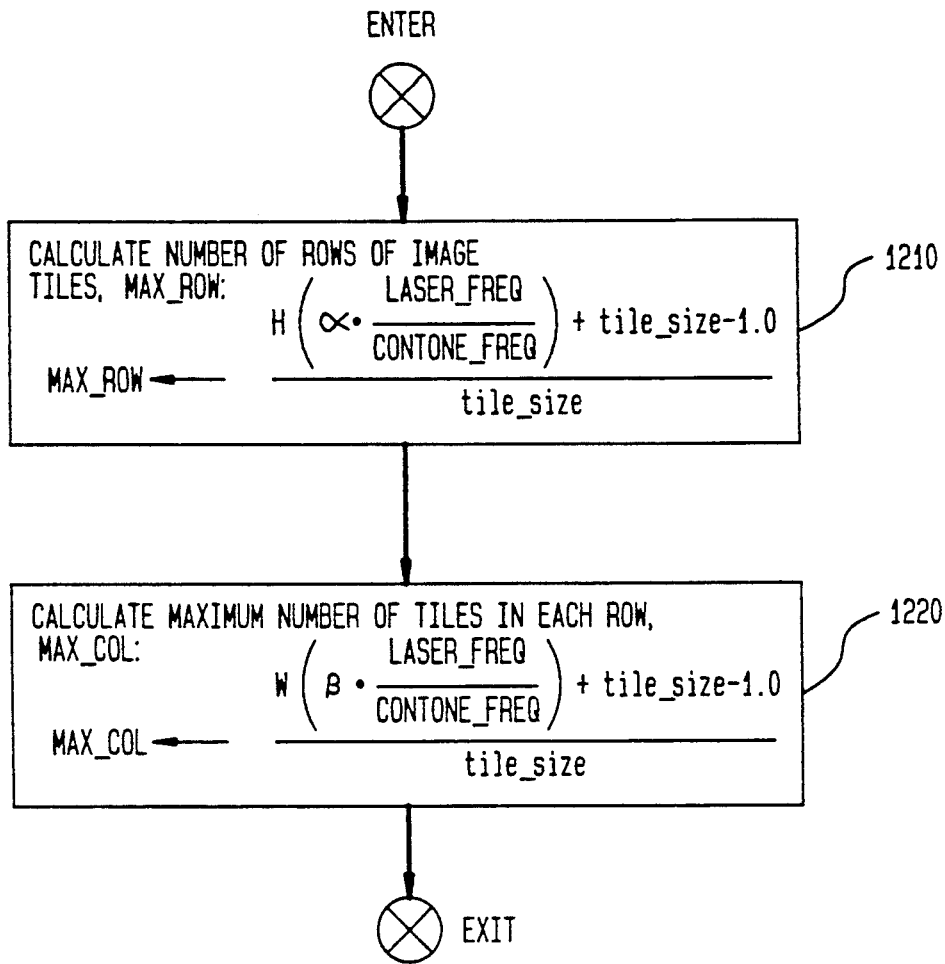

SET PIXEL COORDINATE CHANGES STEP 1030

SET TILE COORDINATE CHANGES STEP 1040

TILE ROTATION INDUCED BLOCK POSITION OFFSETS

WHERE:
$tempc = 2^{16} \cdot TILE\_SIZE \cdot COS(\phi)$
$temps = 2^{16} \cdot TILE\_SIZE \cdot SIN(\phi)$

BLOCK POSITION OFFSET CALCULATION STEP 1050

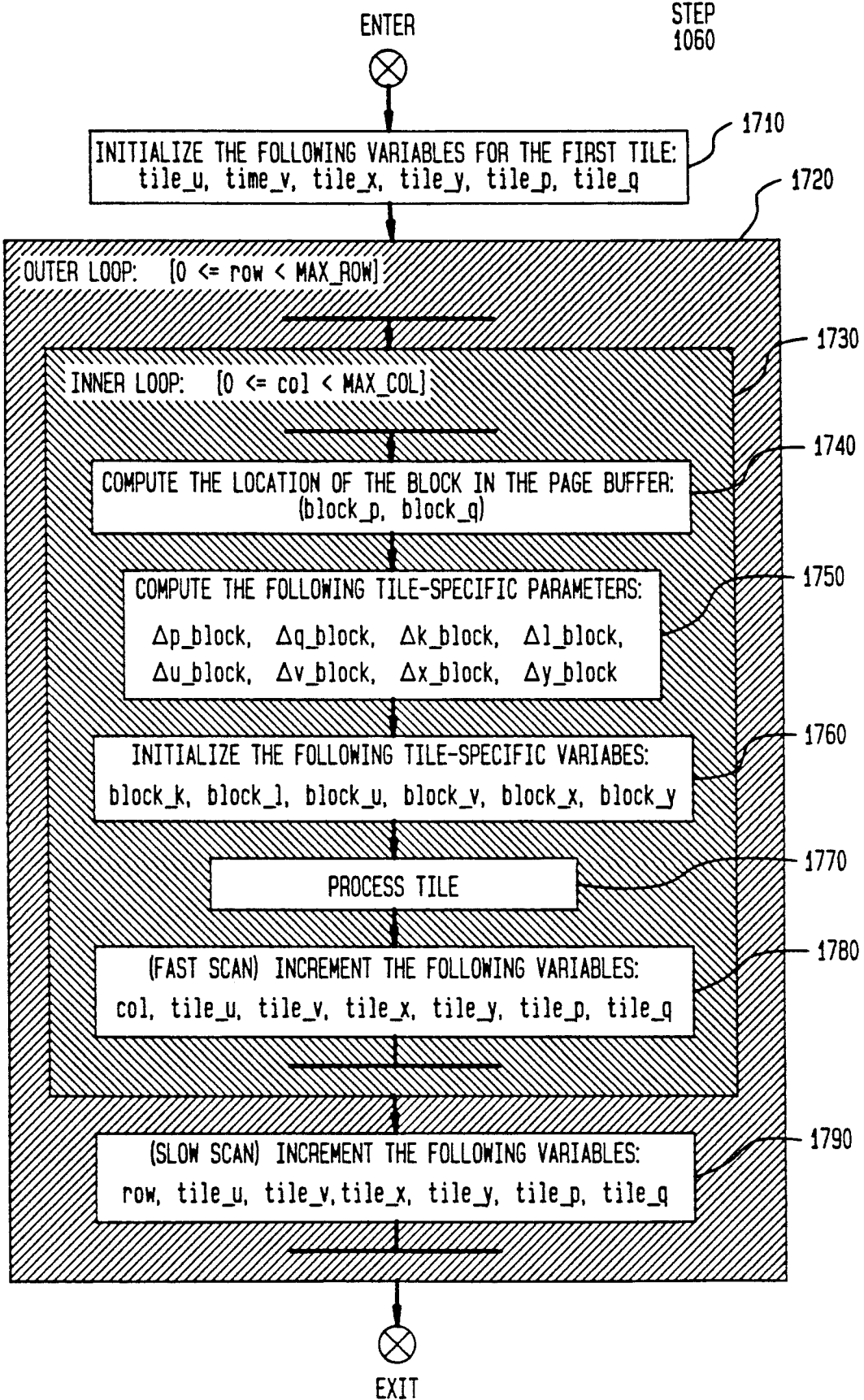

TILE PROCESSING
STEP 1060
(DETAILED)

| FIG. 18A |
| FIG. 18B |

PROCESS TILE ROUTINE 1770 (DETAILED)

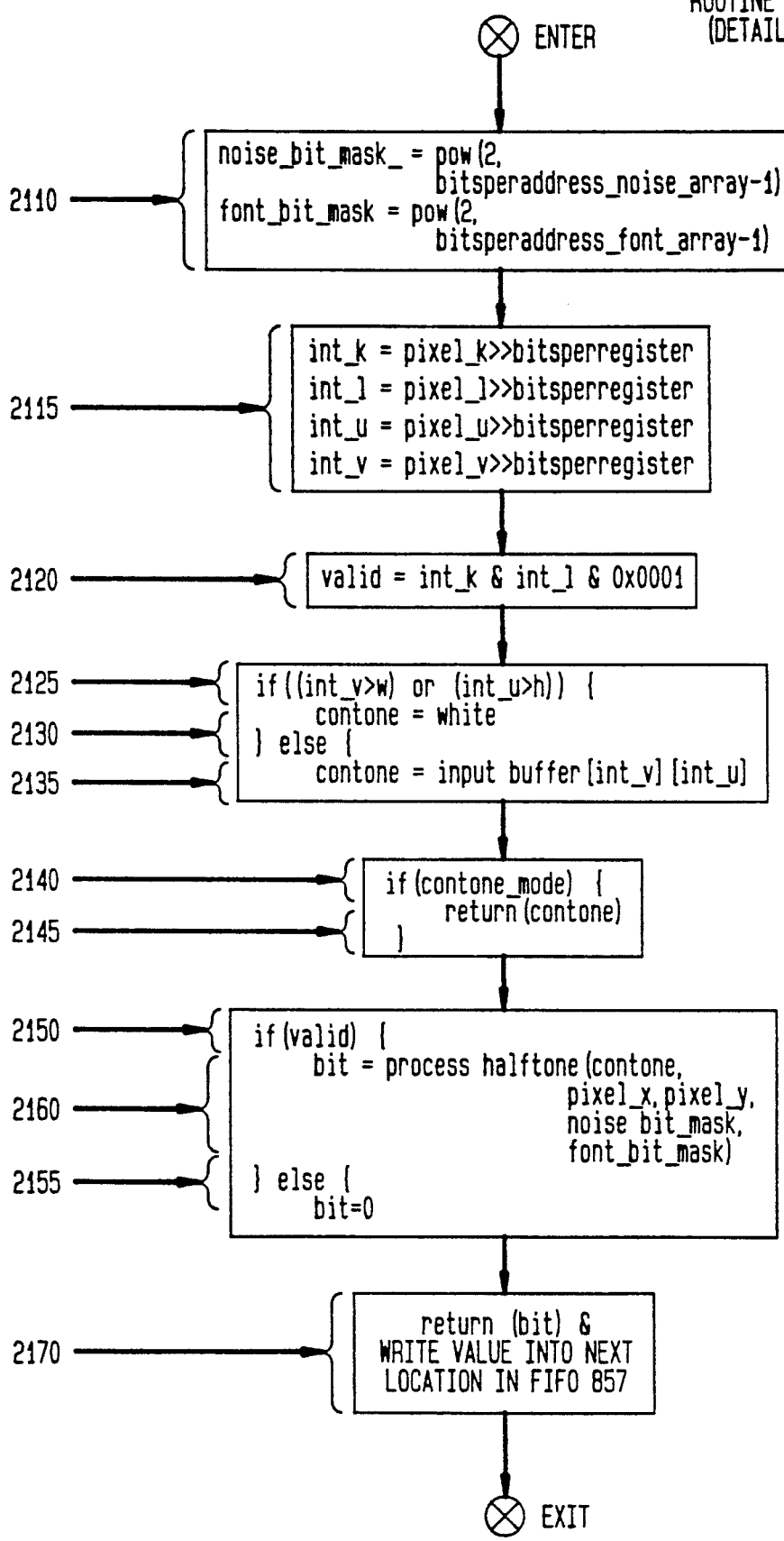

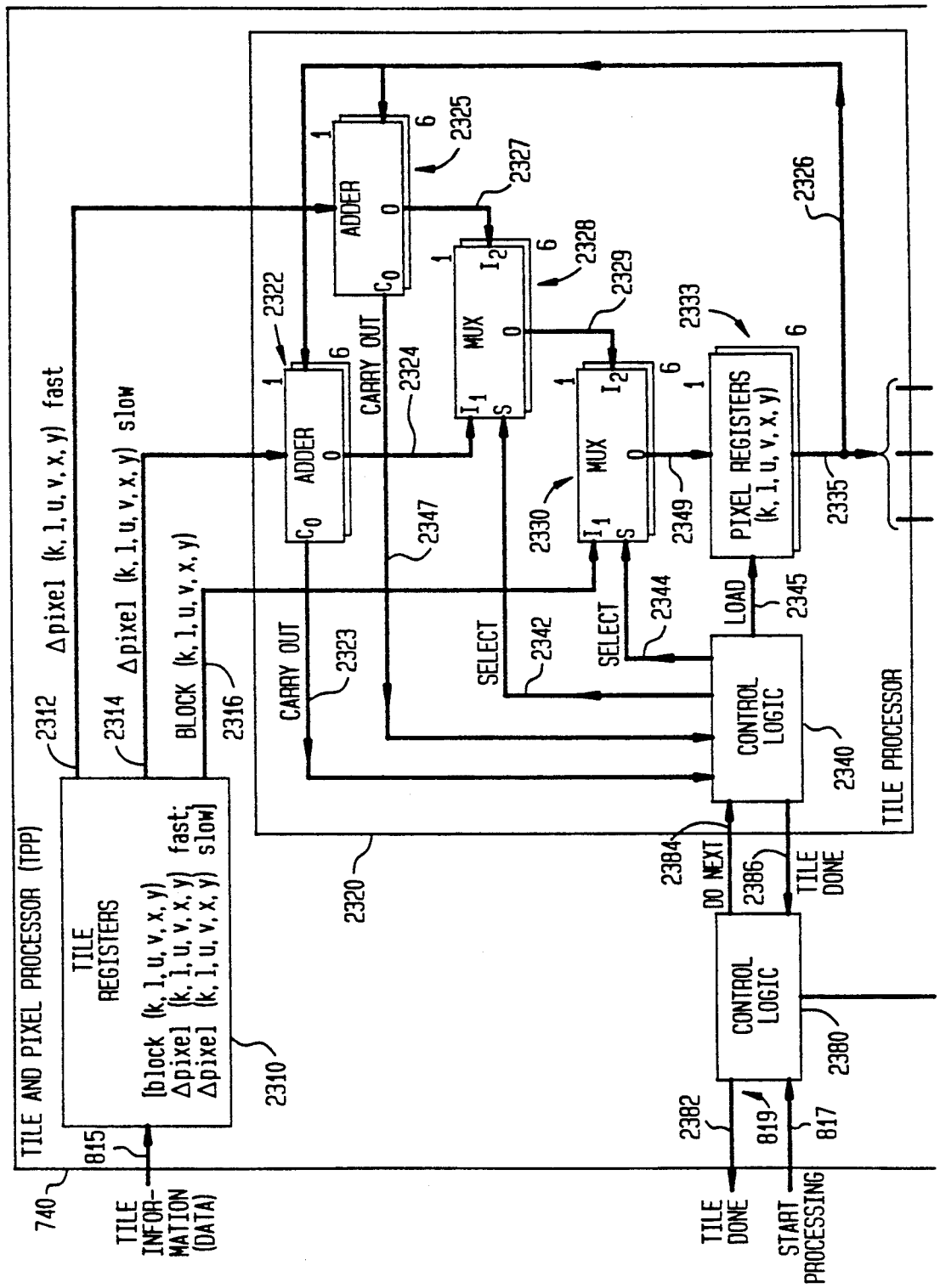

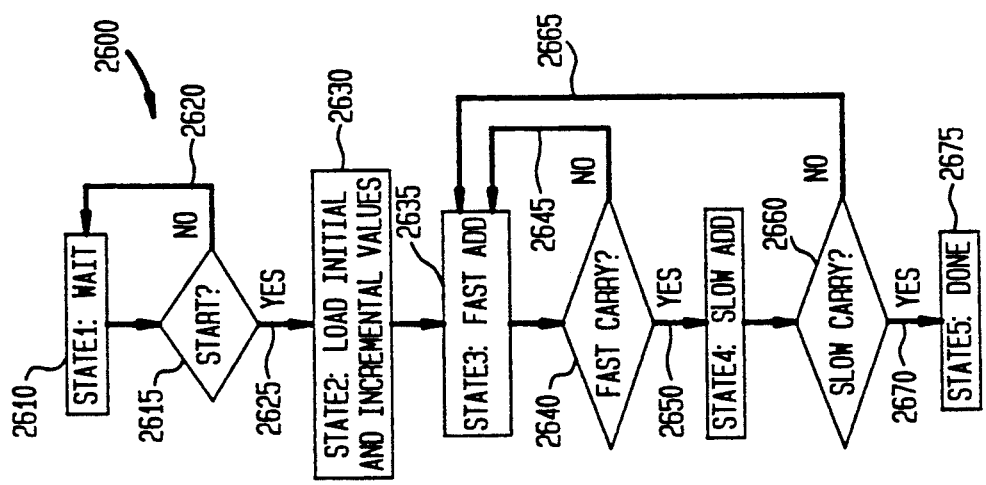
FIG. 26
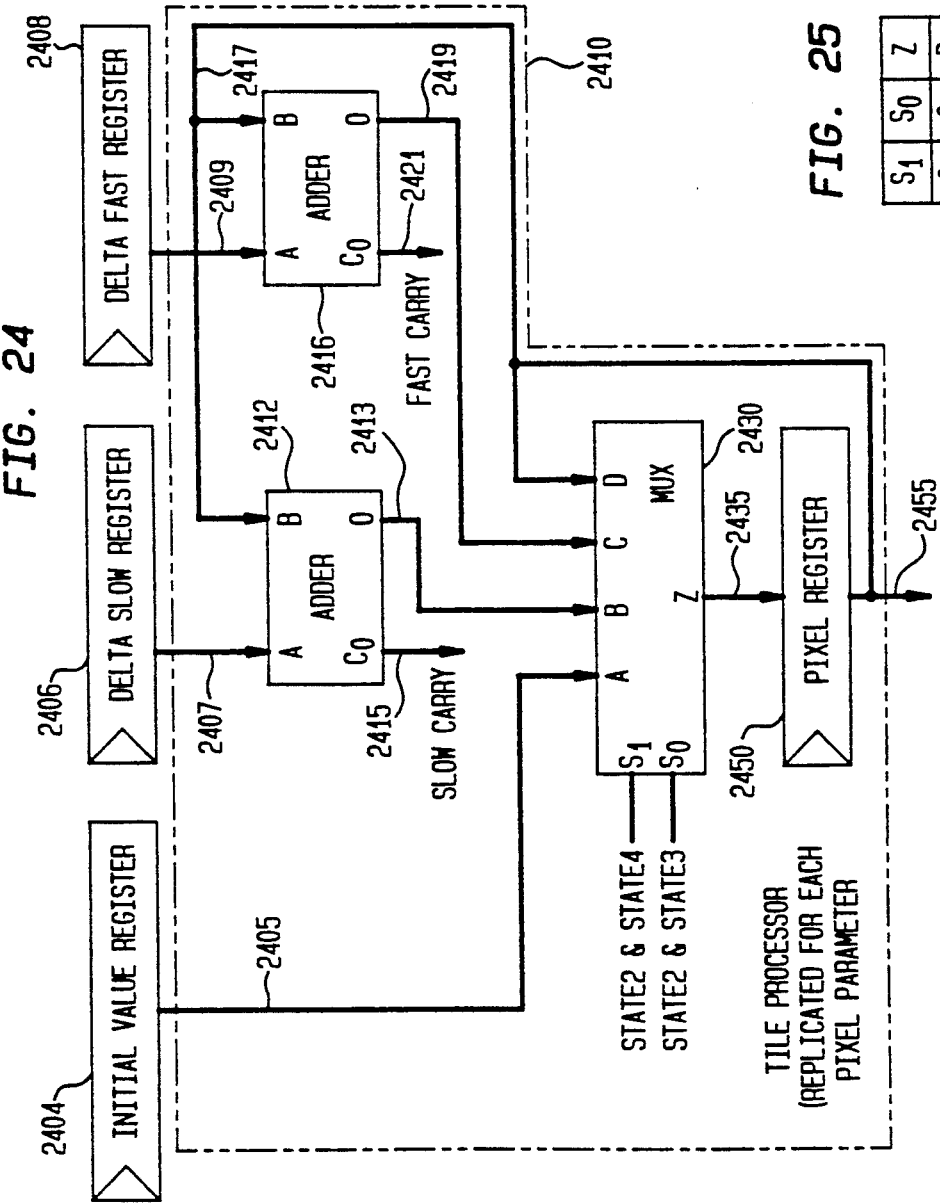
FIG. 24
FIG. 25

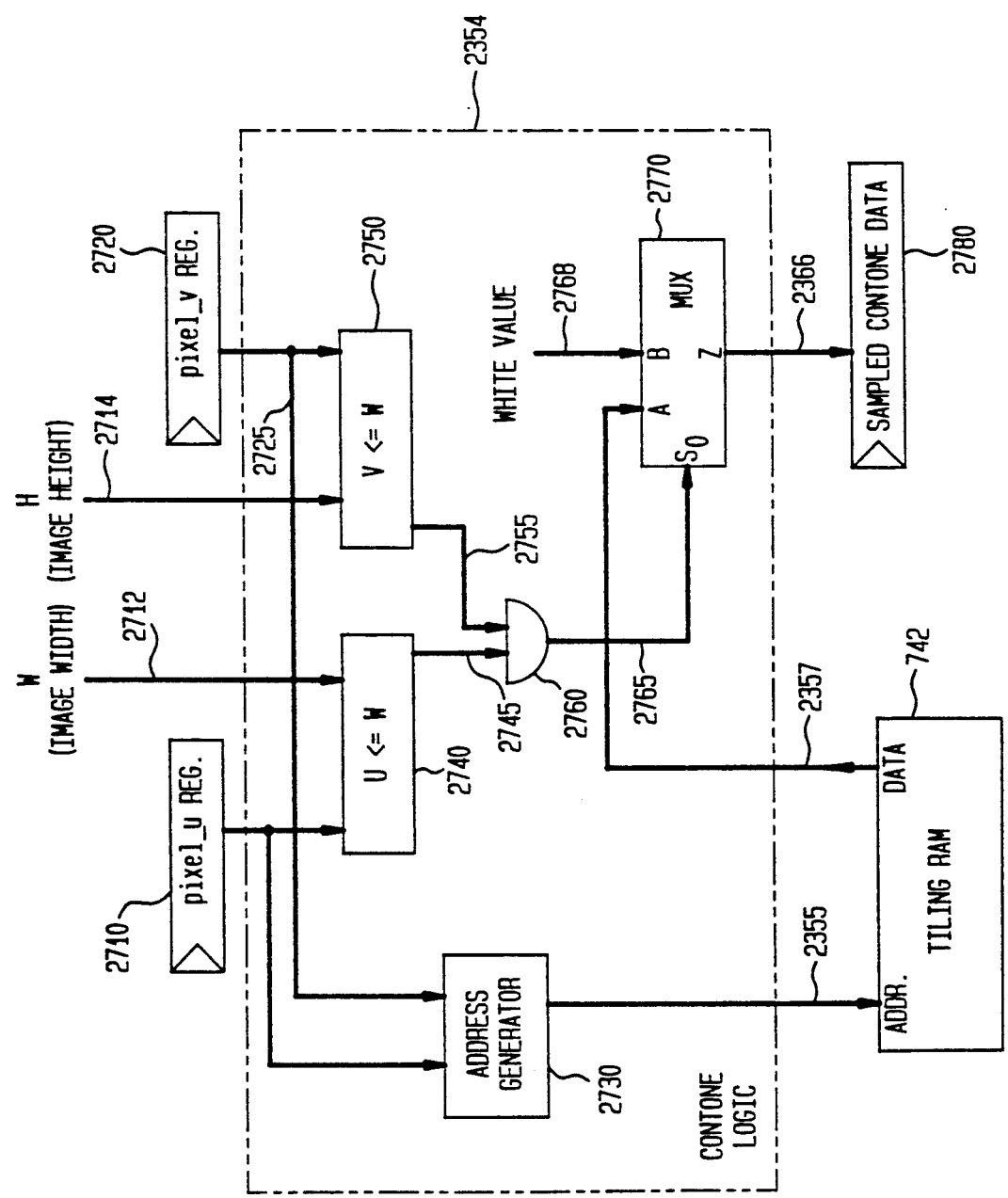

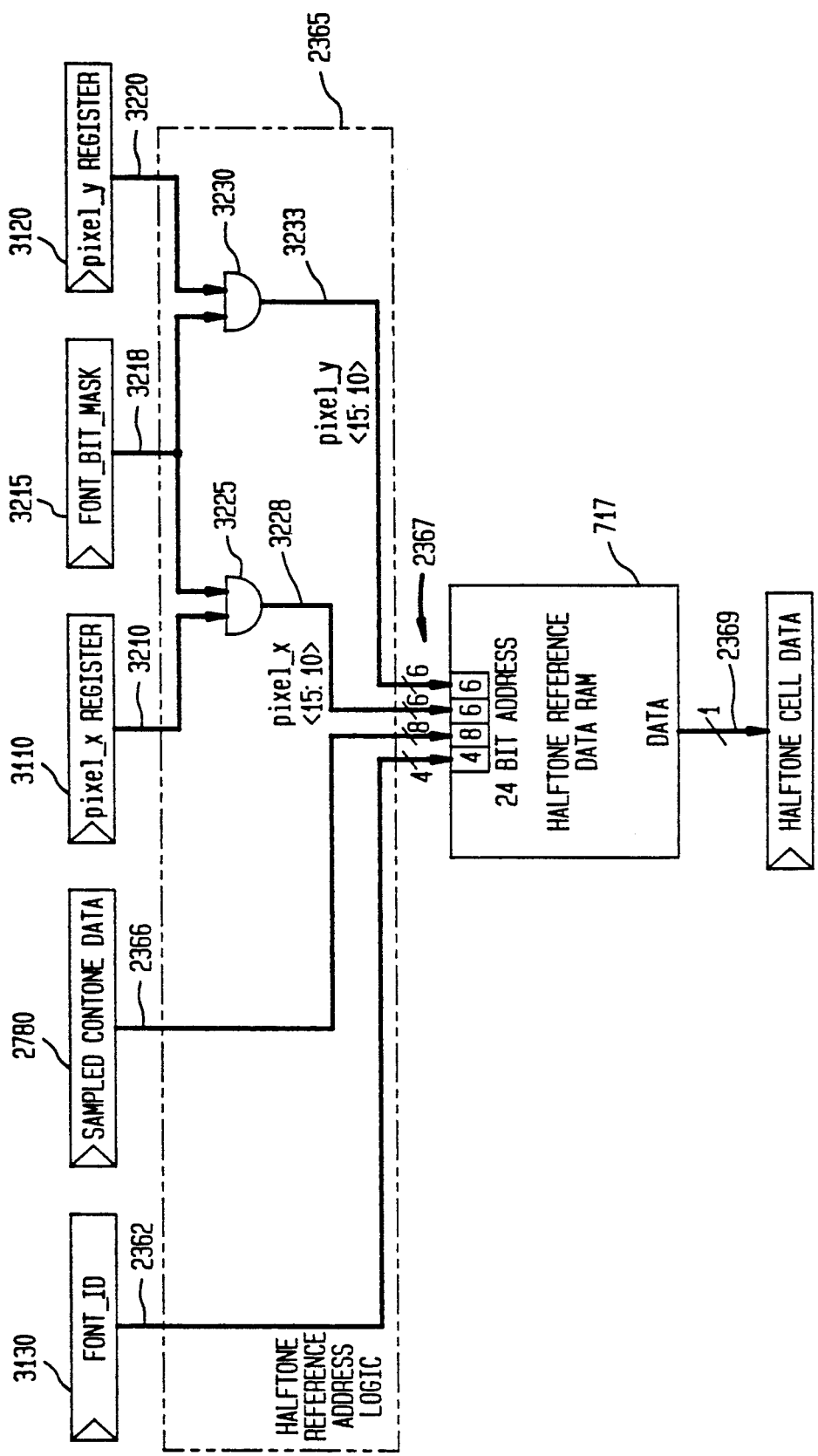

TILE-ORIENTED TECHNIQUE FOR COLLECTIVELY PERFORMING IMAGE ROTATION SCALING AND DIGITAL HALFTONE SCREENING

CROSS REFERENCE TO RELATED APPLICATION

This application is a continuation of co-pending U.S. patent application Ser. No. 07/741,877, filed Aug. 6, 1991, now U.S. Pat. No. 5,204,916.

The present application describes and claims subject matter that is also described in a co-pending United States patent application from J. F. Hamilton, Jr. et al and entitled "APPARATUS FOR COLLECTIVELY PERFORMING TILE-BASED IMAGE ROTATION, SCALING AND DIGITAL HALFTONE SCREENING", that has also been filed Aug. 6, 1991, assigned Ser. No. 07/740,532 and which is also owned by the present assignee hereof.

TECHNICAL FIELD OF THE INVENTION

The invention relates to electronic image processing, such as that which would occur in implementing a page description language having a capability of manipulating a continuous tone image through image rotation, scaling and digital halftone screening.

BACKGROUND ART

While images have always been incorporated into documents as an efficient way to convey information to readers, the exploding use of personal computers coupled with computerization of an increasingly diverse array of image-related applications has substantially increased the need to manipulate images in digital form. These manipulations frequently include, inter alia, scaling, rotating and halftoning.

Beginning several years ago and continuing with increasing use to the present, documentary images are often processed through a computer using a so-called page description language. Such a language allows a user to define objects, such as an image, that are to appear on a printed page and allows the objects to be processed in a desired fashion and then accurately positioned with respect to each other in order to properly form an entire page. To provide maximum flexibility to a user in processing a digital image, a page description language would need to support, with floating point precision, both arbitrary uniform and anamorphic image scaling within finite bounds, image rotation by an arbitrary angle, and halftoning with arbitrary screen angles and screen rulings. In order to assure that a documentary image properly "mates up" with other objects on a page, these image processing functions must be very accurately implemented, otherwise artifacts or other errors will appear on the page, when printed.

While several different page description languages are currently in use, serious limitations exist in the two basic approaches through which these languages have been traditionally implemented to perform, inter alia, image scaling and rotation.

Specifically, one basic approach widely used in the art relies on storing an entire image within a random access frame memory and then operating on the individual bits of the image situated therein. This approach, hereinafter referred to as the "full frame memory" approach, may involve sequentially reading the image, bit-by-bit, using suitable incrementing memory addresses to generate appropriately rotated image data to yield a rotated image. As known in the art, scaling may involve, for example, adding or deleting data to or from selected pixel locations in the memory in order to change the scale of the image, as desired. This overall approach requires a sufficiently large frame memory that also provides relatively fast read-write random access. Unfortunately, for an 8-by-10 inch (approximately 20-by-25 cm) continuous tone image printed at a resolution of 300 dots/inch (approximately 118 dots/cm) which is readily obtainable with currently available output writers, e.g. laser printers, the frame memory would require approximately 7 MBytes. A memory of this size, particularly when fabricated from currently available high speed random access memory (RAM) circuits, tends to be very expensive. The inordinate cost of such a frame memory generally precludes its use in a low cost printer. Furthermore, even with such a large, fast memory, image scaling and rotation are often performed through a software based process executing in a microprocessor and, as such, for an entire image, tends to be relatively slow.

In view of the practical memory limitation, the art has, for some time, also taught that scaling and rotation could alternately be preformed on a "tile-based" approach. Here, an image is first partitioned into small uniform regions called "tiles", each of which is then separately and appropriately processed. Typically, a tile is significantly smaller than the entire image. Once a tile is processed to yield an output tile, that output tile is then written into a spatially corresponding region in an output buffer, and so on for all such tiles until an entire image has been formed of output tiles.

Given these two approaches, tiling offers several distinct advantages. First, by drastically reducing the size of a tile down from that of the entire image, memory requirements for a high speed frame memory are substantially reduced from, for example, 7 MBytes for storing an entire image to perhaps 10 KBytes for storing a single tile currently being processed. This, in turn, obviates the need for a large full size high speed frame memory thereby simplifying and significantly reducing the cost of the system memory. While an image size output buffer would still be required, this buffer would not need to function as a high speed random access memory and thus can be fabricated from relatively slow and inexpensive memory circuits. Furthermore, by processing a single tile at a time, data transfers involving the frame memory are reduced to the data required just for a particular tile rather than that of the entire image as in the "full frame memory" approach. Consequently, the operations required to perform these memory transfers are greatly simplified and, as such, merely become an incidental portion of the overall tile-based processing. Moreover, by processing only a relatively small amount of data at any one time, specialized hardware circuits can be easily fabricated to rapidly process an entire tile and thereby accelerate the rate at which the entire image can be rotated and/or scaled over that associated with the "full frame memory" approach. Lastly, tile-based implementations tend to readily lend themselves to pipelined and parallel processing through which appropriate tile processing hardware is duplicated and operated on a parallel and time-staggered basis to permit several tiles to be collectively processed at once. This, in turn, further accelerates the overall process of image scaling and/or rotation. Advantageously, such implementations can easily be upwardly scaled in size, consistent with cost-performance tradeoffs, to achieve a desired throughput level.

Unfortunately, for all the advantages exhibited by tile-based scaling and rotation, a tile-based approach, particularly when used for halftoning, necessitates that each output tile must be very accurately placed in the output buffer else visible flaws will occur in the image. Specifically, we have empirically observed that for a halftoned image with a 50% tint factor, a one pixel offset in the halftoning pattern between adjacent tiles causes visible artifacts to appear in the image. These artifacts take the form of "zig-zag" lines that occur along the tile boundaries all throughout the image. As a result, if an image is to be subsequently halftoned, then a screener operating on those tiles is required to obtain each tile from the output buffer, screen that tile and place that tile back into the output buffer with a one-bit accuracy. Achieving and maintaining such a high accuracy throughout the entire halftoning process for an image has proven to be extremely difficult to attain in practice.

At first blush, one might think that this accuracy could be relaxed and the "zig-zag" pattern eliminated by appropriately smoothing the boundaries of the halftoned tiles. Specifically, such smoothing, implemented through low pass spatial filtering, would reduce the visual impact of rounding errors and resulting tile mis-alignment that would otherwise result when floating point address values are truncated into real integer addresses which, in turn, are used to address an output buffer into which the halftoned tiles are re-assembled. Through suitable experimental observations, we have noticed that, while such filtering does reduce visible tile mis-alignment, unfortunately this filtering breaks up and thereby corrupts the underlying halftone dot structure in the image. Therefore, we believe that tile boundary filtering does not appear to offer a viable solution and one-bit accuracies do need to be maintained in tile-based image processing.

Furthermore, apart from tiling, commercially available screeners are expensive, require inordinate amounts of memory and often do not possess the capability of performing image scaling and/or rotation.

In addition, image scaling and rotation are frequently carried out in currently available image processing apparatus as "front-end" operations, i.e. in circuitry situated near an image scanner in a chain of image processing circuits; while screening is carried out as a "back-end" operation, i.e. in circuitry associated with an output writer. Either operation generally has little, and oftentimes no knowledge, of the other with, as a result, artifacts and other adverse consequences frequently manifesting themselves in the image. Since page description languages perform post-processing, i.e. these languages process an image as they "find it", these languages provide no opportunity to optimize an image for operations that have previously been performed on it, such as "front-end" scaling or rotation. As such, the specific implementation of these languages, as currently used, does not eliminate adverse affects, such as Moire patterns and aliasing, that might result from interaction between various characteristics of these "front-end" operations, such as for example sampling frequencies and pixel placement, with similar corresponding characteristics associated with the halftoning process and the output writer.

Moreover, commercially available screeners also tend to be inordinately slow. Accordingly, if such a screener were to be used in implementing a page description language, then the resulting throughput provided thereby would be substantially less than the speed, in pages/minute (ppm), of currently available output writers, such as upwards of 70 ppm, and would thus pose a serious bottleneck. Inordinately slow speeds would tend to frustrate users, who, in turn, would rather shy away from and not incorporate images into documents than wait the needed time for each of these images to be processed and printed.

In spite of the basic drawbacks noted above, the advantages inherent in a tiled-based approach, particularly those flowing from the reduction in size and cost of the frame buffer, strongly support its use.

Therefore, a need exists in the art for a tile-based technique that can very accurately and inexpensively implement image rotation, scaling and halftoning in a post-processing environment. Furthermore, a specific need exists to implement tile-based scaling, rotating and halftoning in a manner that can significantly accelerate the throughput of a page description language to approach that of currently available output writers. Advantageously, the incorporation of such a technique in an output writer will significantly hasten the use of documentary images.

DISCLOSURE OF THE INVENTION

Accordingly, an object of the present invention is to provide apparatus and accompanying methods that can very accurately, though inexpensively, implement image scaling, rotation and halftoning of a continuous tons (contone) image in a post-processing environment.

A specific object is to utilize tiling in such apparatus and methods in order to advantageously reduce the necessary amount of high speed memory.

A more specific object is to provide apparatus that can maintain tile placement errors in an output buffer to within a one bit accuracy throughout an entire halftoning operation.

Another specific object is to provide such apparatus and methods that can provide image scaling, rotation and halftoning at speeds that will sufficiently accelerate the processing throughput of a page description language to approximately match the throughput provided by many currently available output writers.

Broadly speaking, these and other objects are accomplished in accordance with the teachings of our invention by first defining pixel sampling increments which specify incremental movement between successive sampling locations in a contone tile in the contone image for corresponding movement between two adjacent pixel locations in a block of the output image. Then, in response to corresponding ones of these increments: (a) addresses are generated that represent incremental movement through the block to produce a sequence of output pixel locations; (b) the contone image is sampled to yield a sampled contone value associated with each addressed output pixel location so as to produce a plurality of sampled contone values; and (c) a corresponding halftone output value is produced, in response to each of said sampled contone values and a pre-defined pattern, for each addressed output pixel location in the sequence to yield a plurality of halftone output values. Each of the halftone output values is then written in the corresponding addressed output pixel location in the block in the event each halftone output value is associated with a pixel location situated within the contone tile.

Specifically, in accordance with our detailed teachings, our inventive method relies on effectively partitioning a contone image into an array of non-overlapping tiles and an output image into an array of blocks, the latter usually overlapping depending upon an angle, $\phi$, (rotation angle) through which the contone image is to be rotated. The block size is fixed at illustratively 32-by-32 locations for enlargement scaling and variable, to a certain extent, for reduction scaling. The tiles are, sized based upon anamorphic scale factors, $\alpha$ and $\beta$, and the rotation angle such that a tile, when rotated with respect to its corresponding block, will be the maximum size that will fit within that block. Based upon, inter alia, the tile and block sizes as well as the rotation angle, anamorphic scale factors and screen angle, $\theta$, incremental pixel sampling coordinates are determined such that for movement, on a pixel-by-pixel basis, through successive pixels in a block, halftoned output data can be obtained for each such pixel in that block from contone data contained within a minimally sized box in the contone image that completely contains a corresponding contone tile. Incremental sampling coordinates are also defined for corresponding incremental pixel movements through a halftone screening pattern, based upon, inter alia, screen ruling and a screen angle, $\theta$, to yield a successive sampled halftoned value for each pixel in a block. Increments are also defined for movement between successive tiles in the contone image as well as between successive tiles in the halftoned screen pattern and between successive blocks in the output image. Once all these increments are chosen, each tile in the contone image is successively processed to fill each successive and corresponding block with halftoned output data. This processing entails incrementing through a current output block on a pixel-by-pixel basis to produce a sequence of output pixel locations, incrementally sampling through the contone image to yield a sampled contone value associated with each output pixel location in order to produce a plurality of sampled contone values, and incrementally sampling through the halftone pattern to yield, in response to each of the sampled contone values, a corresponding halftone output value for each output pixel location in the sequence to yield a plurality of halftone output values. These incrementation and incremental contone and halftone sampling processes occur substantially in lockstep such that after an address is generated for each successive pixel in the current block, a corresponding sampled contone value and a corresponding halftone output value are generated therefor. This processing continues along each row of a current block in a fast scan direction and from row to row in that block along a slow scan direction until the current block is completely filled with output halftone values. Halftoned data is only written into the buffer for those locations in the current block that have corresponding sampled contone values lying within a current tile being processed; a zero value is written into all the other locations therein. After the current contone tile has been completely processed, the contents of the buffer are transferred into an output block in a page buffer. This output block is situated at a location corresponding to the spatial location of the current block in the output image. After the current contone tile has been processed, the next successive contone tile, as defined by the tile increments, is processed to yield output halftoned data for the next block in the output image, and so on for each successive contone tile. To ensure that all the contone tiles are properly aligned, the starting location of each successive contone tile is modified by values of positional offsets that exist between positions of edges of a block and corners of a corresponding rotated contone tile. Contone tiles are processed sequentially along a row, i.e. in a fast scan direction, and from row to row, i.e. in a slow scan direction, through the entire contone image.

The halftone data can be generated either by sampling through a halftone reference cell or through a threshold matrix. Through the former approach, a halftone reference stack contains multiple halftone reference calls, each containing a different depiction of a halftone dot, typically ranging from a 0% dot to a 100% dot. Each sampled contone value selects a particular halftone reference plane that is to be sampled, by appropriate pixel addresses, to yield a corresponding sampled halftone value. Through the latter approach, a threshold matrix is successively sampled, also by appropriate pixel addresses, to yield a current sampled threshold value that is compared against a corresponding current sampled contone value to produce a halftone output bit having a value determined by the results of the comparison. Halftone sampling, whether in the halftone plane or the threshold matrix, occurs independently of and generally in a different direction than sampling through the contone image, though both sampling processes operate substantially in lockstep with each other.

Our invention is preferably implemented using a two chip architecture; specifically, a microcomputer in conjunction with a dedicated hardware circuit, the latter being hereinafter referred to as the tile and pixel processor (TPP). The microcomputer establishes various parameter values that remain fixed throughout processing an entire contone image, such as tile and block sizes and, pixel sampling and tile increments, and then calculates the starting location of each successive contone tile and output block. The microcomputer loads the pixel sampling increments into the TPP. Thereafter, the starting location for each contone tile is fed to the TPP followed by an instruction to the TPP to process that contone tile. The TPP, through an internal tile processor, generates contone and halftone pixel sampling addresses for each successive output pixel in the output image. These addresses are used, in seriatim, through accessing associated contone and halftone reference memories, to produce each sampled contone value and each corresponding halftoned output value. After the TPP process each contone tile, the microcomputer transfers all the halftone data produced by the TPP into a corresponding block in a page buffer, then updates the parameter values stored in the TPP to reflect the starting location for the next successive tile and thereafter instructs the TPP to commence such processing, and so on to process all the contone tiles. In essence, this combination of a microcomputer and the TPP collectively implement nested processing loops, with the TPP implementing two nested loops in hardware.

Our invention advantageously possesses the feature that parallel processing can be readily incorporated in a given implementation of our inventive architecture to upwardly scale the processing throughput to a desired level. To do so, the inventive two-chip architecture can be easily expanded to implement parallel processing by using multiple TPPs all connected to and controlled by a common microcomputer. Each TPP would be configured, by the microcomputer, to independently process a specific corresponding non-overlapping portion, e.g. a horizontal strip, of an incoming continuous tone (contone) image. The microcomputer would instruct all the TPPs to process their respective image portions in a time staggered, essentially parallel fashion with respect to each other. While each TPP is undertaking its processing, the microcomputer would determine the portion of the output buffer into which data then being generated by that TPP, and temporarily stored in an appropriate FIFO, would be subsequently transferred at the completion of this processing. As the number of active TPPs is increased to provide greater degrees of parallelism, processing throughput will substantially increase as well.

BRIEF DESCRIPTION OF THE DRAWINGS

The teachings of the present invention may be readily understood by considering the following detailed description in conjunction with the accompanying drawings, in which:

FIG. 2 depicts the correct alignment of the drawing sheets for FIGS. 2A-2D;

FIGS. 2A-2D graphically depict various tile-based operations that collectively form the inventive process for implementing image scaling, rotation and halftoning in system 5 shown in FIG. 1;

FIG. 7 depicts the correct alignment of the drawing sheets for FIGS. 7A and 7B;

FIGS. 7A and 7B collectively depict a high level block diagram of image processing system 700 that utilizes the inventive technique;

FIG. 9 depicts the correct alignment of the drawing sheets for FIGS. 9A and 9B;

FIGS. 9A and 9B collectively depict a flowchart of Main Loop 900 that is executed within microcomputer 713 shown in TTH circuit 800 depicted in FIG. 8;

FIG. 10 depicts a flowchart of Tile Processing Routine 1000 that is formed of steps 925-945 that occur in Main Loop 900 shown in FIGS. 9A and 9B;

FIG. 11 depicts a flowchart of Block and Tile Size Setting Step 1010 that is executed within Tile Processing Routine 1000 shown in FIG. 10;

FIG. 12 depicts a flowchart of Number of Tile Calculation Step 1020 that is executed within Tile Processing Routine 1000 shown in FIG. 10;

FIG. 17 depicts a high level flowchart of Tile Processing Step 1060 that is executed within Tile Processing Routine 1000 shown in FIG. 10;

FIG. 22 depicts a detailed flowchart of Process Pixel Routine 1970 shown in FIG. 21;

FIG. 23 depicts the correct alignment of the drawing sheets for FIGS. 23A and 23B;

FIGS. 23A and 23B collectively depict a high level block diagram of an embodiment of Tile and Pixel Processor (TPP) 740 shown in FIGS. 7 and 8;

FIG. 24 shows a block diagram of replicated circuit portion 2410 situated within Tile Processor 2320 contained within TPP 740 shown in FIGS. 23A and 23B;

FIG. 25 depicts truth table 2500 for multiplexer 2430 contained within Tile Processor replicated circuit portion 2410 shown in FIG. 24;

FIG. 26 depicts state flowchart 2600 which shows the sequential operations that occur within Tile Processor replicated circuit portion 2410 shown in FIG. 24;

FIG. 27 depicts a block diagram of contone Logic 2354 contained within Pixel Processor 2350 shown in FIGS. 23A and 23B;

FIG. 28 depicts truth table 2800 for multiplexer 2770 contained within Contone Logic 2354 shown in FIG. 27;

FIG. 32 depicts a block diagram of Halftone Reference Address Logic 2365 contained within Pixel Processor 2350 shown in FIGS. 23A and 23B.

To facilitate understanding, identical reference numerals have been used, where possible, to denote identical elements that are common to various figures.

MODES OF CARRYING OUT THE INVENTION

After reading the following description, those skilled in the art will readily appreciate that the inventive technique can be used in a wide variety of image processing applications for collectively implementing image scaling, rotation and halftoning at relatively high speeds. Inasmuch as one of the predominant applications of the invention is likely to be in implementing a page description language in a post-processing environment in a digital image processing system, i.e. embedded within, for example, a output writer used in the system rather than within any preceding image processing equipment that forms the system, then, for the sake of brevity, we will discuss the invention in that context.

In an effort to impart a meaningful yet detailed understanding of the inventive technique and apparatus to the reader, the following discussion will proceed in various stages. First, we will describe a simple overview of an image processing system for implementing a page description language in accordance with the present invention. Next, through the aid of various graphical depictions, we will present the inventive process that collectively performs image scaling, rotation and halftoning. Thereafter, we will describe, at an increased level of detail, an embodiment of an image processing system that incorporates the inventive technique followed by a detailed discussion of a two chip (e.g. microcomputer/ASIC) implementation of this technique. This latter discussion will first provide a functional description, through high level pseudo-code, of the operations undertaken by both chips followed by a description of dedicated hardware circuitry that would be specifically used in, for example, the ASIC (application specific integrated circuit) chip to implement the salient portion of the technique there.

A. System for Implementing a Page Description Language

Figure 1:
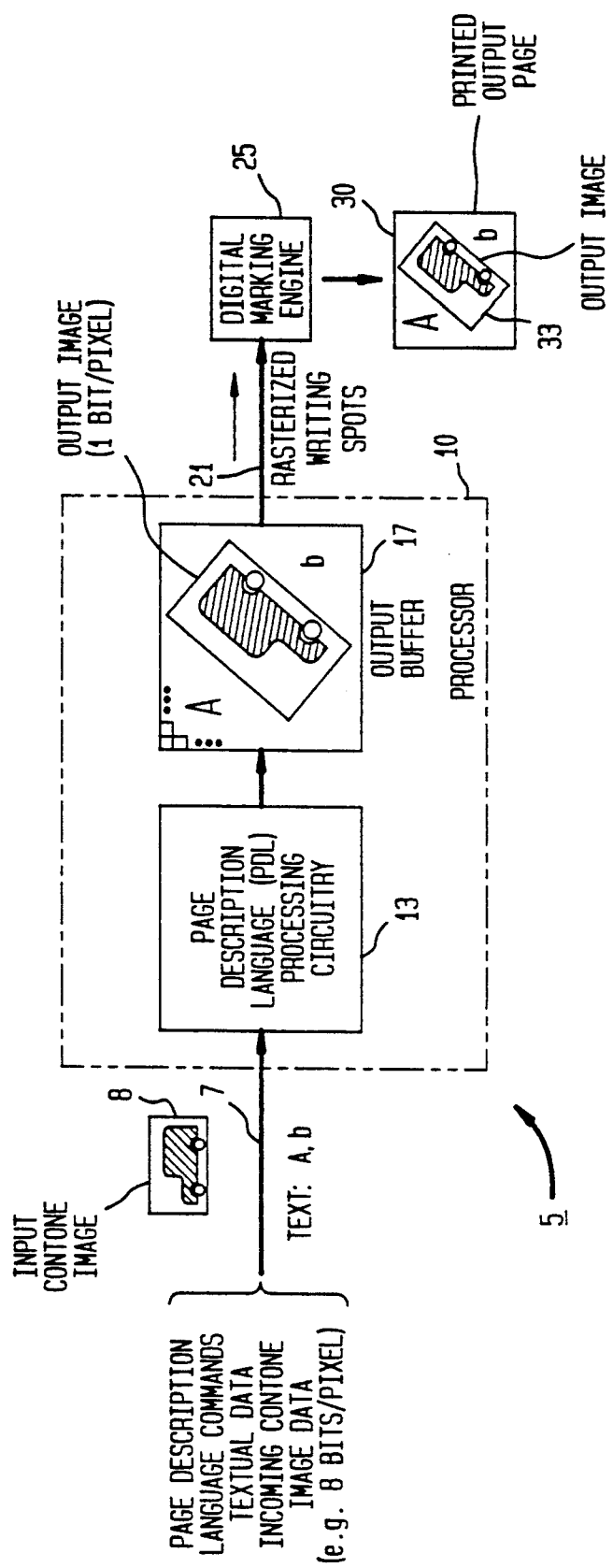
FIG. 1 depicts a simplified very high level block diagram of system 5 for implementing a page description language that provides image scaling, rotation and halftoning capabilities in accordance with the invention.

FIG. 1 depicts a simplified very high level block diagram of image processing system 5 for implementing a page description language (PDL) that provides image scaling, rotation and halftoning capabilities in accordance with the inventive technique. As shown, incoming data is routed, via lead 7, to system 5. This data is formed of a series of PDL commands each followed by associated textual or continuous tone (contone) image data. Each such command specifies the manner through which the immediately succeeding data is to be processed and hence appear in an output page. The serially occurring PDL commands along with their accompanying data collectively form a data stream which is routed, via lead 7, to processor 10. Processor 10, itself containing PDL processing circuitry 13 and output buffer 17, implements each such command, through the PDL processing circuitry, by performing a corresponding image processing operation on the accompanying data and thereafter writes resulting processed image data into the output buffer. The contents of this buffer are then read, in rasterized form, and applied, via lead 21, to digital marking (writing) engine 25. This engine, in its simplest form, writes a single writing spot (output bit) onto an output page for each corresponding bit applied to its input. Typically, engine 25 is a laser printer with vertical and horizontal output writing pitches on the order of 300 dots/inch (approximately 118 dots/cm) or more. Printed page 30, which is typically a paper hardcopy output, is produced by engine 25 and reflects the contents of output buffer 17.

A PDL allows a user to define objects, such as an image, that are to appear on printed page 30 and allows the objects to be processed in a desired fashion and then accurately positioned with respect to each other in order to properly form the entire page. To provide maximum flexibility to a user in processing a digital image, a PDL needs to support, with floating point precision, both arbitrary uniform and anamorphic image scaling within finite bounds, image rotation by an arbitrary angle, and halftoning with arbitrary screen angles and screen rulings. In order to assure that a documentary image properly "mates up" with other objects on a page, these image processing functions must be very accurately implemented, otherwise artifacts or other errors will appear on the page, when printed.

As an example, a series of PDL commands may specify that input contone image 8 is to be scaled by 0.5 in each direction, rotated by approximately 45 degrees, halftoned and then positioned in the middle of an output page so as to yield output image 33 located on page 30. These commands may also specify that the text letters "A" and "b" are to be placed on either side of output image 33 with the letter "A" being scaled both horizontally and vertically by 2. In processing these PDL commands and the accompanying data, PDL processor 13 operates on the contone image data, as described in detail below, to yield the desired scaled, rotated and halftoned output image with the results being written into output buffer 17. Processor 13 will also operate on the textual data as defined by the PDL commands. Output buffer 17 is sufficiently large to store halftoned image data at the writing resolution of engine 25 for at least one, and usually several, entire output pages.

The present invention does not lie in the specific commands used in a PDL nor in the manner in which each PDL command and its associated data is generated but rather in the manner through which image scaling, rotation and halftoning functions can be implemented to impart these functions into a PDL. As such, the following discussion will only center on discussing image scaling, rotation and halftoning.

B. The Inventive Process

Figure 2B:
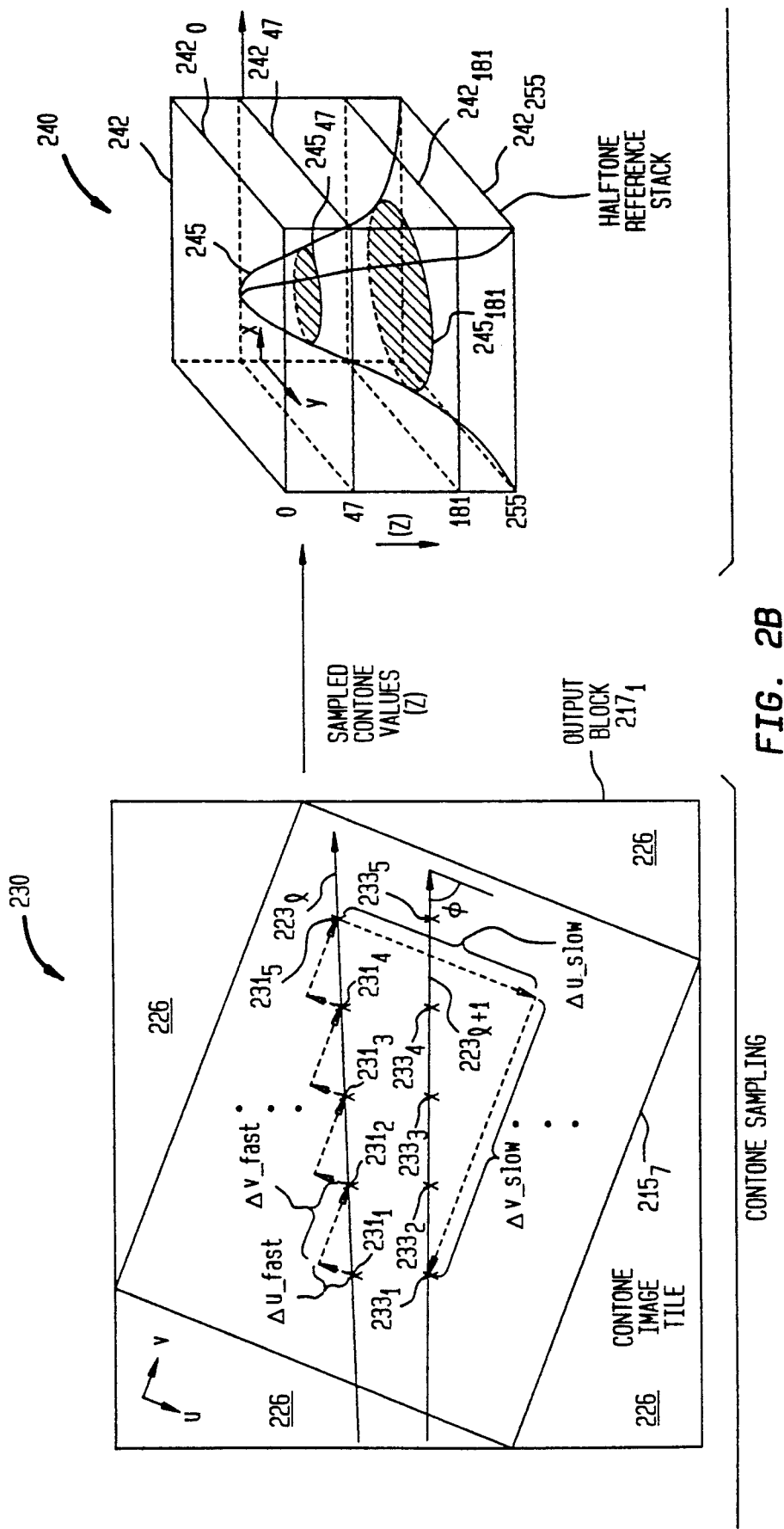
Figure 2C:
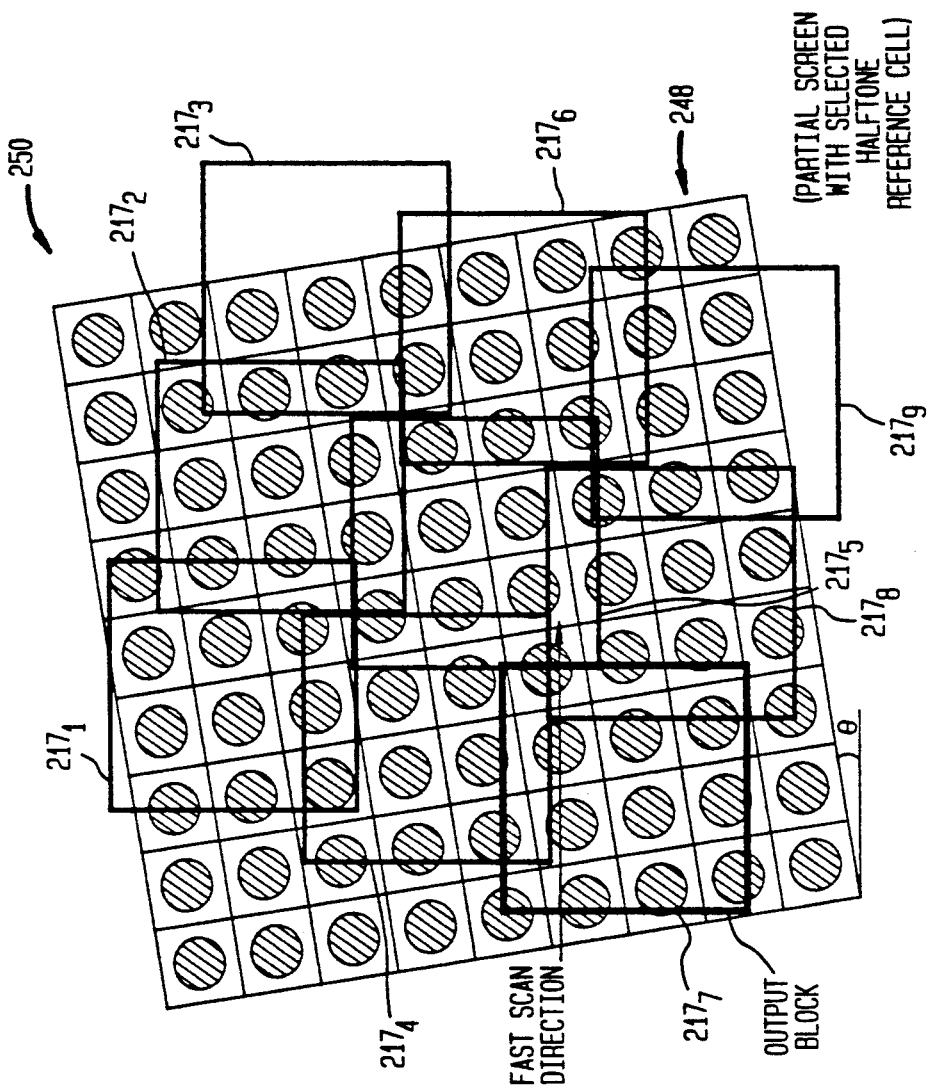
Figure 2D:
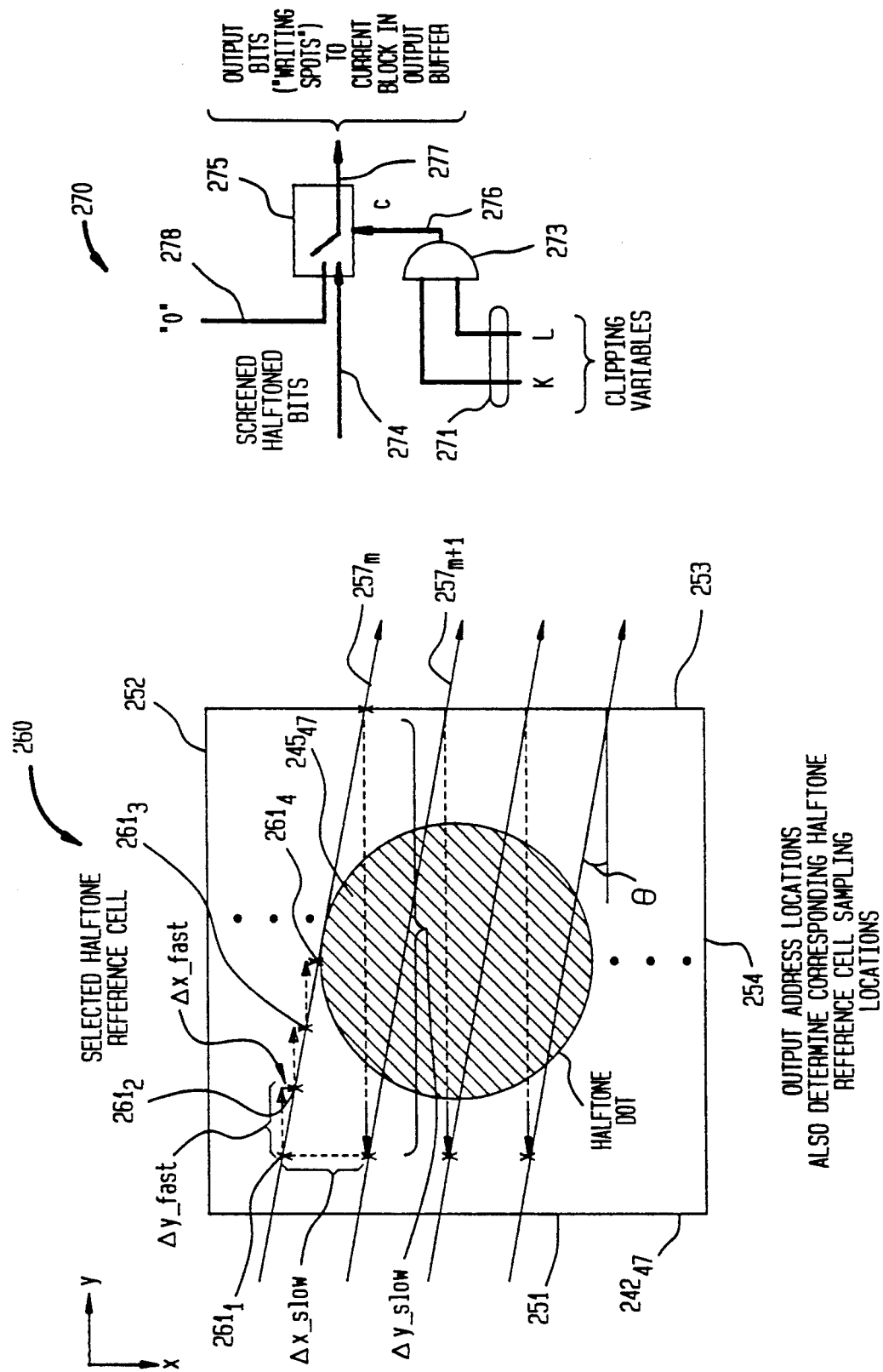
Figure 3:
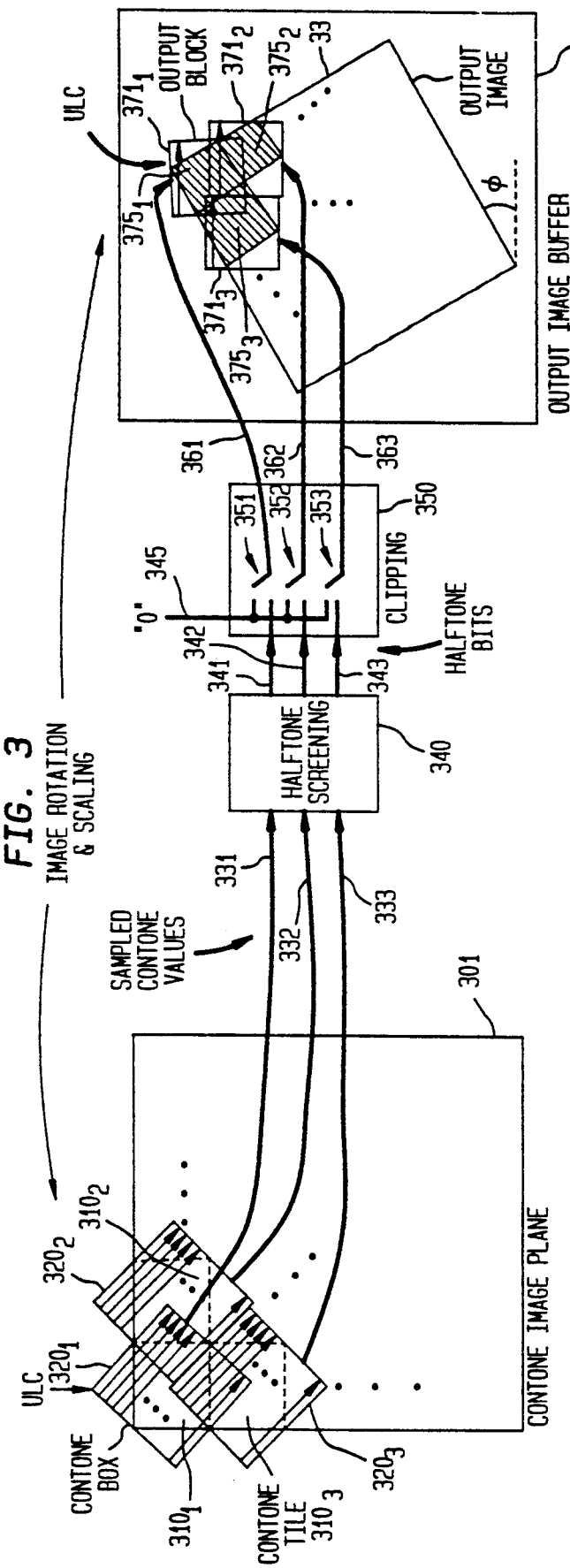
FIG. 3 graphically depicts contone sampling and output data writing for various illustrative spatially corresponding contone boxes and output blocks.
Figure 5:
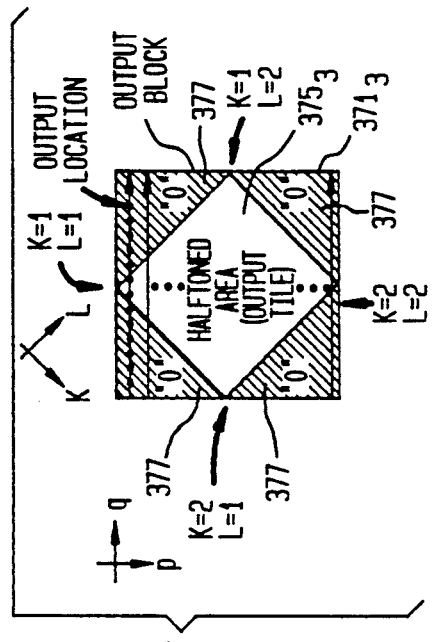
FIG. 5 depicts an output block in detail and corresponding to the contone box shown in FIG. 4.
Figure 4:
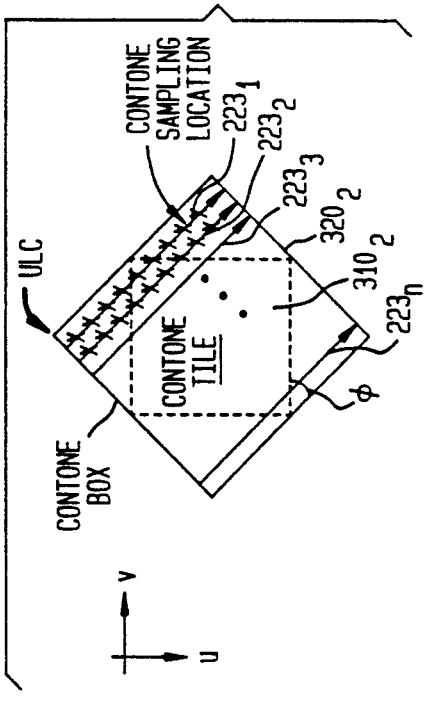
FIG. 4 depicts a single contone box in detail.

The inventive tile-based process will first be discussed, in an overall qualitative fashion, with respect to FIGS. 2A-2D, 3, 4 and 5. Various tile-based operations that collectively form the inventive process for implementing image scaling, rotation and halftoning in system 5 are shown in FIGS. 2A-2D, for which the correct alignment of the drawing sheets for these figures is shown in FIG. 2. Contone sampling and output data writing for various illustrative spatially corresponding contone boxes and output blocks are shown in FIG. 3. Detailed depictions of a single contone box and corresponding output block are respectively shown in FIGS. 4 and 5. The reader should simultaneously refer to all these figures throughout the following discussion.

The inventive process relies on first partitioning an entire input contone image into smoothly abutting identically sized tiles. Contone image 301 shown in FIG. 3 is partitioned into contone tiles $310_1$, $310_2$, $310_3$, . . . extending horizontally and vertically throughout the entire contone image. As an expanded view, depiction 210 shown in FIG. 2A shows image portion 215 as formed of nine contone tiles $215_1$, $215_2$, . . . , $215_9$, arranged in a three-by-three matrix. Once this image is partitioned, then each contone tile is successively processed to yield output, e.g. halftoned, bit values that, for each such tile, are themselves written as a tile into a corresponding square block of locations in the output buffer. In this regard, blocks $371_1$, $371_2$, $371_3$, ... in output buffer 17 shown in FIG. 3 contain output bit values for smoothly abutting corresponding output tiles $375_1$, $375_2$, $375_3$, ... that collectively form output image 33. Each output tile contains output data for a single corresponding contone tile. While proceeding through the following discussion, the reader should keep in mind that contone tiles refer to those tiles that collectively form the contone image, while output tiles refer to those tiles that collectively form the output image formed in output buffer 17.

Each block in the output buffer is fixed in size, at illustratively 32-by-32 locations. A separate block exists for each contone tile. Inasmuch as the contone image can be rotated through a desired angle, $\phi$, with respect to the output page, the tiles are skewed by $\phi$ degrees with respect to the output blocks. This is seen in depiction 210 shown in FIG. 2 by the output blocks being superimposed onto their spatially corresponding tiles and in FIG. 3 by skewed output image 33.

During initialization, as discussed in detail below, the size of each tile is established to be the maximum size that will fit within an output block. The size of each tile is determined by three factors: scale factors in the slow and fast scan directions ($\alpha$ and $\beta$), an angle ($\phi$) through which the contone image is to be rotated and the output block size, fixed at illustratively 32-by-32 output locations. Because each output tile is rotated within its corresponding block, adjacent blocks, such as blocks $217_1$ and $217_2$ shown in FIG. 2A, that contain output data for abutting contone tiles $215_1$ and $215_2$, will overlap in the output buffer. The degree of overlap between adjacent blocks is governed by the magnitude of the angle, $\phi$, through which the contone image is to be rotated. As the angle increases, so does the amount of overlap. The areas of overlap within block $217_1$ occurs in shaded areas 219. Similar areas occur within each of the other blocks. The overlap ensures that all adjacent tiles will abut and be properly aligned amongst themselves.

Depiction 220 shows one such illustrative contone tile, e.g. tile $215_7$, superimposed onto its corresponding output block, e.g. block $217_7$. As can be seen, this tile is oriented by the angle of rotation, $\phi$, with respect to the block.

With the contone tiles defined in this manner and angled with respect to the blocks, the contone image is two-dimensionally sampled so that, in effect, the contone data required for each block can be obtained from its associated contone tile. Since sampling occurs in the contone plane, e.g. plane 301 shown in FIG. 3, two-dimensional sample increments in fast and slow scan directions (v and u), are established, also during initialization as described in detail below, such that a different successive contone sample is generated for each and every output location in every output block that is to contain output data for a tile of the contone image. As a result, a region of contone values in the contone image, hereinafter referred to as a contone box (to distinguish it from an output block) is completely sampled at prescribed increments in raster form to yield a number of successive contone samples that, once processed such as through halftoning, will generate successive output values sufficient in number to completely fill a spatially corresponding output block in the output image. As each such sampled contone value is generated and processed, its resulting halftoned output value is written into a corresponding output location in an output block. In this regard, contone boxes $320_1$, $320_2$, $320_3$, ... which respectively contain contone tiles $310_1$, $310_2$, $310_3$, ... are each successively sampled in a raster fashion to yield a succession of contone samples for each such box. These samples, for each box, are thenprocessed, through halftone screening, to yield a corresponding succession of halftone bits (writing spots) that is written into appropriate successive locations in a corresponding output block, e.g. into output blocks $371_1$, $371_2$, $371_3$, . ... FIG. 3 illustrates the spatial correspondence between the contone boxes and associated output blocks. Specifically, sampled contone values for respective contone boxes $320_1$, $320_2$ and $320_3$ are applied to halftone screener 340 as symbolized by respective lines 331, 332 and 333. These lines serve to visually distinguish the contone samples produced for each one of these three contone boxes. Halftone screener 340 operates on the contone samples generated for each of these boxes and provides a separate halftone bit pattern, in a manner to be discussed below, therefor. The halftone bit patterns resulting from the contone samples appearing on lines 331, 332, and 333 are routed by halftone screener 340, via respective lines 341, 342 and 343, to clipping logic 350. The output bits provided by this logic, as discussed below, are written into output buffer 17 and specifically into corresponding output blocks $371_1$, $371_2$, and $371_3$, as symbolized by lines 361, 362 and 363, respectively. Thus, the contone samples that result from each of contone boxes $320_1$, $320_2$, $320_3$ produce corresponding successions of screened output values which, in turn, are written into corresponding output blocks $371_1$, $371_2$, and $371_3$. Each contone box in contone image 301 is sequentially processed to write output data into a corresponding output block until all the output blocks have been filled.

Output data is only needed in each block in the output buffer to fill the region associated with the corresponding contone tile. Inasmuch as a contone tile, based upon the angle of rotation, may not fully occupy a contone box, clipping, as defined below, is used to define those contone samples that are situated within a contone tile which are to be processed and generate resulting output values for storage into an output tile in an output block from the remaining contone samples in the contone box that are to be effectively ignored. Inasmuch as these latter values would generate output data for the overlap region for adjacent output blocks, zero values are written into output buffer at corresponding output locations. In its simplest form, clipping can be viewed as a simple switch that either applies a halftone bit value or a zero value for writing in each output location in an output block. Switches 351, 352 and 353 provide clipping functions for the output blocks $371_1$, $371_2$ and $371_3$ by routing either the halftone bit values then appearing on lines 341, 342 or 343 or the zero value applied to line 345 to respective lines 361, 362 and 363. The selection of either the halftone bit or zero value (switch setting) for any output block is made based upon the simultaneously occurring values of orthogonal clipping coordinates (K and L). These coordinates are defined and scaled such that, given the current tile size, a "unit" distance in variables K and L equals the distance along an edge of a contone tile. Specifically, K and L are both equal to the value one within a contone tile and either zero or two outside this tile. These clipping variables effectively circumscribe the boundaries of each contone tile and allow output data to fill the area in each output block that is to be occupied by a corresponding output tile while writing zero values into all the remaining regions of each block. Processed contone sample data, e.g. halftoned bits, are written into those spatially corresponding output locations within a block for which the values of K and L are both equal to one, i.e. only within an output tile contained within any output block and not within any overlap area. The values of K and L are appropriately incremented, also in raster fashion, as are the addresses for the current output location to be written in the current output block.

The contone sampling direction, as shown by sample lines 223 shown in depiction 220 in FIG. 2A, is oriented to match the horizontal and vertical directions of the output buffer but, owing to the rotation of the contone image, is angled with respect to each contone tile. Since it is the incoming contone values that are actually sampled, angled sampling, by sample lines $223_1$, $223_2$, $223_3$, ..., $223_n$, occurs through the input contone image, at the appropriate sampling increments to obtain data from each image tile, such as tile $215_7$, in each contone box. Because sufficient contone sampling occurs, in a raster fashion, to generate data for all output locations in each output block, sampling extends beyond the periphery of each tile to fill an entire contone box. In this regard, sampling lines $223_1$, $223_2$, $223_3$, ..., $223_n$ (collectively forming lines 223) generate contone samples, each of which is marked with an "X", throughout contone box $320_2$ including contone tile $310_2$ shown in FIG. 4. The resulting sampled values provide sufficient output data to fill an entire output block such as block $371_3$, including peripheral areas 377, shown in FIG. 5. An output block, such as block $371_3$, is filled in raster fashion and in the directions shown by axes p and q, with data written into each of the 32-by-32 fixed output locations (each indicated by a solid dot) starting at the upper left hand corner of the block and continuing to the lower right hand corner thereof. Owing to clipping, within this block, zeroes are written into the output locations that fall within peripheral areas 377 (shown cross-hatched for ready identification) with halftoned bit values being written for the remaining locations that fall within output tile $375_3$. Similarly, depiction 220 shown in FIG. 2A depicts the contone sampling for contone tile $215_7$ and the spatial correspondence between this tile and output block $217_7$.

For a contone image, sampling begins at the upper left hand corner (ULC) of the contone box which corresponds to the uppermost output block in the output image and continues vertically downward through the box. This block is itself situated in the ULC of the output image. After each contone box is sampled, sampling commences at the ULC of the next successive contone box and so on. Appropriate variables are used to maintain the ULC address for the current contone box and are appropriately incremented by fast and slow scan increments to commence sampling at the ULC of each successive contone box. As such, output data is generated that fills successive output blocks, such as blocks $217_1$, $217_2$, $217_3$, that form output image portion 217 shown in FIG. 2. Accordingly, the output image is build up on a block-by-block basis with the output data supplying an output tile of data for each such block.

Depiction 230 of FIG. 2B shows two-dimensional contone sampling in fine detail. Two illustrative sampling lines $223_l$ and $223_{l+1}$ are specifically shown. Variables pixel_v and pixel_u store the address, in terms of coordinates u and v, of the current sampling location in the contone image. These variables are appropriately incremented in the fast and slow scan directions by pixel sampling increments $\Delta$pixel_u_fast, $\Delta$pixel_v_fast, $\Delta$pixel_u_slow and $\Delta$pixel_v_slow (also referred to herein as $\Delta$u_fast, $\Delta$v_fast, $\Delta$u_slow and $\Delta$v_fast). These increments, in fact all such "$\Delta$" values, are set during initialization such that a correct number of contone sample points will be produced to fill each contone box. As shown in depiction 230, contone sampling commences at the left starting point of a sampling line, such as line $223_l$, and, through successive incrementation of the sampling address by the fast scan v and u pixel sampling increments $\Delta$pixel_v_fast and $\Delta$pixel_u_fast, proceeds from one location to the next along this line in order to yield a equally distributed sequence of sampling points $231_1$, $231_2$, $231_3$, $231_4$ and $231_5$. When the last sampling location has been reached on a sampling line, such as illustratively location $231_5$, the sampling address is incremented by the slow scan pixel sampling increments $\Delta$v_slow and $\Delta$u_slow, to commence sampling at the leftmost location on the next successive sampling line, i.e. line $223_{l+1}$, and so on. Resulting contone sample points are indicated by the "Xs" located on each sampling line.

As indicated in depiction 240 shown in FIG. 2B, each sampled contone value merely serves as an address to a font memory, i.e. halftone reference stack, to select a particular halftone reference cell. Stack 242, which is stored within a memory (not shown in the figure), stores an pre-defined number of, e.g. 256, different cells. Each cell holds a bit-map, formed of illustratively 64-by-64 pixels, of a specific halftone dot. Within stack 242, the size of the dots gradually changes, as indicated by dot profile 245, from a zero sized dot in cell $242_0$ to a 100% dot (i.e. one that completely fills the cell) in cell $242_{255}$. Illustrative cells $242_{47}$ and $242_{181}$, respectively store intermediate sized dots $245_{47}$ and $245_{181}$. Though these dot patterns are shown as being smooth, they are actually quantized. Once the desired cell is selected, that cell is sampled in a direction dictated by a screen angle, $\theta$, using two-dimensional fast and slow scan increments. The fast and slow scan increments are determined by the screen angle, screen ruling and output writing (laser) frequency such that an output block will contain a proper number of halftone dots.

Contone and halftone dot sampling proceed in lock-step with every sampled contone value producing a sampled halftone dot value. However, the direction and incrementation in which halftone sampling occurs is completely independent of the direction and incrementation at which contone sampling occurs.

Now, assume, for purposes of discussion, that the value of a current contone sample selects halftone reference cell $245_{47}$. Also, assume that the screen angle, $\theta$, is approximately 10 degrees. As shown in depiction 250 of FIG. 2C, a halftone dot screen, such as partial screen 248, contains a seamless doubly periodic two-dimensional halftone dot pattern. This depiction shows the output blocks, specifically block $217_7$, superimposed onto halftone screen 248. Halftone dot sampling proceeds through the screen in a two-dimensional raster fashion along fast and slow scan directions. These directions run parallel to the output buffer. However, since sampling actually occurs within the selected halftone dot cell, angled sampling occurs within the cell at a direction equal to the negative of the screen angle.

Owing to the periodicity of the screen pattern, once a sampling line hits an edge of the halftone cell, such as edge 251, 252, 253 or 254 shown in depiction 260 in FIG. 2D, that line merely wraps around to the opposite edge to start the next sampling line with sampling re-commencing therefrom and so on.

In this regard, illustrative sampling lines $257_m$ and $257_{m+1}$ traverse through halftone reference cell $242_{47}$ to yield a succession of halftone sampling points along each line. In similar fashion to that occurring for con-tone sampling, halftone reference cell sampling occurs, along axes x and y, in incremental fashion along each halftone sampling line. Two variables pixel_x and pixel_y store the address, in terms of x and y coordinates, of the current sampling location in the halftone reference cell. These variables are appropriately incremented in the fast and slow scan directions by pixel sampling increments $\Delta$pixel_x_fast, $\Delta$pixel_y_fast, $\Delta$pixel_x_slow and $\Delta$pixel_y_slow (also referred to herein as $\Delta$x_fast, $\Delta$y_fast, $\Delta$x_slow and $\Delta$y_slow). These increments are also set during being initialization such that a correct number of halftone dot sample points will be produced to fill each output block. As shown in depiction 260, contone sampling commences at the left starting point of a sampling line, such as line $257_m$, and, through successive incrementation of the sampling address by the fast scan y and x pixel sampling increments $\Delta$y_fast and $\Delta$x_fast, proceeds from one location to the next along this line in order to yield a equally distributed sequence of halftone sampling points, containing illustrative points $261_1$, $261_2$, $261_3$ and $261_4$. When the last sampling location has been reached on a sampling line, the sampling address is incremented by the slow scan pixel sampling increments $\Delta$y_slow and $\Delta$x_slow, to commence sampling at the leftmost location on the next successive sampling line, i.e. line $257_{m+1}$, and so on. Resulting halftone sample points are indicated by the "Xs" located on each sampling line. If any such sample point lies on or in the halftone dot situated within the reference cell, then its corresponding halftoned output value is simply one; else its output value is simply zero. The resulting one and zero output values are the screened halftoned bits that, through the clipping logic, are stored within the output buffer as the values of the writing spots for the output image.

This process of halftone sampling is well known and fully disclosed in, e.g., U.S. Pat. No. 4,918,622 (issued Apr. 19, 1990 to E. M. Granger et al—hereinafter referred to as the '622 Granger et al patent, and also assigned to the present assignee hereof) which is incorporated by reference herein. As such, the reader is referred to the '622 Granger et al patent for further insights into this process. Inasmuch it is not critical to use any particular halftoning process in the invention, any one of a variety of other well known halftoning processes can also be used, if desired.

Lastly, the halftone bits produced by the halftone screener are applied through the clipping logic as indicated in depiction 270 shown in FIG. 2D. As described above, clipping is used to distinguish the "valid" halftone bits, i.e. those situated on or within an output tile in an output block and which are to be written into the output buffer, from the remaining halftone bits within that block which are to be set to zero in the output buffer. As symbolized within depiction 270, screened halftone bits are applied over lead 274 to one input of switch 275. A zero value is applied, via lead 278 to the other input to this switch. Depending upon the value of an AND combination of clipping variables K and L, as produced on lead 276 by AND gate 273 and applied to the control input of switch 275, this switch routes either a halftone screening bit or a zero value to output lead 277. The bits appearing on lead 277 are stored at sequential addresses within the current output block in the output buffer. While the values of clipping variables K and L appearing on leads 271 are both one, the screened halftone bits that are produced by the halftone screener are valid; hence, the output of AND gate 273 is high for these bits, but is zero otherwise.

Figure 6:
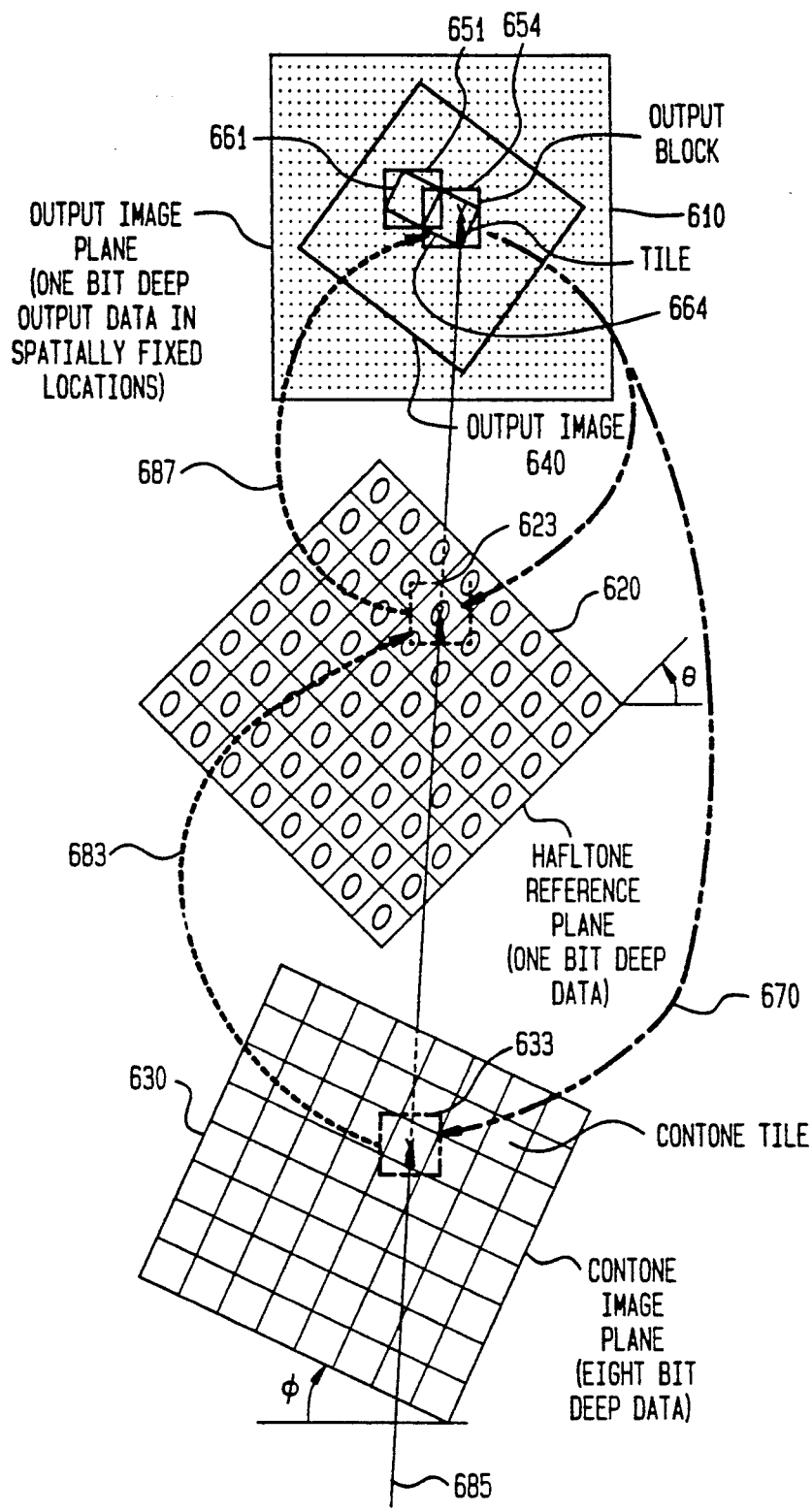
FIG. 6 graphically depicts the linear spatial correspondence among a output sampling location situated within an output block, a halftone sampling location located within a corresponding halftone reference cell and a contone sampling location lying within a corresponding tile, the latter two of which are specified by the output sampling location.

As discussed above, the contone sampling and screening operations occur in lockstep, i.e. in unison, with each producing a corresponding sample point at a time. To clearly visualize the simultaneous incremental pixel movement in the contone image and halftone reference planes and in output image plane (output buffer) and the correspondence between the resulting pixel locations, consider these planes vertically aligned as depicted in FIG. 6. With the incremental sampling distances properly chosen in both contone image plane 630 and halftone reference plane 620, given the contone image rotation angle, $\phi$, the halftone screen angle, $\theta$, and the scale factors ($\alpha$ and $\beta$), then the corresponding current sampling locations in the contone and halftone reference planes along with the current output location in the output image plane will always remain on a common line, specifically line 685, that vertically intersects all three planes. As sampling progresses to another point in each of these three planes line 685 will merely shift its, position accordingly to intersect another set of three vertically aligned points, one in each of these three planes, and so on.

For any block in output image 640, such as blocks 651 and 654 which are to contain output data for tiles 661 and 664, the inventive process operates, in effect and as symbolized by dot-dashed line 670, to sample through corresponding boxes of data, e.g. boxes 633 and 623, in both the contone image plane and the halftone reference plane. The resulting sampled contone values are used, as symbolized by dashed line 683, to select the specific halftone reference plane that is to be sampled. The sampled halftone bits are used, as symbolized by dashed line 687, to fill output locations within corresponding output tiles 661 and 664 in output image plane 610. The inventive process proceeds by filling successive blocks in the output image plane starting at the block in the upper left hand corner of output image 640 and continuing, by processing through corresponding boxes of data in the contone and halftone reference planes, to the lower right hand corner of output image 640 until this image is completely written.

C. Image Processing System Utilizing the Inventive Technique

Figure 7A:
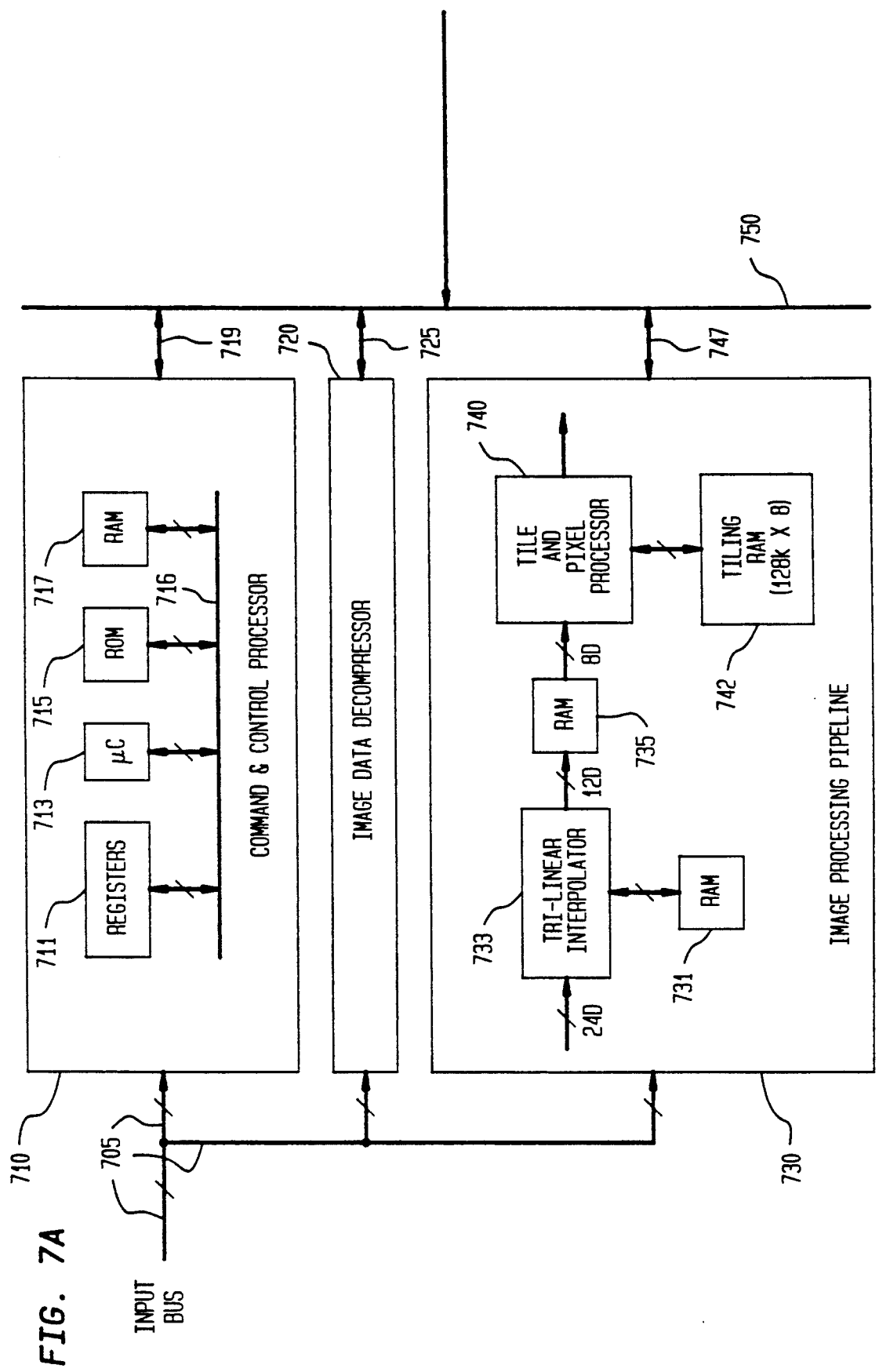

Having now qualitatively described the inventive process, FIGS. 7A and 7B collectively depict a high level block diagram of image processing system 700 that implements this process as part of its image processing functionality. The correct alignment of the drawing sheets for FIGS. 7A and 7B is shown in FIG. 7.

As shown, system 700 is formed of command and control processor 710, image data decompressor 720, image processing pipeline 730 and output buffer and memory management unit 760, all interconnected through bus 750. System 700 accepts incoming image data in the form of packets with appropriate headers on input bus 705. Each of these packets contains one or more specific image processing instructions along with accompanying image data, the latter being typically in compressed form. Command and control processor 710 provides overall control of system 700. In this regard, processor 710 reads the header of each incoming packet and then routes the packet to an appropriate destination for further processing. The processing may be initiated within processor 710 itself, such as in the case of image rotation, scaling or halftoning, or elsewhere, such as within decompressor 720 or image processing pipeline 730. Output buffer and memory management unit 760 provides multiple pages of random access memory (RAM) for temporary storage of processed image data and/or for local use or as a frame memory to hold output image data for a marking engine.

Command and control processor 710 contains registers 711, microcomputer 713, read only memory 715 and RAM 717, all interconnected through local bus 716. This bus, is interfaced, through appropriate circuitry not specifically shown, to input bus 705 and inter-connection busses 719 and 750. Registers 711, which are loadable by and readable through using external Commands applied to leads 705, store various parameters and supply status information for use in providing overall control of system 700 and interfacing thereto to upstream image handling and/or processing systems. Microcomputer 713 is any one of a wide variety of standard commercially available single-chip microcomputers. ROM 715 stores program and constant data. RAM 717 stores multi-level halftone reference (font) data, specifically 16 different 256 level halftone reference cell stacks, and predefined noise data, as discussed below. This RAM is loaded during system initialization using font and noise data appearing on bus 705.

Decompressor 720 accepts packets of incoming image data and decompresses the data, in a well known fashion, to yield decompressed data that is temporarily stored within and subsequently processed by system 700.

Image processing pipeline 730 performs specialized image processing on decompressed image data. This pipeline is comprised of tri-linear interpolator 733, RAM memories 731 and 735, tile and pixel processor (TPP) 740 and tiling. RAM 742. Incoming twenty-four bit image data (24D) is applied to the input of tri-linear interpolator 733 and TPP 740. Specifically, interpolator 733 implements various well-known color transforms on a three-dimensional basis using table lookup and interpolation operations to convert incoming red, green, blue (R,G,B) value into printable cyan, yellow, magenta and black (C,Y,M,K) values. RAM 731 stores various look-up tables used by interpolator 733. These look-up tables, which are rather complex, are generated through use of a "reference" output writer. The tri-linear interpolator provides twelve-bit output data (12D) values which are routed through a look-up table stored within RAM 735. This latter look-up table, which is relatively simple, converts the twelve-bit output data into eight-bit form while providing further compensation to the C,Y,M,K values, such as for dot gain affects and the like, particular to the output writer currently being used. As different output writers (marking engines) are used, the table stored in RAM 735 is changed appropriately to reflect the output characteristics of that writer. By changing the look-up table in RAM 735, no changes need to be made to the rather complex three-dimensional interpolation tables stored in RAM 731. If eight bit (contone) rather than twenty-four bit color input data is applied to interpolator 733, then the contone data is merely passed unchanged through the interpolator and RAM 735 to TPP 740.

The eight-bit data provided by RAM 735 are contone values which are applied to TPP 740. The TPP, in conjunction with microcomputer 713 as will be discussed in detail below, implements the inventive technique for providing tile-based image rotation, scaling and halftone screening. TPP 740 is appropriately configured by microcomputer 913 and processes a full tile of contone data at a time to yield, for example, resulting halftoned output bits therefor. Once the TPP is configured, such as by receiving tile starting coordinates, it processes the complete contone tile independently of microcomputer 713. As such, the microcomputer tiles the entire contone image, calculates the starting, i.e ULC, coordinates for each tile and incremental sampling distances for the contone and halftone reference sampling, supplies this information to the TPP and then instructs the TPP to commence processing the first contone tile. After the TPP has completely processed this tile, the microcomputer updates the starting tile coordinates in the TPP for the next contone tile, commences processing of that tile by the TPP and so on for each successive contone image tile until the entire contone image has been processed. Tiling RAM 742, typically 128 Kybyte-by-8 bits, stores "N" complete lines, i.e. effectively a "strip", of the contone image for use by TPP 740. RAM 742 is formed of high speed RAM but owing to its relatively small size is advantageously far less expensive and complex to implement than a full size frame buffer of comparable speed. Based upon the actual number, "N", of contone image lines stored within RAM 742, TPP 740 can provide image scaling within the range of N to 1/N in each of the fast and slow scan directions.

Output buffer and memory management unit 760 contains address generator 762, memory controller 769 and output buffers 766. Output information is applied from, e.g. pipeline 730, over busses 747 and 750 to unit 760. Within this unit, the address portion of this information is routed, via bus 761, to address generator 762 which translates that address into a block address and routes the block address, via leads 763, to the memory controller. The memory controller translates the block address into an appropriate memory address and routes the latter address, via leads 767, to the address input of output buffers 766. The data portion of the output information is routed, via bus 761, to the data input of buffers 766. These buffers contain multiple pages of RAM 768 which is divided into two equally sized groups, $768_A$ and $768_B$, of page buffers which are collectively operated in a well-known "ping-pong" fashion such that output data can be written into one group of pages, e.g. $768_A$, while data is read from the other group, e.g. $768_B$. The output data read from buffers 768 is supplied, via output data leads 772, to the binary ("bi-level") marking (writing) engine.

Figure 8:
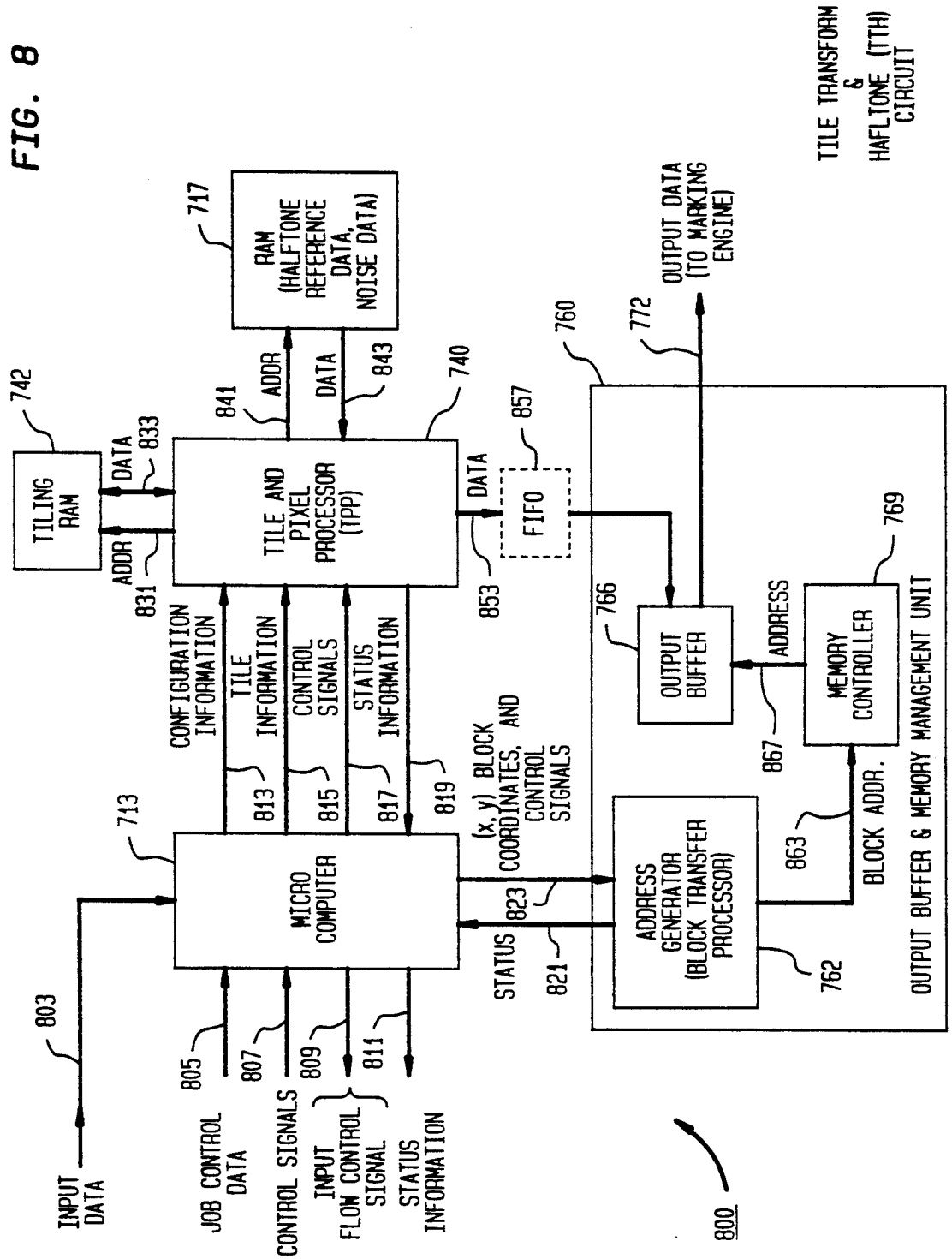
FIG. 8 depicts a block diagram of a two chip implementation (microcomputer 713 and TPP processor 740) of the inventive technique used in system 700 shown in FIGS. 7A and 7B.

Now, turning to the present invention, FIG. 8 depicts a block diagram of a two chip implementation (microcomputer 713 and TPP processor 740) of the inventive technique used in system 700 shown in FIGS. 7A and 7B. This implementation is collectively referred to as tile transform and halftone (TTH) circuit 800.

TTH circuit 800 is formed of microcomputer 713, TPP 740 and output buffer and memory management unit 760. As discussed above, microcomputer 713 calculates the starting point of each tile in a contone image and the incremental sampling distances. The microcomputer also calculates sine and cosine values of the rotation angle, $\phi$, and the screen angle, $\theta$, inasmuch as implementing these functions in software is significantly easier than in the TPP. TPP 740 is a dedicated hardware circuit, specifically formed using a gate array or an application specific integrated circuit (ASIC) or other readily customizable large scale integrated circuit device, which processes each tile by sampling through defined regions in both the contone and halftone reference planes.

Collectively, the microcomputer and its control program together with the TPP implement two nested loops: an outer loop, primarily executing within the microcomputer, for processing each contone tile in the image and an inner loop, executing solely within the TPP, for processing each pixel within each such tile. As discussed in detail below, the microcomputer properly configures the TPP to process each contone tile and then instructs the TPP to fully process that tile. In addition, the microcomputer also establishes, as discussed below, various parameter values that exist for the entire image, such as for scaling parameters, rotation parameters and halftoning parameters. Once established, these parameters remain constant throughout the entire image.

As shown in FIG. 8, input (contone) data is applied, via leads 803, to microcomputer 713 along with job control data (command information) via leads 805. Various supervisory control signals are also applied, via leads 807, to the microcomputer to regulate and control image processing. The microcomputer also provides status information, such as available/busy, on leads 811 and an input flow control signal to lead 809. The status information is connected to upstream circuitry (not shown) to inform it as to the current status of TTH circuit 800. The flow control signal is used to regulate the amount of incoming contone data that the microcomputer will accept at any one time. Microcomputer 713 supplies configuration information via lead 813, tile information via leads 815, and various control signals via lead 817, to TPP 740. The configuration and tile information are numerical parameter values which are required by the TPP to process each successive contone tile in the image. The configuration information is applied once per image while the tile information is updated for each successive contone tile. TPP 740 provides status information, such as an available/busy signal, to the microcomputer. By monitoring the status information provided over leads 819, the microcomputer can calculate parameter values for a successive contone tile as well as perform other tasks while the TPP is undertaking pixel sampling operations for the current tile. In addition, as soon as the TPP has completed its processing and changed its status, the microcomputer, in conjunction with a simple handshake protocol, can load the TPP with parameter values for the next successive contone tile and then initiate tile processing so as to minimize the wait time of the TPP and increase system throughput. As discussed in detail below, the TPP accesses appropriate halftone font and noise data from RAM 717 for use during halftone screening. To do so, the TPP applies appropriate address information (address of the current x,y sampling location), via leads 841, to RAM 717 and, via leads 843, receives resulting halftone and noise data therefrom. Tiling RAM 742 is connected, via address leads 831 and data leads 833, to TPP 740 and stores contone data for an "N" line strip of contone tiles currently being processed. The first strip of contone data is loaded into RAM 742 by microcomputer 713 prior to tile processing with data for each successive strip being loaded after each preceding strip has been completely processed. The data stored in RAM 742 is sampled by the TPP.

As the TPP generates each output bit for a current block in the output image, that bit is stored within FIFO (first in first out) file 857. As such, the FIFO file accumulates the data for the current output block being produced. This FIFO is shown dashed inasmuch as it is would typically be implemented through a buffer read through an asynchronous controller.

After the TPP has generated each block of output data and has signified this event to microcomputer 713, again through a handshake protocol and via a change in its status information appearing on leads 819, the microcomputer supplies the coordinates of that block within the output image, via leads 823, to address generator 762. The address generator, which is a block transfer ("BLTing") processor, converts the image block coordinates into a real block address within output buffer 766. Thereafter, the address generator applies the real block address to the controller and, through the microcomputer, initiates a block transfer of the current block of output data, from FIFO file 857 into output buffer 766. The contents of output buffer 766 appearing on leads 722 are applied to the marking engine in order to print a hard-copy version of the output image.

D. Pseudo-code Description of the Operations Undertaken by Microcomputer 713 and TPP 740

Figure 9A:
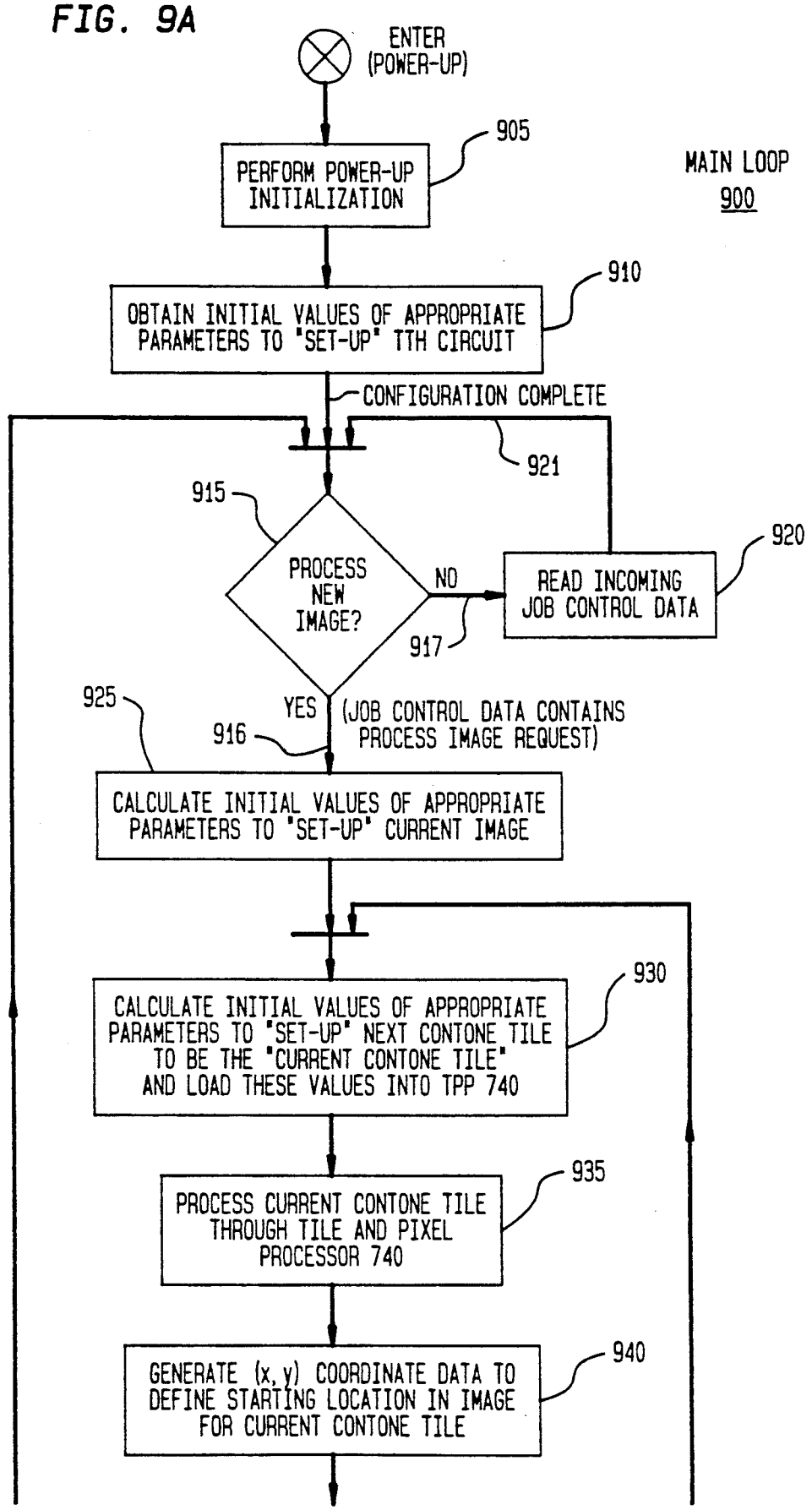

A flowchart of Main Loop 900 executed within microcomputer 713 shown in TTH circuit 800 depicted in FIG. 8 is shown in FIGS. 9A and 9B, for which the correct alignment of the drawing sheets for these figures is shown in FIG. 9. This loop is responsible for processing an entire image and configuring and coordinating the operation of TPP 740 to process each tile in the contone image.

Specifically, upon entry into Main Loop 900, execution first proceeds to block 905 which, when executed, performs a well-known power-up initialization sequence. Thereafter, execution proceeds to block 910 which, when executed, obtains and calculates initial values of various parameters, as discussed below, that will be used to "set-up" TTH circuit 800 in processing any contone image. Once this has occurred, execution proceeds to decision block 915. This block determines whether TTH circuit 800 has been instructed to commence processing a contone image. In the event TTH circuit 800 has not yet been instructed to process an image, execution proceeds, via NO path 917 emanating from this decision block, to block 920. This latter block, when executed, reads any incoming job control data for the latest image processing command. Thereafter, execution loops back to decision block 915 to interpret this command. Alternatively, if TTH circuit 800 has just been instructed to process an incoming contone image, then execution proceeds, via YES path 916 emanating from decision block 915, to block 925. This latter block is executed to calculate initial values of various parameters, as described below, that are constant for the entire image that is to be currently processed.

Once block 925 has fully executed, execution proceeds to block 930 which, when executed, calculates initial values of various parameters, as described below, to identify the contone tile in the image that is to be currently processed. Block 930 then loads the values of these parameters into TPP 740. Thereafter, block 935 executes to instruct TPP 740 to process this tile in the contone image. Thereafter and now while TPP 740 is processing this tile, execution proceeds to block 940. This block, when executed, generates the (x, y) coordinate values for the address of the current block in the output image for which data is now being produced for this contone tile by TPP 740. Thereafter, as shown in FIGS. 9A and 9B, execution proceeds to decision block 945. This decision block merely causes the microcomputer to wait, with execution looping through NO path 946, until TPP 740 has completed processing the current contone tile. When TPP 740 completes processing the current tile, execution then proceeds, via YES path 947 emanating from decision block 945, to block 950. Block 950 when executed, provides the (x, y) block coordinate values to address generator 762 (see FIG. 8) and, upon receipt of a handshake from the address generator confirming the receipt of this address, instructs TPP 740 to initiate a block transfer of the block output data now held for this tile from FIFO 857 into output buffer 766. Once block 950 has fully executed, execution proceeds, as shown in FIGS. 9A and 9B, to decision block 955. This decision block determines whether the contone image has been fully processed, i.e. whether any more contone tiles remain to be processed. In the event that this image has not been fully processed, then decision block 955 routes execution, via NO path 958, back to block 930 to calculate the parameter values for the next successive contone tile in this image, and so on. Alternatively, if the contone image is now fully processed, then decision block 955 routes execution, via YES path 959, back to decision block 915 to await an incoming instruction to process the next image, and so on.

Prior to proceeding with a detailed discussion of the pseudo-code, we will now define the following terms, coordinates and variables to facilitate subsequent understanding and for ease of reference:

| terms | definition |
|---|---|
| delta | —refers to an incremental amount |
| fast/slow | —refers to the fast scan direction which is typically across a page, tile or halftone reference cell. The slow scan direction is orthogonal to the fast scan direction and is typically oriented down a page, tile or halftone reference cell. |
| k, l | —clipping coordinates |
| u, v | —contone sampling address coordinates |
| x, y | —halftone reference cell sampling coordinates |
| p, q | —output image (page) address |

| variables | definition |
|---|---|
| $\Delta tile\_u\_slow$, $\Delta tile\_v\_slow$ $\Delta tile\_u\_fast$, $\Delta tile\_v\_fast$ | —increments for movement from tile to tile in the slow and fast scan directions in the contone image plane |
| tile_u, tile_v | —current contone tile positions |
| $\Delta tile\_x\_slow$, $\Delta tile\_y\_slow$ $\Delta tile\_x\_fast$, $\Delta tile\_y\_fast$ | —increments for movement from tile to tile in the slow and fast scan directions through the halftone reference cell (screening) |
| tile_x, tile_y | —current halftone reference cell tile positions |
| $\Delta tile\_p\_slow$, $\Delta tile\_q\_slow$ $\Delta tile\_p\_fast$, $\Delta tile\_q\_fast$ | —increments for movement from tile to tile through the output buffer in the slow and fast scan directions |
| tile_p, tile_q | —current tile position in the output buffer |
| p_tile_start (=0) q_tile_start (=0) | —tile offsets in the output buffer (ordinarily are zero for tiling) |
| $\Delta p\phi$, $\Delta q\phi$ | —offsets in position between edges of an output block and corners of its corresponding contone tile |
| $\Delta pixel\_x\_slow$, $\Delta pixel\_y\_slow$ $\Delta pixel\_x\_fast$, $\Delta pixel\_y\_fast$ | —pixel sampling increments for movement in the slow and fast scan directions through the halftone reference cell |
| pixel_x, pixel_y | —current pixel sampling position within a block in the halftone reference cell |
| $\Delta pixel\_u\_slow$, $\Delta pixel\_v\_slow$ $\Delta pixel\_u\_fast$, $\Delta pixel\_v\_fast$ | —pixel sampling increments for movement in the slow and fast scan directions through the contone image |
| pixel_u, pixel_v | —current pixel sampling position within a contone box in the contone image |
| $\Delta pixel\_k\_slow$, $\Delta pixel\_l\_slow$ $\Delta pixel\_k\_fast$, $\Delta pixel\_l\_fast$ | —incremental pixel movement of the clipping variables in the slow and fast scan directions through the contone image |
| pixel_k, pixel_l | —current clipping position in terms of pixels in the current contone box being processed in the contone image |
| image_u (=0) image_v (=0) | —initial coordinate of contone image (could be non-zero to clip the image) |
| image_x, image_y | —halftone screen offsets (can be used to offset the screen) |
| block_size, tile_size | —output block size and (contone and output) tile size |
| $\Delta k\_block$, $\Delta l\_block$ $\Delta u\_block$, $\Delta v\_block$ $\Delta x\_block$, $\Delta y\_block$ $\Delta p\_block$, $\Delta q\_block$ | —increments for movement from block to block in various planes (box to box in the contone plane) |
| block_k, block_l block_u, block_v block_x, block_y block_p, block_q | —current block position for the clipping variables, and in the contone image (specifically a contone box), halftone reference cell and in the output (page) buffer |
| $2^{16}$ | —constant ($2^{16}$) used to shift a number into the upper 16 bits of a register |

With these definitions having been made and in mind, the discussion will now proceed with a detailed description of the pseudo-code.

FIG. 10 depicts a flowchart of Tile Processing Routine 1000 that is formed of steps 925-945 that occur in Main Loop 900 shown in FIGS. 9A and 9B. Through the inventive technique, routine 1000 successively processes the tiles that collectively form the contone image to yield a rotated, scaled and/or halftoned output image. This routine sets up various image parameters, then sets up various parameters for the "first" tile in the contone image and thereafter processes the first and, with appropriate incrementation of parameter values specific for each successive contone tile, processes each successive tile until the entire contone image has been processed.

Specifically, upon entry into routine 1000, execution proceeds to "image" set up parameter step 925 to establish the values of various so-called image parameters, i.e. parameter values that remain constant throughout the entire contone image. These parameter values are calculated based upon, for example, the contone rotation angle, $\phi$; anamorphic scale factors, $\alpha$ and $\beta$; the screen angle, $\theta$, and the screen ruling. In particular, upon entry into step 925, block 1010 is executed to set the block and tile sizes. The block size is set based upon the angle through which a tile will be rotated, i.e. the contone image rotation angle $\phi$, with a maximum tile size of 32. Once the block size is established, the tile size is set accordingly. Thereafter, execution proceeds to block 1020 which determines the number of tiles to be processed in the contone image in terms of the number of tiles in each row and the number of columns of tiles. Once this occurs, block 1030 is executed to calculate the incremental coordinate values (appropriate "$\Delta$" values) for pixel movement for the clipping variables,, for contone sampling and sampling through the halftone reference cell. Thereafter, block 1040 is executed to calculate the incremental coordinate values (appropriate "$\Delta$" values) for movement between successive tiles in the contone image plane, in the halftone reference cell and through the output buffer. Once this has occurred, "image" parameter set-up step 925 is completed.

At this point, execution proceeds to "tile" parameter set-up step 930. Upon entry into this step, execution first proceeds to block 1050 which, when executed, calculates the offsets in position of an output block, $\Delta p_\phi$ and $\Delta q_\phi$, caused by rotation of a contone tile associated with its corresponding block. Once these offsets are calculated, execution proceeds to block 1060. The first part of this block, located within step 930, initializes the coordinates to point to beginning (ULC) of the first tile in the contone image. Thereafter, a loop is entered through which the first and then each successive contone tile is sequentially processed to yield output bits which are written into successive pixel locations in the output buffer. In this regard, each output block is filled with a tile of successive output pixels until the entire output image is formed. After each successive tile in the contone image is processed, appropriate tile coordinates are incremented in preparation for processing the next contone tile, and so on. After all the contone tiles have been processed, execution then exits from step 1060 and from routine 1000.

FIG. 11 depicts a flowchart of Block and Tile Size Setting Step 1010 that is executed within Tile Processing Routine 1000 shown in FIG. 10. This step, as discussed above, determines the proper block and tile sizes.

Specifically, upon entry into step 1010, execution proceeds to decision block 1110. This block, when executed, determines if reduction scaling is to occur along either direction in the contone image, i.e. whether the value of scale factors $\alpha$ or $\beta$ is less than one. In the event both of these factors are greater than one, then execution proceeds, via NO path 1115 emanating from decision block 1110 to block 1140. This latter block, when executed, sets the block size to 32 along each dimension, i.e. to produce a block having 32-by-32 output pixel locations. Alternatively, if reduction scaling is to occur along either dimension, then execution proceeds, via YES path 1120 emanating from decision block 1110, to block 1130. This latter block, when executed, sets the block size based upon the scale factors and contone rotation angle, $\phi$. The subscript "f" in connection with the absolute value function appearing in blocks 1130 and 1150 denotes that the absolute value function is to be calculated in appropriate floating point precision. Once the block size has been determined, either through block 1130 or 1140, execution proceeds to block 1150 which, when executed, calculates the tile size. The tile size is based upon the block size and the sine and cosine of the contone image rotation angle, $\phi$, and is maximally one pixel smaller than the block size. After block 1150 has executed, execution exists from step 1010.

FIG. 12 depicts a flowchart of Number of Tile Calculation Step 1020 that is executed within Tile Processing Routine 1000 shown in FIG. 10. As discussed above, step 1020 determines the number of tiles to be processed in the current contone image in terms of the number of tiles in each row and number of columns of such tiles.

Specifically, as shown, upon entry into step 1020, execution proceeds to block 1210. This block, when executed, calculates the number of rows of image tiles that will form the contone image, MAX_ROW, as a function of the height, H, of the contone image (in inches), the anamorphic scale factor in the fast scan direction ($\alpha$), the laser writing and the contone frequencies (in terms of either writing spots per inch or contone samples per inch, respectively) and the tile size. Once this occurs, execution proceeds to block 1220 which, when executed, calculates the number of columns of image tiles that will form the contone image, MAX_COL, as a function of the width, W, of the contone image (also in inches), the anamorphic scale factor in the slow scan direction ($\beta$), the laser writing and the contone frequency, and the tile size. After block 1220 has executed, execution exits from step 1020.

Figure 13:
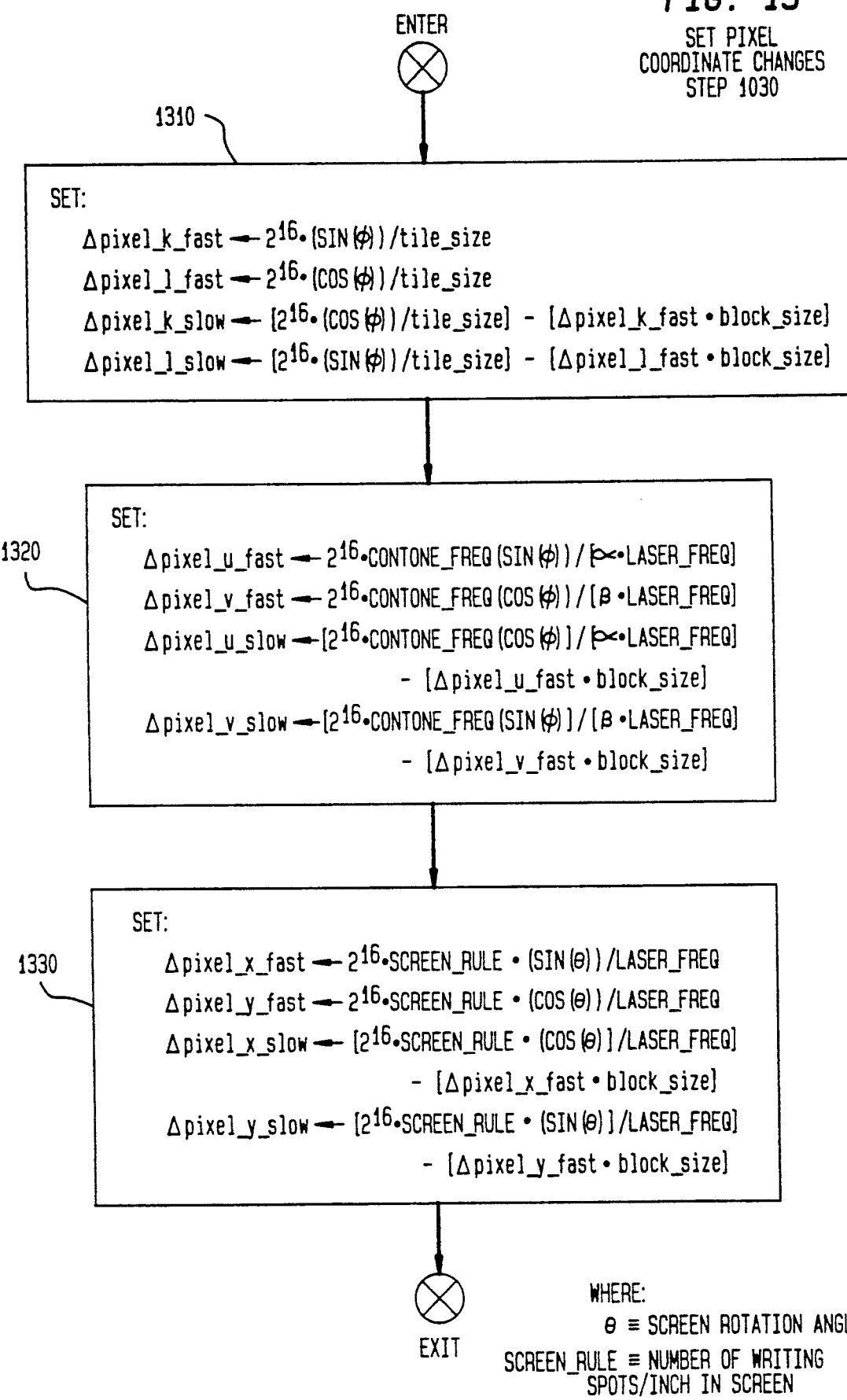
FIG. 13 depicts a flowchart of Set Pixel Coordinate Changes Step 1030 that is executed within Tile Processing Routine 1000 shown in FIG. 10.

FIG. 13 depicts a flowchart of Set Pixel Coordinate Changes Step 1030 that is executed within Tile Processing Routine 1000 shown in FIG. 10. As discussed above, step 1030 calculates the incremental coordinate values (appropriate "$\Delta$" values) for pixel movement for the clipping variables, for contone sampling and sampling through the halftone reference cell. These values remain constant throughout the entire contone image currently being processed.

Specifically, as shown, upon entry into step 1030, execution proceeds to block 1310. This block, when executed, calculates parameter values for the incremental pixel movement in the clipping variables, k and l, i.e. $\Delta pixel\_k\_fast$, $\Delta pixel\_l\_fast$, $\Delta pixel\_k\_slow$ and $\Delta pixel\_l\_slow$, based upon the sine and cosine of the contone image rotation angle, $\phi$, and the tile and block size. Once all the incremental values have been calculated, execution proceeds to block 1320 which, when executed, calculates parameter values for the pixel sampling increments in the contone plane. These parameter values, $\Delta pixel\_u\_fast$, $\Delta pixel\_v\_fast$, $\Delta pixel\_u\_slow$ and $\Delta pixel\_v\_slow$, are determined based upon the anamorphic scale factors, the contone and laser frequencies, the sine and cosine of the contone image rotation angle, $\phi$; and the block size. After all these parameter values have been determined, execution proceeds to block 1330. This block, when executed, calculates parameter values, i.e. $\Delta pixel\_x\_fast$, $\Delta pixel\_y\_fast$, $\Delta pixel\_x\_slow$ and $\Delta pixel\_y\_slow$, for pixel sampling increments in the halftone reference plane. These increments are based upon the screen ruling, the laser frequency, the sine and cosine of the screen angle, $\theta$; and the block size. After these parameter values have been calculated, execution exits from step 1030.

Figure 14:
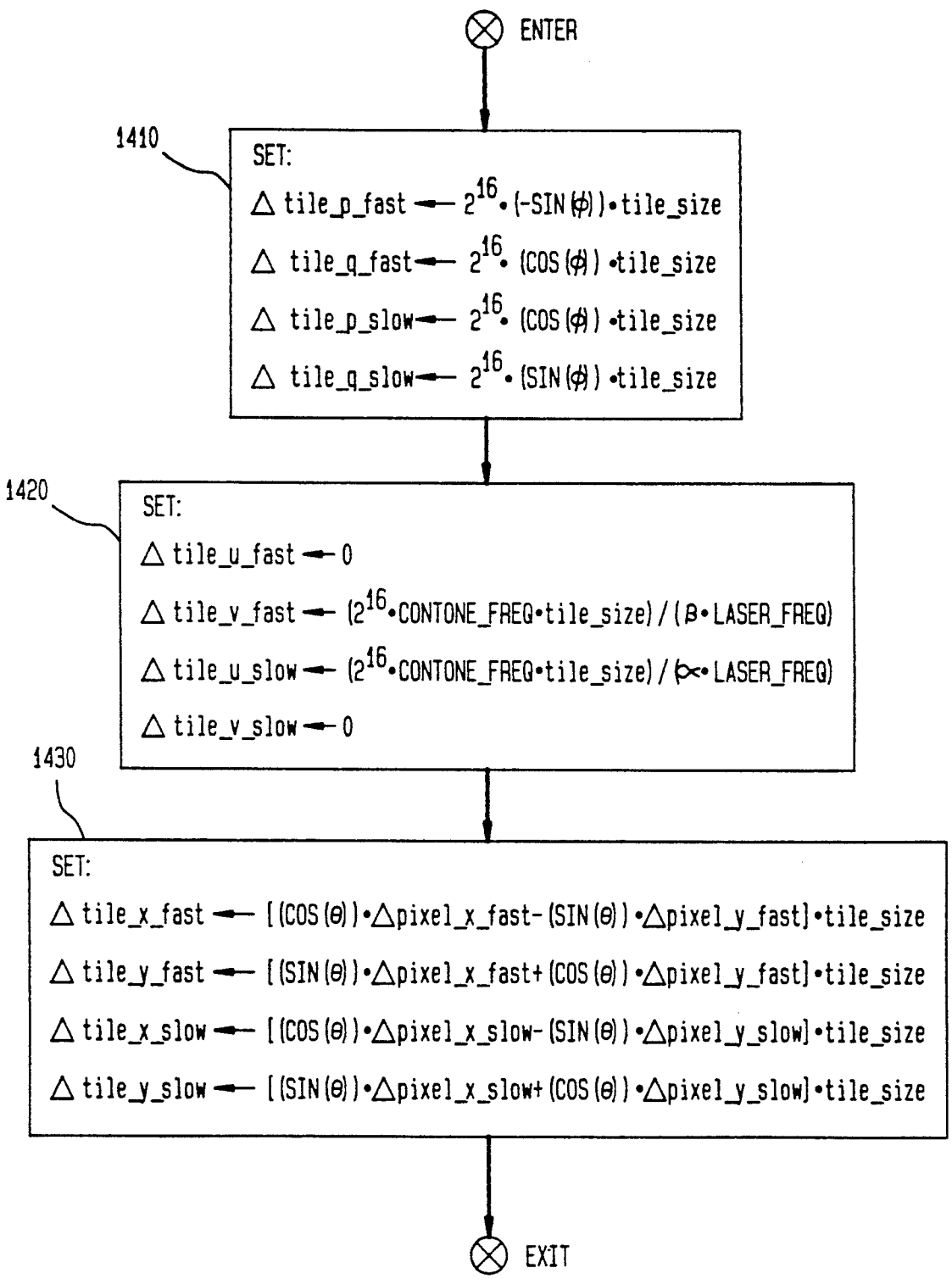
FIG. 14 depicts a flowchart of Set Tile Coordinate Changes Step 1040 that is executed within Tile Processing Routine 1000 shown in FIG. 10.

FIG. 14 depicts a flowchart of Set Tile Coordinate Changes Step 1040 that is executed within Tile Processing Routine 1000 shown in FIG. 10. As discussed above, step 1040 calculates the incremental coordinate values (appropriate "Δ" values) for movement between successive tiles in the contone image plane, in the halftone reference cell and through the output buffer. These values also remain constant throughout the entire contone image currently being processed.

Specifically, as shown, upon entry into step 1040, execution proceeds to block 1410. This block, when executed, calculates parameter values for movement between successive tiles in the output buffer, i.e. $\Delta tile\_p\_fast$, $\Delta tile\_q\_fast$, $\Delta tile\_p\_slow$ and $\Delta tile\_q\_slow$, based upon the sine and cosine of the contone image rotation angle, $\phi$, and the tile size. Once all these values have been calculated, execution proceeds to block 1420 which, when executed, calculates parameter values for movement between successive tiles in the contone plane. The parameter values $\Delta tile\_u\_fast$ and $\Delta tile\_v\_slow$ are both initially set equal to zero. The remaining parameter values, $\Delta tile\_v\_fast$ and $\Delta tile\_u\_slow$, are determined based upon the anamorphic scale factors, the contone and laser frequencies and the tile size. After all these parameter values have been determined, execution proceeds to block 1430. This block, when executed, calculates parameter values, i.e. $\Delta tile\_x\_fast$, $\Delta tile\_y\_fast$, $\Delta tile\_x\_slow$ and $\Delta tile\_y\_slow$, for movement between successive tiles in the halftone reference plane. These increments are based upon the sine and cosine of the screen angle, $\theta$; the tile size and the pixel sampling increments in the halftone reference plane. After these parameter values have been calculated, execution exits from step 1040.

As noted above, offsets will arise, owing to tile rotation and truncation associated with integer block addressing, between the edges of successive output blocks and corresponding contone tiles. In order to ensure that sampling in the contone image will correspond to correct integer locations in the output buffer, the offset between the "real" contone sampling locations in a tile and the corresponding integer pixel addresses for an output block must be determined for a contone tile. These offset values only need to be determined once and are then subsequently used in compensating the initial sampling positions for each contone tile. In doing this, the upper left hand corner (ULC) of each block is readily determinable to floating point precision. However, the integer sampling addresses can vary, owing to truncation, by as much as approximately one bit thereby causing as much as a one bit shift up and to the left in the position of each tile. By determining the offsets and consequently modifying the initial sampling positions for each and every contone tile by the values of the offsets, no sampling errors will arise while each contone tile is being sampled and hence all the contone tiles will be correctly aligned.

Figure 15:
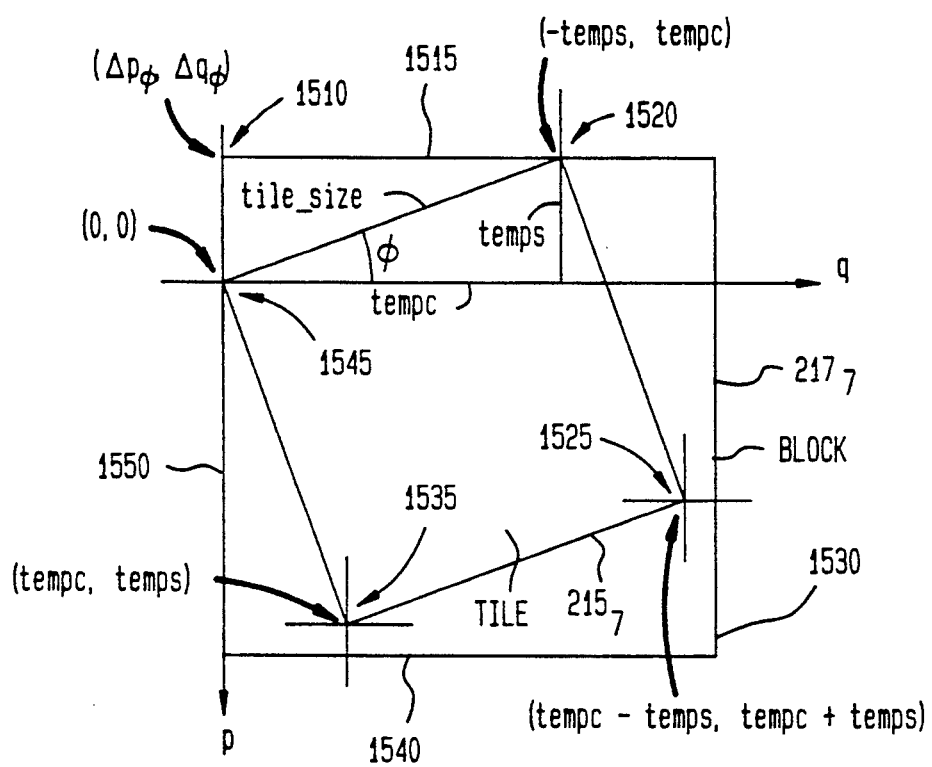
FIG. 15 graphically shows offset positions situated between the edges of an output block and corners of its corresponding tile caused by rotation of the tile within the block.

In this regard, FIG. 15 graphically shows offset positions situated between the edges of output block 217$_7$ and corners of corresponding contone tile 215$_7$ caused by rotation of the tile within the block. Block 217$_7$ is square with edges 1515, 1530, 1540 and 1550. Tile 215$_7$ is sized to maximally fit within the block and is oriented, given contone rotation angle $\phi$, such that its ULC 1545, carrying sampling coordinates (0,0), are aligned with left edge 1550 of the block. The location of three other corners 1520, 1525 and 1535 of the tile are given, with reference to the ULC of the tile, i.e. coordinate (0,0) on the (p, q) axes, by coordinates (−temps, tempo, (tempc−temps, tempc+temps) and (tempo, temps). As will be seen in FIGS. 16A and 16B, the positional sampling offsets, $\Delta p_\phi$ and $\Delta q_\phi$, are respectively defined as being min(0, temps, tempc-temps, −temps) and min(0, tempc, tempc+temps, temps). Distances tempc and temps are defined in terms of the tile size and the cosine and sine of the contone rotation angle, $\phi$, respectively.

Figure 16A:
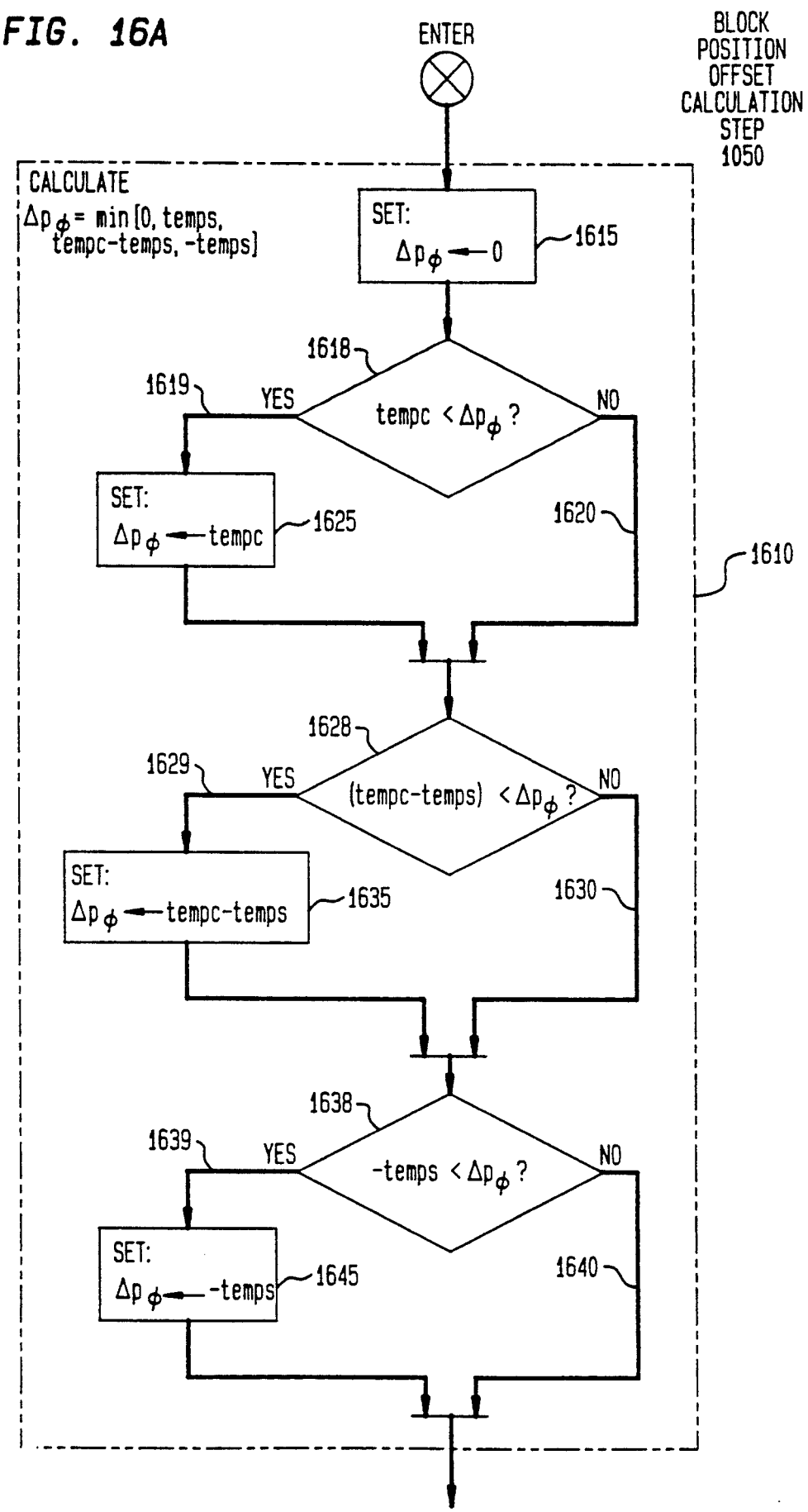
FIGS. 16A and 16B collectively depict a flowchart of Block Position Offset Calculation Step 1050 that is executed within Tile Processing Routine 1000 shown in FIG. 10.
Figure 16B:
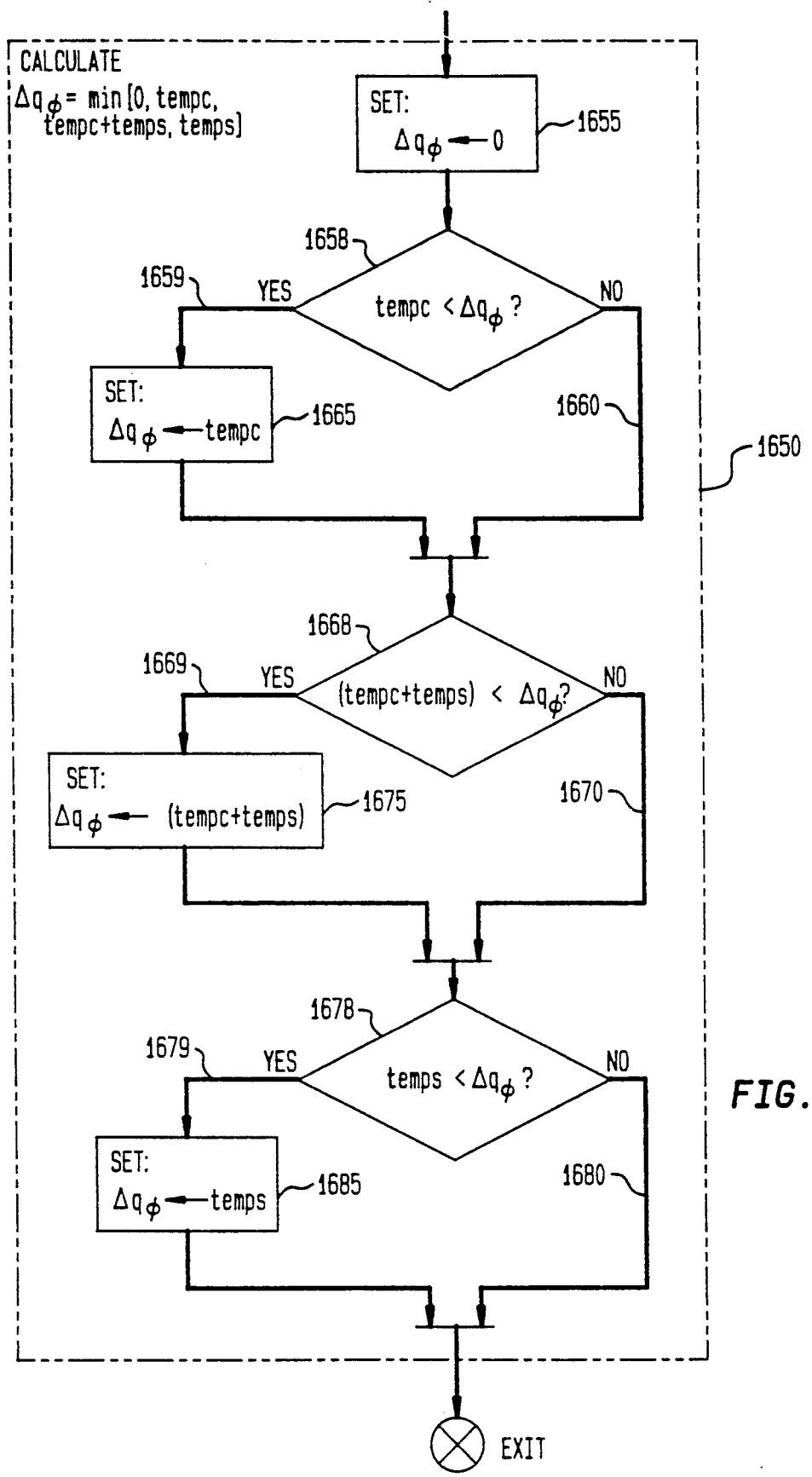
Figure 16:
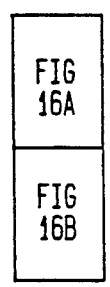
FIG. 16 depicts the correct alignment of the drawing sheets for FIGS. 16A and 16B.

Given this explanation of the offsets, FIGS. 16A and 16B collectively depict a flowchart of Block Position Offset Calculation Step 1050 that is executed within Tile Processing Routine 1000 shown in FIG. 10 to calculate the value of offsets $\Delta p_\phi$ and $\Delta q_\phi$. The correct alignment of the drawing sheets for FIGS. 16A and 16B is shown in FIG. 16. Step 1050 is formed of $\Delta p_\phi$ Calculation Step 1610 and $\Delta q_\phi$ Calculation Step 1650. Step 1610 calculates the value of $\Delta p_\phi$ as being the most negative, i.e. min, of (0, temps, tempc-temps, −temps); while step 1650 calculates the value of $\Delta q_\phi$ as being the most negative, i.e. min, of (0, tempc, tempc+temps, temps).

Specifically, upon entry into step 1050, execution proceeds to $\Delta p_\phi$ Calculation Step 1610 wherein block 1615 is first executed. This block sets the initial value of $\Delta p_\phi$ to zero. Thereafter, execution proceeds to decision block 1618 which tests whether the value tempc is negative, i.e. less than the initial value of $\Delta p_\phi$ which is zero. In the event that the value tempc is negative, then execution proceeds, via YES path 1619, to block 1625 which, when executed, sets the current value of $\Delta p_\phi$ equal to the value tempc and routes execution to decision block 1628. Alternatively, if the value tempc is not negative, then decision block 1618 merely routes execution, via NO path 1620, to decision block 1628. This latter decision block determines whether the value tempc-temps is less than the current value of $\Delta p_\phi$. In the event that the value tempc-temps is less than the current value of $\Delta p_\phi$, then decision block 1628 routes execution, via YES path 1629, to block 1635 which sets the current value of $\Delta p_\phi$ equal to the value tempc-temps. Execution then proceeds to decision block 1638. Execution will also reach this decision block if decision block 1628 determines that the current value of tempc-temps is greater or equal to the current value of $\Delta p_\phi$. Decision block 1638 determines whether the value −temps is less than the current value of $\Delta p_\phi$. In the event that the value −temps is less than the current value of $\Delta p_\phi$, then decision block 1638 routes execution, via YES path 1639, to block 1645 which sets the current value of $\Delta p_\phi$ equal to the value −temps. Execution then exits from step 1610. Alternatively, if the value of −temps is greater than or equal to the current value of $\Delta p_\phi$, then execution merely exits from step 1610 via NO path 1640 emanating from decision block 1638.

Once step 1610 has fully executed to determine the current value of $\Delta p_\phi$ for the current tile being processed, step 1650 executes to calculate the value of $\Delta q_\phi$ for this tile. Specifically, upon entry into step 1650, execution proceeds to block 1655, which, when executed, sets the initial value of $\Delta q_\phi$ to zero. Thereafter, execution proceeds to decision block 1658 which tests whether the value tempc is negative, i.e. less than the initial value of $\Delta q_\phi$ which is zero. In the event that the value tempc is negative, then execution proceeds, via YES path 1659, to block 1665 which, when executed, sets the current value of $\Delta q_\phi$ equal to the value tempc and routes execution to decision block 1668. Alternatively, if the value tempc is not negative, then decision block 1658 merely routes execution, via NO path 1660, to decision block 1668. This latter decision block determines whether the value tempc+temps is less than the current value of $\Delta q_\phi$. In the event that the value tempc+temps is less than the current value of $\Delta q_\phi$, then decision block 1668 routes execution, via YES path 1669, to block 1675 which sets the current value of $\Delta q_\phi$ equal to the value tempc+temps. Execution then proceeds to decision block 1678. Execution will also reach this decision block if decision block 1668 determines that the current value of tempc+temps is greater or equal to the current value of $\Delta q_\phi$. Decision block 1678 determines whether the value temps is less than the current value of $\Delta q_\phi$. In the event that the value temps is less than the current value of $\Delta q_\phi$, then decision block 1678 routes execution, via YES path 1679, to block 1685 which sets the current value of $\Delta q_\phi$ equal to the value temps. Execution then exits from step 1650. Alternatively, if the value of temps is greater than or equal to the current value of $\Delta q_\phi$, then execution merely exits from step 1650 via NO path 1680 emanating from decision block 1678.

A high level flowchart of Tile Processing Step 1060 that is executed within Tile Processing Routine 1000 shown in FIG. 10 is depicted in FIG. 17. As discussed, step 1060 initializes the coordinates to point to the beginning (ULC) of the first tile in the contone image and thereafter, through looping, processes the first and then each successive contone tile in sequence to completely fill each corresponding output block in the output image with output bits. In addition, after each successive tile in the contone image is processed, step 1060 increments appropriate tile coordinates in preparation for processing the next successive contone tile.

Specifically, as shown in FIG. 17, upon entry into step 1060, execution first proceeds to block 1710. This block, when executed, initializes various tile-based parameters for the first tile in the image. Thereafter, execution proceeds through two nested loops, outer loop 1720 and inner loop 1730, to sequentially process each and every tile in the contone image. In particular, outer loop 1720 processes an entire row of tiles at a time, while inner loop 1730 processes each tile in each row. Upon entry into loops 1720 and 1730, execution first proceeds to block 1740 located within the inner loop. This block, when executed, calculates the location (block_p, block_q) of the current output block in the output (page) buffer. Thereafter, execution proceeds to block 1750 which, when executed, calculates the values of various increments specific to the current contone tile being processed, i.e. $\Delta p\_block$, $\Delta q\_block$, $\Delta k\_block$, $\Delta l\_block$, $\Delta u\_block$, $\Delta v\_block$, $\Delta x\_block$ and $\Delta y\_block$. Once this occurs, execution proceeds to block 1760 which, when executed, uses these increments to initialize the value of various parameters that are also specific to the current tile being processed, i.e. block_k, block_l, block_u, block_v, block_x and block_y. Thereafter, execution proceeds to block 1770 which, as described below, completely processes the current contone tile. Once the current contone tile has been processed by step 1770, execution proceeds to step 1780 which increments various fast scan based parameters for the next successive contone tile in the current row being processed. Once this occurs, step 1770 processes this contone tile, and so on until an entire row of contone tiles has been processed. Once this tile processing has concluded, execution passes from the inner loop to block 1790 located within outer loop 1720. This block increments various slow scan parameters to point to the first contone tile in the next successive row in the contone image. Once this occurs, execution returns to inner loop 1730 to process all the tiles in this row, and so on. Once all the rows of contone tiles have been processed, execution then exits from outer loop 1720 and from tile processing step 1060.

Figure 18A:
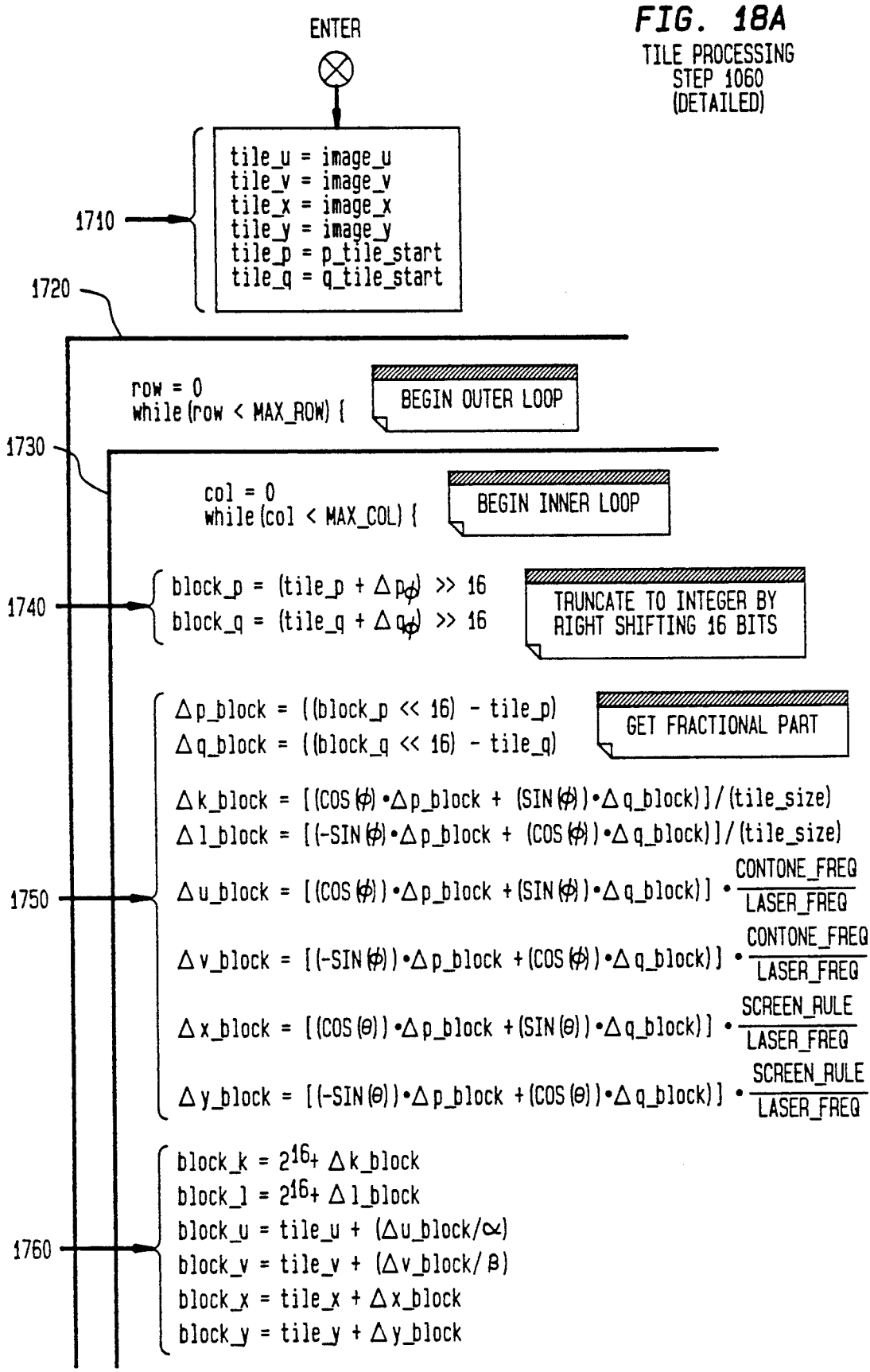
FIGS. 18A and 18B collectively depict a detailed flowchart of Tile Processing Step 1060 shown in FIG. 17.
Figures 18, 18B:
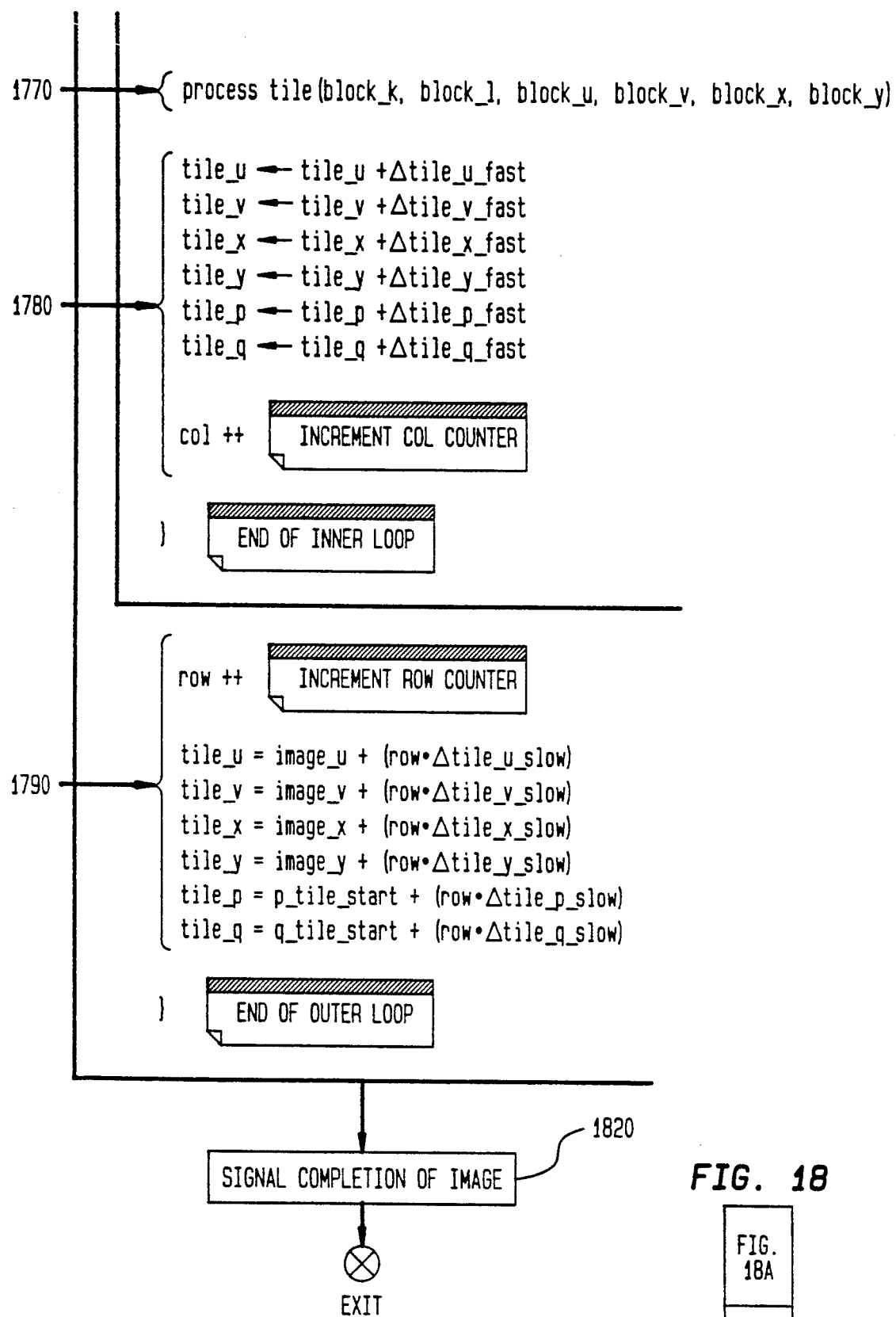
FIG. 18 depicts the correct alignment of the drawing sheets for FIGS. 18A and 18B.

A detailed flowchart of Tile Processing Step 1060 shown in FIG. 17 is collectively depicted in FIGS. 18A and 18B, for which the correct alignment of the drawing sheets for these figures is shown in FIG. 18. The individual steps that form blocks 1710-1790 in FIG. 17 are shown in FIGS. 18A and 18B.

As shown, upon entry into step 1060, execution proceeds to block 1710 which determines the values of parameters tile_u, tile_v, tile_x, tile_y, tile_p and tile_q for the first contone tile in the image as equalling the values of parameters image_u, image₁₃ v, image_x, image_y, p_tile_start and q_tile_start, respectively. Outer and inner loops 1720 and 1730 are now entered. Next, block 1740 is executed to set the output coordinates of the current block, i.e. block_p and block_q, to the current values of tile_p and tile_q plus the corresponding offset values, $\Delta p_\phi$ and $\Delta q_\phi$, with the result being right shifted 16 bit positions to yield integer block addresses. Thereafter, block 1750 executes to compute incremental values of $\Delta p_{13} block$, $\Delta q\_block$, $\Delta k\_block$, $\Delta l\_block$, $\Delta u\_block$, $\Delta v\_block$, $\Delta x\_block$ and $\Delta y\_block$ specific to the first contone tile being processed in the contone image. In this regard, $\Delta p\_block$ and $\Delta q\_block$ are formed of what would be the fractional address portions of the block addresses. Of the remaining tile based increments, values of $\Delta k\_block$, $\Delta l\_block$, $\Delta u\_block$ and $\Delta v\_block$ are calculated based upon the sine and cosine of the contone image rotation angle, $\phi$, the values of $\Delta p\_block$ and $\Delta q\_block$, tile size, and the contone and laser frequencies. Values of the two remaining tile based increments, $\Delta x\_block$ and $\Delta y\_block$, are determined based upon the sine and cosine of the screen angle, $\theta$, the values of $\Delta p\_block$ and $\Delta q\_block$, the screen ruling and laser frequency. Once these incremental values have been determined through block 1750, block 1760 executes to calculate initial values for tile based parameters block_k, block_l, block_u, block_v, block_x and block_y based upon these increments. These parameters are also specific to the current contone tile being processed. Thereafter, block 1770 executes to entirely process the current contone tile, as defined by the parameter values determined through the immediately preceding block. Once this contone tile has been completely processed and assuming additional contone tiles remain to be processed in the current row, then the tile based parameters, tile_u, tile_v, tile_x, tile_y, tile_p and tile_q, are incremented in block 1780 by the appropriate and respective tile based increments in the fast scan direction, i.e. $\Delta tile\_u\_fast$, $\Delta tile\_v\_fast$, $\Delta tile\_x\_fast$, $\Delta tile\_y\_fast$, $\Delta tile\_p\_fast$ and $\Delta tile\_q\_fast$, to define the next contone tile in the current row. The tile column counter, col, is also incremented by one. At this point with at least one additional contone tile to process in the current row, execution loops back to block 1740 to process that tile, and so on. If, however, all tiles in the current row have been processed, then execution leaves inner loop 1730 and proceeds to block 1790. Assuming that at least one additional row of contone tiles remains to be processed in the contone image, then the tile based parameters, tile_u, tile_v, tile_x, tile_y, tile_p and tile_q, are incremented in block 1790 by the appropriate and respective tile based increments in the slow scan direction, i.e. Δtile_u_slow, Δtile_v_slow, Δtile_x_slow, Δtile_y_slow, Δtile_p_slow and Δtile_q_slow, to define the first contone tile in the next successive row. The row column counter, row, is also incremented by one. At this point with at least one additional row of contone tiles to process, execution loops back to block 1740 to successively process each contone tile in that row, and so on. Once all the rows of tiles in the contone image have been processed, execution exits from outer loop 1720 and proceeds to block 1820 which generates an appropriate signal that the contone image has now been completely processed. After this occurs, execution exits from step 1060.

Figure 19:
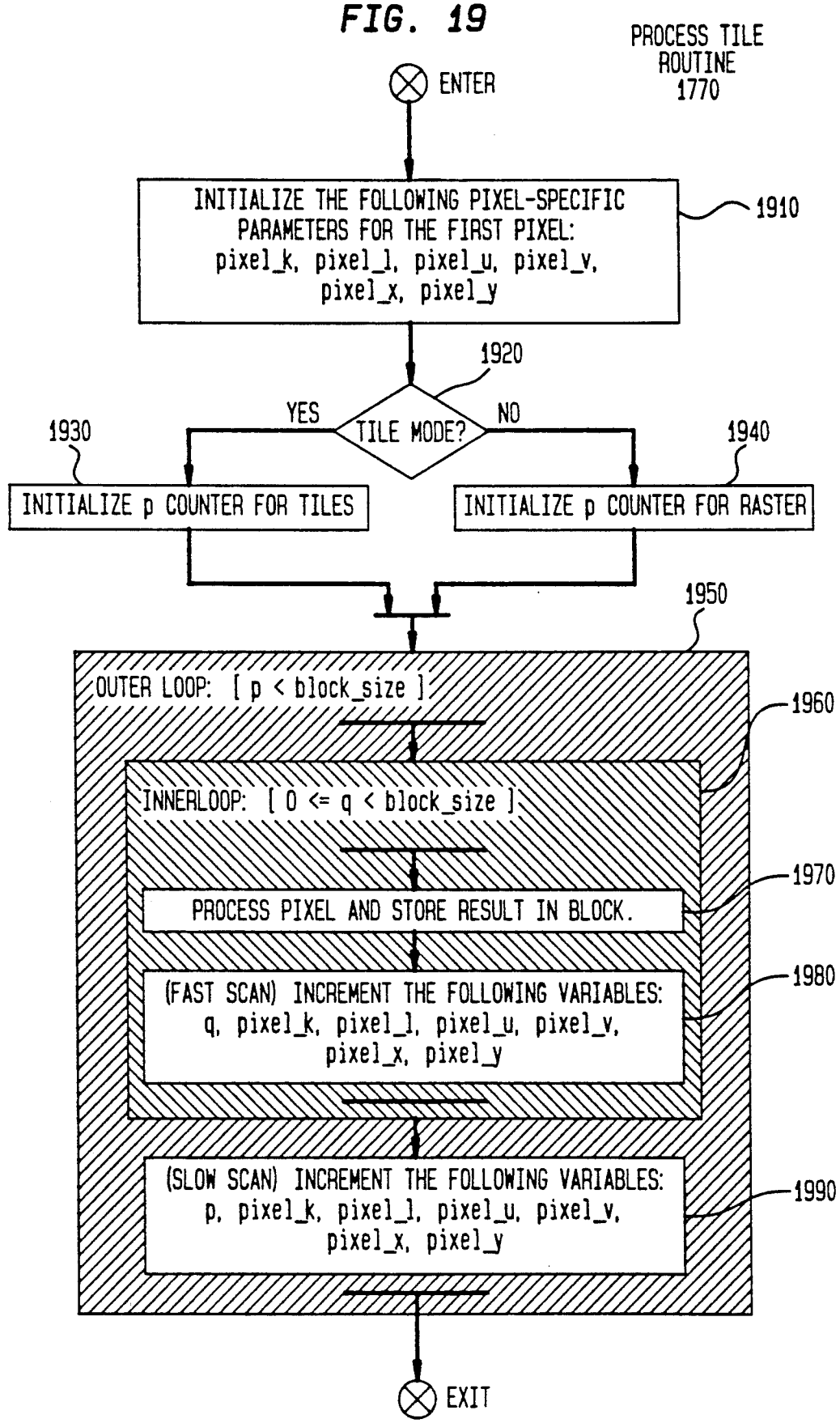
FIG. 19 depicts a high level flowchart of Process Tile Routine 1770 that is executed as part of Tile Processing Step 1060 shown in FIGS. 18A and 18B.

A high level flowchart of Process Tile Routine 1770, that is executed as part of Tile Processing Step 1060 shown in FIGS. 18A and 18B, is depicted in FIG. 19. As discussed above, this routine processes an entire tile through rotation, scaling and/or halftoning, as desired.

Specifically, as shown, upon entry into routine 1770, execution first proceeds to block 1910. This block, when executed, initializes the values of various pixel-based parameters for the first pixel in the current output block that is being generated. Once this occurs, execution proceeds to decision block 1920 which determines, based upon prior user input, whether tiles (i.e. tile mode) or a single raster of pixels are to be processed. A single ranter of pixels is processed usually if the contone image is not to be rotated. In the event that tiles are to be processed, decision block 1920 routes execution, via its YES path, to block 1930 which, when executed, initializes the p counter for tiles. Otherwise, if a single raster of pixels is to be used, then decision block 1920 routes execution, via its NO path, to block 1940, which, when executed, initializes the p counter for the raster. After either block 1930 or 1940 has executed, execution enters two nested loops: outer loop 1950 and inner loop 1960. The outer loop processes an entire row of pixels at a time, while the inner loop processes each pixel in each row. Specifically, upon entry into loops 1950 and 1960; execution first proceeds to block 1970 located within the inner loop. This block, when executed, obtains data, through clipped sampling in both the contone and halftone reference planes, for the currently addressed pixel in the output block and stores the result at that pixel location in the output block. Thereafter, execution proceeds to block 1980 which, when executed, increments, in the fast scan direction, the values of various parameters (i.e. q, pixel_k, pixel_l, pixel_u, pixel_v, pixel_x and pixel_y) for subsequent use in generating an output value for the next successive pixel in the current row of the output block. Once the entire row of pixels has been written into the output block, execution passes from the inner loop to block 1990 located within outer loop 1950. This block increments various parameters in the slow scan direction, specifically p, pixel_k, pixel_l, pixel_u, pixel_v, pixel_x and pixel_y, for use in generating an output value for the first pixel in the next successive row in the current output block. Once this occurs, execution returns to inner loop 1960 to process all the pixels in this row, and so on. Once all the rows of pixels in the current output block have been written, execution then exits from outer loop 1950 and from pixel processing routine 1770.

Figure 20:
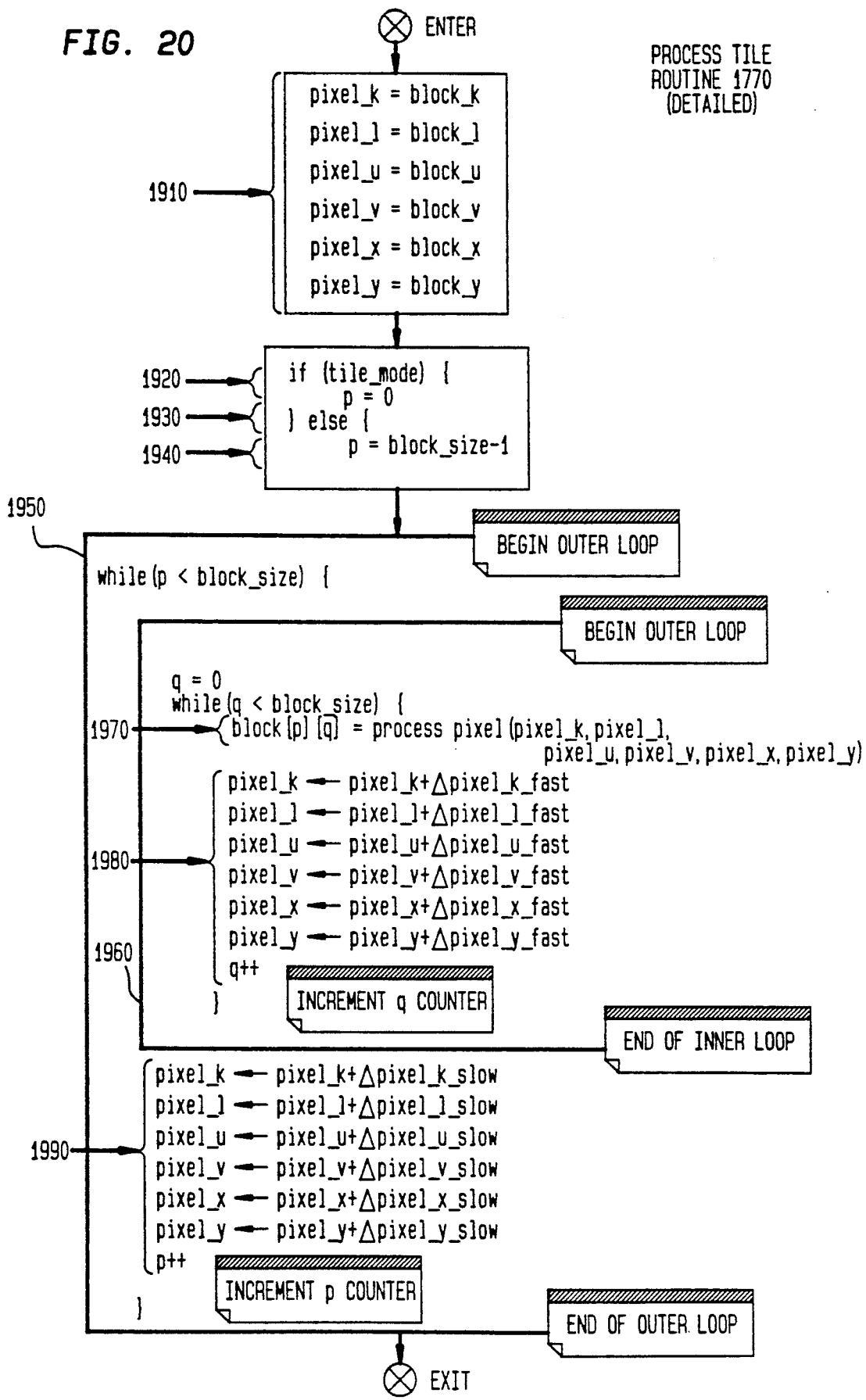
FIG. 20 depicts a detailed flowchart of Process Tile Routine 1770 shown in FIG. 19.

A detailed flowchart of Process Tile Routine 1770 shown in FIG. 19 is depicted in FIG. 20. The individual steps that form blocks 1910-1990 in FIG. 19 are shown in FIG. 20.

As shown, upon entry into step 1770, execution proceeds to block 1910 which determines the values of parameters for the first pixel in the current output block that is being generated: pixel_k, pixel_l, pixel$_{13}$ u, pixel_v, pixel_x and pixel_y. Thereafter, counter p is initialized, via steps 1920-1940, to either the value zero or the value block_size-1, respectively, depending upon whether the tile mode is being used or not. Once this occurs, execution enters outer loop 1950 and inner loop 1960. Within the inner loop, which executes for every pixel in each row in the output block, execution first proceeds to block 1970 to generate, through the process pixel routine (as discussed in detail below), an output value for the current pixel in this row and to store this output value in that pixel in that output block. Thereafter, block 1980 increments the values of parameters pixel_k, pixel_l, pixel_u, pixel_v, pixel_x and pixel_y, in the fast scan direction, using the increments Δpixel_k_fast, Δpixel_l_fast, Δpixel_u_fast, Δpixel_v_fast, Δpixel_x_fast and Δpixel_y_fast, respectively, for use in subsequently generating an output value for the next successive pixel in the current row of the output block. The current contents of the q counter are also incremented by one to point to the next successive pixel in the current row in the output block. At this point with at least one additional pixel value to generate in the current row in the output block (or raster), execution loops back to block 1970 to obtain an output value for that pixel, and so on. If, however, output values for all pixels in the current row (or raster) have been written, then execution leaves inner loop 1960 and proceeds to block 1990 in the outer loop. Assuming that output values for at least one additional row of pixels remain to be written in the output block, then the pixel parameters, specifically pixel_k, pixel_l, pixel_u, pixel_v, pixel_x and pixel_y, are incremented, through step 1990, in the slow scan direction, using the corresponding increments, Δpixel_k_slow, Δpixel_l_slow, Δpixel_u_slow, Δpixel_v_slow, Δpixel_x_slow and Δpixel_y_slow, for subsequent use in generating an output value for the first pixel in next successive row of the output block. The current contents of the p counter are also incremented by one to point to the next successive row of output pixels in the current block. If, alternatively, output values have been written for all the rows of pixels in the output block, then execution exits from outer loop 1950 and from routine 1770.

Figure 21:
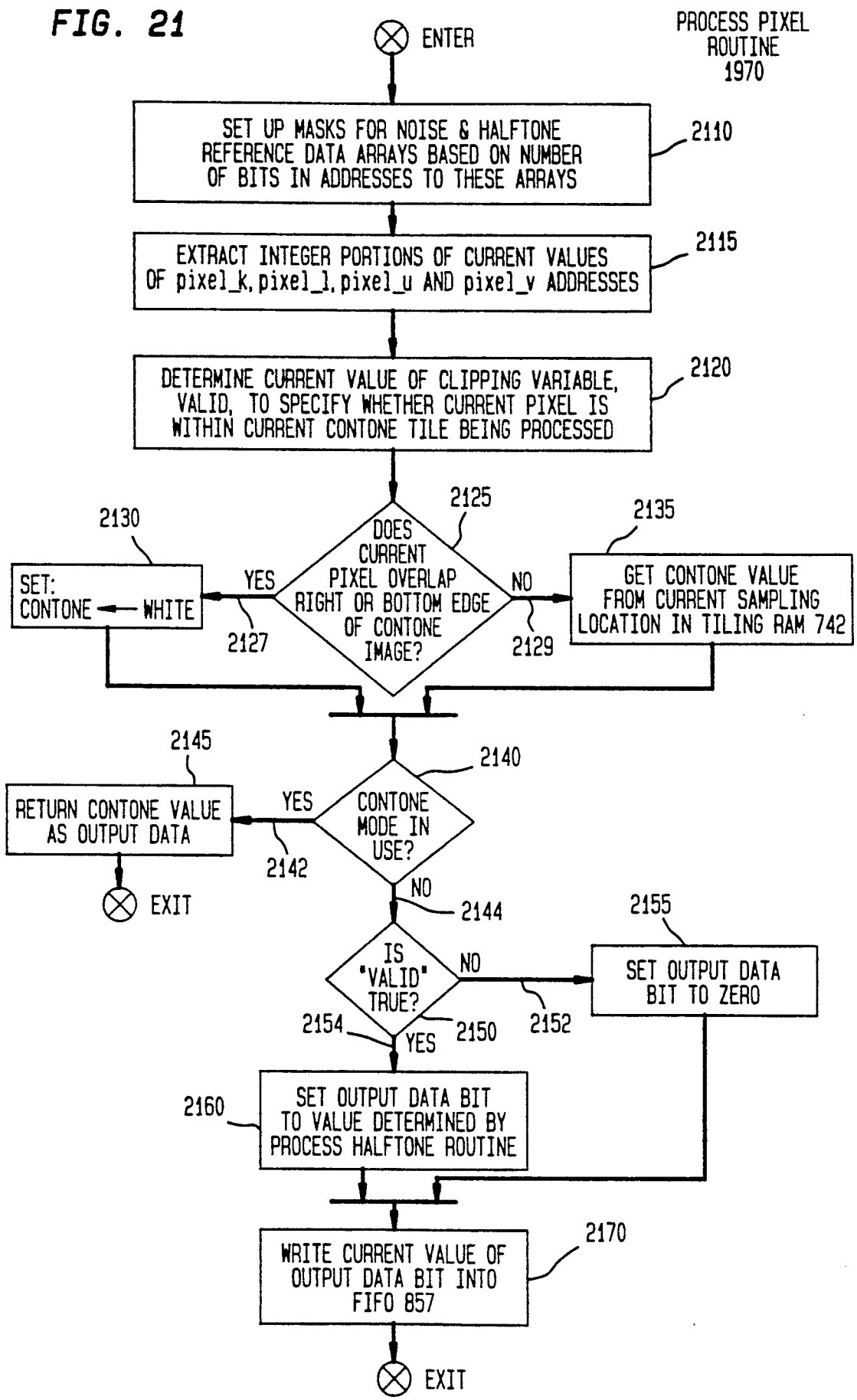
FIG. 21 depicts a high level flowchart of Process Pixel Routine 1970 that is executed as part of Process Tile Step 1970 shown in FIG. 20.

A high level flowchart of Process Pixel Routine 1970 that is executed as part of Process Tile Step 1970 shown in FIG. 20 is depicted in FIG. 21. This routine, as discussed above, obtains data, through clipped sampling in both the contone and halftone reference planes, for the currently addressed pixel in the output block and stores the result at that pixel location in that output block.

Specifically, as shown, upon entry into routine 1970, execution first proceeds to block 2110. This block, when executed, establishes two masks, one for accessing the noise data array and the other for accessing an appropriate halftone reference data array, both from RAM 20, 717 (see FIGS. 7 and 8). Each of these masks are used to isolate the proper bits within the pixel_x and pixel_y addresses for use in addressing each of these arrays. Once these masks are established, execution proceeds, as shown in FIG. 21, to block 2115 which, when executed, extracts the integer portion of current pixel addresses pixel_k, pixel_l, pixel_u and pixel_v.

Thereafter, block 2120 executes to determine the current value of the clipping variable, VALID, and thereby specify whether the current pixel that is being generated for inclusion within the current output block lies within a corresponding output tile. As noted above, the value of variable VALID is formed of the AND combination of only the lowest order integer bit in both the K and L clipping addresses for this pixel. This bit is isolated by "ANDing" the pixel_x and pixel_y addresses with a pre-defined mask, i.e. "0×0001" where "0×" defines hex notation. Once block 2120 has fully executed, execution proceeds to decision block 2125. This latter block, when executed, determines based upon the current integer pixel address, whether the current sampled pixel in the contone image will overlap an edge of that image. If such an overlap occurs, then decision block 2125 routes execution, via YES path 2127, to execution block 2130. This latter block, when executed, sets the sampled contone value for this pixel to a predefined number associated with the color white. Alternatively, if the current sampled pixel in the contone image lies within the image, i.e. does not overlap an image edge, then decision block 2125 routes execution, via NO path 2129, to block 2135. This latter block obtains the sampled contone value for this pixel from tiling RAM 742 (see FIGS. 7 and 8).

Thereafter, as shown in FIG. 21, execution proceeds to decision block 2140. This decision block determines, based upon prior user input, whether halftone screening is to occur, i.e whether the "contone model" is not currently in use. If screening is not to occur, hence contone rather than halftone values are to be provided to the output buffer resulting in a continuous rather than halftoned output image, then decision block 2140 routes execution, via YES path 2142, to block 2145. This latter block, when executed, merely supplies the sampled contone value as the output data for the current pixel in the output buffer. Thereafter, execution exits from routine 1970. Alternatively, if halftone screening is to occur, then decision block 2140 routes execution, via NO path 2144, to decision block 2150. This latter decision block routes execution, based upon the current value of the clipping variable, VALID, to either block 2155 or 2160 if the current addressed bit in the output block is to be respectively set to zero or to a screened output value. If the current output bit lies outside an output tile associated with an output block, that bit is to be set to zero. In that case, decision block 2150 routes execution, via NO path 2152, to block 2155. This latter block sets the output bit to zero. Block 2170 then executes to write this zero value into the current bit location in the output block, specifically within FIFO 857 (see FIG. 8). Once block 2170 has executed, then, as shown in FIG. 21, execution exits from routine 1970.

Alternatively, if the current output bit lies within the corresponding output tile in the output block, then this bit is to contain a screened output value. As such and as shown in FIG.- 21, decision block 2150 routes execution, via YES path 2154, to block 2160. This latter block, when executed, appropriately samples the halftone reference stack—the specific cell being selected by the present contone value associated with this output bit, including selecting the specific halftone stack (font) to use and/or varying the halftone sampling address itself using an addressed noise value (as discussed in detail below). In particular, the noise data array within RAM 717 is addressed using those bits of the pixel_x and pixel_y addresses. This array contains a seamless pseudo-random array of pre-stored four-bit noise data which is used to select one of sixteen different halftone reference stacks (fonts). These stacks store different pre-defined halftone dot patterns. The specific patterns are not critical. However, through random font selection, spatially repeating artifacts, such as Moire patterns and the like, that would otherwise be displayed in the output image due to the beating of the spatial sampling frequencies against the stored halftone dot patterns advantageously will be broken up and will not appear. Once a font has been selected, the present contone value associated with the current output pixel will select a corresponding halftone reference plane therein which, in turn, will be sampled based upon the current low order pixel_x and pixel_y addresses to yield a screened output bit. Now, once block 2160 has fully executed to produce a screened output bit for the currently addressed pixel in the output block, execution then proceeds to block 2170 which writes the value into the bit location in the output block, specifically within FIFO 857 (see FIG. 8). Once block 2170 has executed, then, as shown in FIG. 21, execution exits from routine 1970.

FIG. 22 depicts a detailed flowchart of Process Pixel Routine 1970 shown in FIG. 21. The individual steps that form blocks 2110-2170 in FIG. 21 are shown in FIG. 22.

Specifically, as shown, block 2110 establishes two masks, a noise_bit_mask for accessing the noise data array and a font_bit_mask for accessing the halftone reference data arrays, both from RAM 717 (see FIGS. 7 and 8). These masks define the proper bits within the pixel_x and pixel_y addresses for use in addressing each of these arrays. Within block 2115, the current values of pixel_k, pixel_l, pixel_u and pixel_v are each right shifted by an appropriate number of bit positions in order to obtain corresponding integer addresses; namely, int_k, int_l, int_u and int_v. Thereafter, block 2120 determines the value of the one-bit clipping variable, VALID, by logically combining the integer pixel addresses int_k and int_l with the mask "0×0001", where "0×" defines hex notation. Thereafter, blocks 2125-2135, depending upon whether the current sampled pixel in the contone image overlaps an edge in the contone image or not, respectively set the contone value associated with the current output bit in the output buffer either to a value associate with the color white or to the sampled contone value. If the contone-mode is in use, then blocks 2140 and 2145 return the sampled contone value with execution then exiting from routine 1970. Alternatively, if the contone mode is not in use and hence halftoning is to be performed, then blocks 2150-2170, based upon the status of the clipping variable, VALID, set the current output bit to either zero if variable VALID is false (i.e. zero) or to the screened output bit if variable VALID is true (i.e. one). The process halftone routine determines the value of the halftoned data bit for the current output bit, as described above, using the current values of parameters contone, pixle_x, pixel_y, noise_bit_mask and font_bit_mask. The value of noise_bit_mask, determined through use of high order bits in variables pixel_x and pixel_y, pseudo-randomly select a particular halftone reference stack (font) to sample with the value of the variable contone selecting a particular halftone plane in this stack and the low order bits in pixel_x and pixel_y, as specified by the value of the font_bit_mask, determining the particular sampling location in this plane. The stored single-bit value situated at this sampling location in this plane is the screened output data. This bit, whether it is zero or the screened output data, is then written by block 2170 into the next output location within FIFO 857 (see FIG. 8). Thereafter, as shown in FIG. 22, execution exits from routine 1970.

E. Dedicated Hardware Embodiment of Tile and Pixel Processor (TPP) 740

Figure 23B:
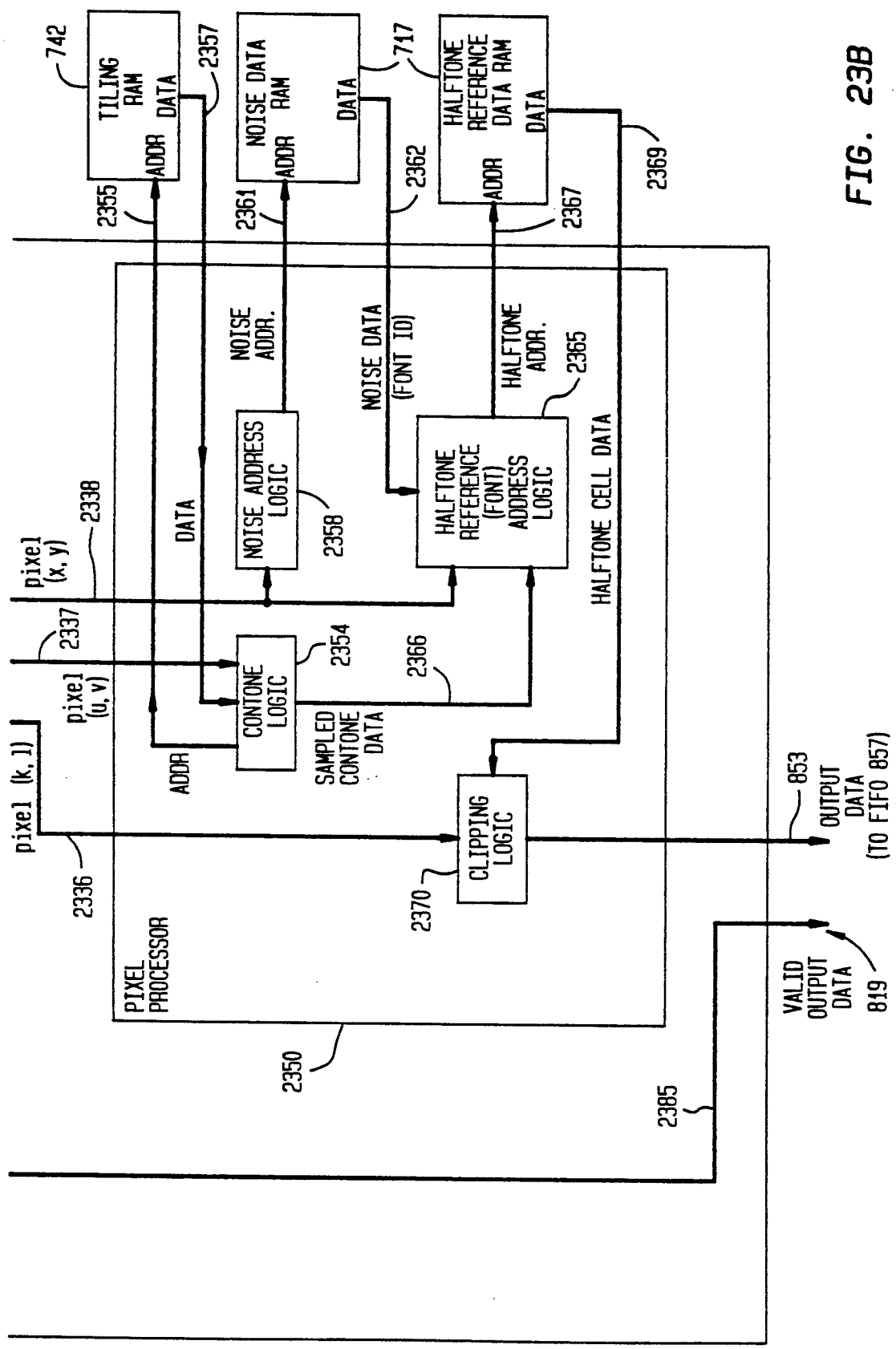

A high level block diagram of an embodiment of Tile and Pixel Processor (TPP) 740 shown in FIGS. 7 and 8 is collectively depicted in FIGS. 23A and 23B, for which the correct alignment of the drawing sheets therefor is shown in FIG. 23.

As shown, TPP 740 is formed of tile registers 2310, tile processor 2320, pixel processor 2350 and control logic 2380. The tile and pixel processors collectively implement nested loops for processing each contone tile in the image and each pixel with each output block that is associated with each tile. In effect, tile processor 2320 implements Process Tile Routine 1770, as discussed in detail above in conjunction with FIGS. 19 and 20; while pixel processor 2350 implements Process Pixel Routine 1970, as discussed in detail above in conjunction with FIGS. 21 and 22. The TPP is implemented preferably using a gate array, an ASIC or other readily customizable large scale integrated circuit device.

Control logic 2380, which is formed of simple combinatorial logic and/or a finite state machine—the specific implementation of which would be readily apparent to those skilled in the art, controls the overall operation of TPP 740. In response to a pulse on "Start Processing" lead 817 and provided by microcomputer 713 (see FIG. 8), control logic 2380, shown in FIGS. 23A and 23B, suitably instructs tile processor 2320, by application of a pulse to "Do Next" lead 2384, to load, coincident with the present clock pulse, its registers with the values then appearing on leads 815, and then, coincident with the next clock pulse, commence processing a current tile in the contone image. At the same time, control logic 2380 places a low level on "Tile Done" lead 2382, located within status information leads 819, to suitably inform the microcomputer that tile processing is actively occurring. Once this processing is complete, tile processor 2320 applies a pulse on "Tile Done" lead 2386 to suitably inform control logic 2380. This control logic then applies a high level to "Tile Done" lead 2382 to suitably inform microcomputer 713 (see FIG. 8) that this contone tile has been completely processed.

During the initialization of TPP 740 and in response to a "Start Processing" pulse appearing on lead 817, tile registers 2310, shown in FIGS. 23A and 23B, are loaded in parallel by microcomputer 713, via leads 815 (see FIG. 8), with tile information, i.e. parameter values, that specify the current tile to be processed and the appropriate incremental pixel values. These parameters include the block addresses (block_k, block_l, block_u, block_v, block_x and block_y) and the pixel increments, in both the fast and slow scan directions ($\Delta$pixel_k_fast, $\Delta$pixel_l_fast, $\Delta$pixel_u_fast, $\Delta$pixel_v_fast, $\Delta$pixel_x_fast, $\Delta$pixel_y_fast; and $\Delta$pixel_k_slow, $\Delta$pixel_l_slow, $\Delta$pixel_u_slow, $\Delta$pixel_v_slow, $\Delta$pixel_x_slow and $\Delta$pixel_y_slow). As shown in FIGS. 23A and 23B, these block addresses and tile increments are routed by tile registers 2310, via leads 2312, 2314 and 2316 and under control of control logic 2380, to appropriate adders or multiplexers located within tile processor 2320.

Tile processor 2320 contains adders 2322, adders 2325, and multiplexers 2328 and 2330, all of which are replicated six times—once for each of the different pixel parameters and connected as shown. The tile processor also contains pixel registers 2333 which contain six separate registers, one for each of the six pixel parameters (pixel_k, pixel_l, pixel_u, pixel_v, pixel_x and pixel_y), and control logic 2340. The pixel registers hold the values of the six pixel parameters in order to generate an output value for each pixel in the current block in the output buffer. Control logic 2340 controls the overall operation of tile processor 2320 and specifically, in accordance with flow chart 2600 shown in FIG. 26 and discussed in detail below, the state of each of the registers, adders and multiplexers that form the pixel processor.

To simplify the discussion of tile processor 2320, only one of the six identical sets of adders, multiplexers and pixel registers, illustratively that for the pixel_k parameter, will now be specifically discussed. In this regard, under the control of control logic 2340 and during initialization of the tile processor, input $I_1$ of multiplexer 2330 receives, over leads 2316, the starting address of block_k from tile registers 2310. For the first pixel in the first row of the output block, control logic 2340 applies a suitable level, as a select signal, over lead 2344 to multiplexer 2330 to route this starting address to the input of the pixel_k register within registers 2333. Thereafter, control logic 2340 applies a suitable load signal to lead 2345 to cause this specific register to load in this starting address as the pixel_k parameter value and apply it to leads 2335. By virtue of a connection between leads 2335 and 2326, this value is also fed back to an input of adders 2322 and 2325. The $\Delta$pixel_k_fast and $\Delta$pixel_k_slow increments are applied to another input of adders 2322 and 2325, respectively. The outputs generated by adders 2322 and 2325 are routed, via leads 2324 and 2327 to corresponding inputs of multiplexer 2328. Inasmuch as the contents of the pixel_k register are fed back, via leads 2326, to corresponding inputs of adders 2322 and 2325, these adders repetitively add the $\Delta$pixel_k_fast and $\Delta$pixel_k_slow increments to the prior pixel_k parameter value in order to point to successive pixels in each row and to the first pixel in successive rows. In order to increment the pixel_k parameter value to point to the next successive pixel in the current row in the output buffer, control logic 2340 applies suitable levels, as select (S) signals, to leads 2342 and 2344, to route the output of adder 2325 through multiplexers 2328 and 2330, to the pixel_k register within pixel registers 2333. Thereafter, the control logic applies a suitable level, on leads 2345, to load the resulting accumulated value produced by adder 2325 into the pixel_k register within pixel registers 2333. In particular, adder 2325 adds the fast scan pixel_k increment, $\Delta$pixel_k_fast, to the prior pixel_k parameter value with the resulting value, under the control of logic 2340, being loaded into the pixel_k register to point to the next successive output pixel location in the current row, and so on. When the end of a row has been reached, adder 2325 overflows to point to the first pixel location in that row and also generates a pulse on its carry out ($C_O$) output which, through lead 2347, is applied to control logic 2340. This resulting pixel address is routed through multiplexers 2328 and 2330 to and loaded within the pixel_k register within registers 2333. In addition, to modify the resulting pixel_k parameter value to point to the first pixel in the next successive row, control logic 2340 applies suitable levels, as select signals via leads 2342 and 2344, to multiplexers 2328 and 2330 to add, via adder 2322, the Δpixel_k_s-low increment to the current pixel address in order to generate an address that points to the first pixel in the next successive row. The resulting address is routed through multiplexer 2330 and applied to the input of the pixel_k register within registers 2333. Control logic 2340 then applies a suitable pulse, over leads 2345, to load this address value into the pixel_k register, and so on to generate pixel_k parameter values for successive pixels on that row and for all subsequent rows. After the last row of output pixel addresses has been generated, adder 2322 overflows and also generates a pulse on its carry out ($C_O$) output which, through lead 2323, is applied to control logic 2340. Consequently, control logic 2340 generates a level change on lead 2386 to signify to control logic 2380 that the current block has been fully processed. The other five pixel parameter values are similarly incremented for each successive pixel in the current output block using the corresponding initial block values and fast and slow scan increments.

In order to generate proper output data for each pixel in the contone image, the current values of the six pixel parameters (pixel_k, pixel_l, pixel_u, pixel_v, pixel_x and pixel_y) are passed, via leads 2336, 2337 and 2338, to pixel processor 2350. This processor contains contone logic 2354, noise address logic 2358, halftone reference (font) address logic 2365 and clipping logic 2370.

In operation, the current values of pixel parameters pixel_u and pixel_v specify the current sampling location in the contone reference plane. Contone logic 2354 determines whether this current sampling location overlaps the edge of the contone image. If such an overlap occurs, then this logic provides a pre-defined contone value for the color white on leads 2366. Alternatively, if this current sampling location lies within the contone image, then contone logic 2354 generates a corresponding memory address, based upon the pixel_u and pixel_v parameter values, to tiling RAM 742. This address is applied, via leads 2355 to the tiling RAM which, in turn, reads the contone value stored at an addressed memory location and provides the resulting value on data leads 2357. Contone logic 2354 then applies this value to leads 2366. Simultaneous with the operation of contone logic 2354, noise address logic 2358, based upon eight high order address bits contained with the pixel_x and pixel_y addresses appearing on leads 2338, combines these addresses to form a sixteen-bit memory address to noise data RAM 717. The two eight-bit high order addresses are merely abutted together to form the sixteen bit address field. This address field is then applied, over leads 2361, to the noise data RAM. The noise data array stored therein is typically a seamless array of 256-by-256 pre-defined four-bit pseudo-random values, each of which selects a corresponding one of sixteen halftone reference (font) stacks. These stacks, each containing a dot profile represented by 256 individual 64-by-64 halftone reference planes, are stored within halftone reference data RAM 717. The resulting noise data, specifically a FONT ID value, read from noise data RAM 717 is applied through leads 2362 to halftone reference address logic 2365. Logic 2365 forms a memory address into halftone reference data RAM 717 using the FONT ID value as high order bits followed by the low order pixel_x and pixel_y address bits. The address is supplied, via leads 2367, to halftone reference data RAM 717 with the resulting addressed single-bit value read from the memory being applied over lead 2369 to clipping logic 2370. Clipping logic 2370 determines, based upon the current values of the pixel_k and pixel_l parameters appearing on leads 2336, whether the output pixel, for which halftoned data is appearing on lead 2369, for the present output block lies within an output tile or not. In the event that this pixel lies within the corresponding output tile, then clipping logic 2370 merely routes the value of the single bit appearing on lead 2369 as output data to output lead 853 for storage into FIFO 857. Alternatively, if this pixel lies outside the corresponding output tile, then the clipping logic merely applies a zero value as output data to lead 853. After the appropriate data value is applied to lead 853, control logic 2380 applies a level change, via lead 2385, to "Valid Output Data" lead 819 to signify that the data then appearing on output lead 853 is valid. This level change is used, in a well known manner, to control the timing at which the output data is written into the FIFO.

FIG. 24 depicts a block diagram of replicated circuit portion 2410 situated within Tile Processor 2320 contained within TPP 740 shown in FIGS. 23A and 23B. As discussed above, this portion is replicated six times, once for each of the pixel parameters.

Circuit portion 2410 contains adders 2412 and 2416, multiplexer 2430 and pixel register 2450. To simplify the circuitry, portion 2410 combines multiplexers 2328 and 2330 shown in FIGS. 23A and 23B into common multiplexer 2430 shown in FIG. 24. Registers 2404, 2406 and 2408, which are specifically located within tile registers 2310, shown in FIGS. 23A and 23B, hold the initial and the slow and fast incremental coordinate values, respectively, for a common pixel parameter. These registers are connected, as shown in FIG. 24, through leads 2405, 2407 and 2409 to corresponding "A" inputs of multiplexer 2430, and adders 2412 and 2416. The output of pixel register 2450, appearing on leads 2455, is fed back to the "D" input to multiplexer 2430 and, via leads 2417, to the "B" inputs of adders 2412 and 2416. The carry out ($C_O$) outputs produced by these adders are routed, via leads 2415 and 2421, to control logic 2340 (see FIGS. 23A and 23B). The outputs (O) of adders 2412 and 2416 are routed, as shown in FIG. 24, to the "B" and "C" inputs to multiplexer 2430. The output (Z) of this multiplexer is applied, via leads 2435, to the input of pixel register 2450.

Truth table 2500, shown in FIG. 25, specifies the operation of multiplexer 2430, with "$S_0$" and "$S_1$" being the select signals applied to this multiplexer.

State flowchart 2600 shown in FIG. 26 details the sequential operations that occur within replicated circuit portion 2410 shown in FIG. 24. In particular, the first state that the circuit assumes, i.e. STATE1, is a wait or standby state during which no active operations occur. The circuit remains in this state, as indicated by continual looping through operations 2610 and 2615 and NO path 2620, until a "Start Processing" pulse appears on lead 817 (see FIGS. 23A and 23B). In response to this pulse, as shown in FIG. 26, the state of circuit portion 2410 changes, as indicated by YES path 2625 emanating from decision operation 2615, to the next state, i.e. STATE2. During STATE2, all the initial and incremental values are loaded into the appropriate registers. Once this occurs, i.e. on the next clock pulse, the next state" i.e. STATE3, is entered. During this state, adder 2416 in conjunction with multiplexer 2430 and pixel register 2450, all shown in FIG. 24, continually and successively increments the pixel parameter value stored in register 2450 by its fast scan increment stored in register 2408 to yield a sequence of successively increasing values for this parameter. This process of successive addition occurs for STATE3 through a loop defined by NO path 2645 emanating from decision operation 2640 until such time as adder 2416 generates a pulse (fast carry) on its carry out output. This pulse, when it occurs, indicates that the pixel parameter value has been fully incremented in its fast scan direction. Once this incrementation has been completed, decision operation 2640 changes the state of circuit portion 2410, via YES path 2650, to the next state, i.e. STATE4. During this state, adder 2412, in conjunction with multiplexer 2430 and pixel register 2450 all shown in FIG. 24, increments the value of the pixel parameter stored in register 2450 once by its slow scan increment stored in register 2406. Thereafter, decision operation 2660, shown in FIG. 26, determines, based upon whether adder 2412 has generated a carry out (slow carry) pulse, if the pixel parameter has been fully incremented in its slow scan direction. If this parameter has not been fully incremented, i.e. another corresponding row remains to be processed, then decision operation 2660 changes the state of circuit portion 2410, via NO path 2665, back to STATE3 to commence processing this row. Alternatively, if adder 2412 has generated a carry out (slow carry) pulse, then decision operation 2660 changes the state of circuit portion 2410, via YES path 2670, to operation 2675 which places the circuit portion into a done state, i.e. STATE5. This is merely a temporary state after which control logic 2340 (see FIGS. 23A and 23B) will place circuit portion 2410 back into STATE1, via operation 2610.

FIG. 27 depicts a block diagram of Contone Logic 2354 contained within Pixel Processor 2350 shown in FIGS. 23A and 23B. As shown, Contone Logic 2354 contains address generator 2730, comparators 2740 and 2750, AND gate 2760 and multiplexer 2770. Address generator 2730 is connected to the output of pixel_u and pixel_v registers 2710 and 2720—both of which are contained within pixel registers 2333 shown in FIGS. 23A and 23B—and, using the contents of these registers, generates an appropriate memory address for the present contone sampling location defined by the values of parameters pixel_u and pixel_v. This address is applied, via leads 2355 shown in FIG. 27, to the address input of tiling RAM 742. The contone data value read from this RAM is provided, via leads 2357, to input "A" of multiplexer 2770. The other input, i.e. input "B", to this multiplexer is connected, via leads 2768, to the pre-defined contone value for the color white. Based upon whether the present sampled pixel location lies within the contone image, multiplexer 2770 selects either the sampled contone value read from the tiling RAM or the pre-defined white value as sampled contone data 2780. Specifically, the values of parameters pixel_u and pixel_v contained within registers 2710 and 2720 are also applied to corresponding inputs of comparators 2740 and 2750. Values representing the width (W) and height (H) of the contone image are applied, via leads 2712 and 2714, to another set of corresponding inputs to these comparators. Comparators 2740 and 2750 produce a high level on respective output leads 2745 and 2755 in the event that the address-of the present pixel sampling location lies vertically and horizontally within the image. In order to ensure that this sampling location lies within the image, the output levels on leads 2745 and 2755 are logically combined through AND gate 2760 to provide a select signal that is applied, via lead 2765, to the select (S$_O$) input to multiplexer 2770. Hence, if the present contone sampling location lies within the contone image, multiplexer 2770 directs the corresponding sampled contone value read from tiling RAM 742 to sampled contone data output leads 2776 as sampled contone data 2780; otherwise, the multiplexer applies the pre-defined white value is applied to these output leads as data 2780.

Truth table 2800, shown in FIG. 28, specifies the operation of multiplexer 2770.

Figure 29:
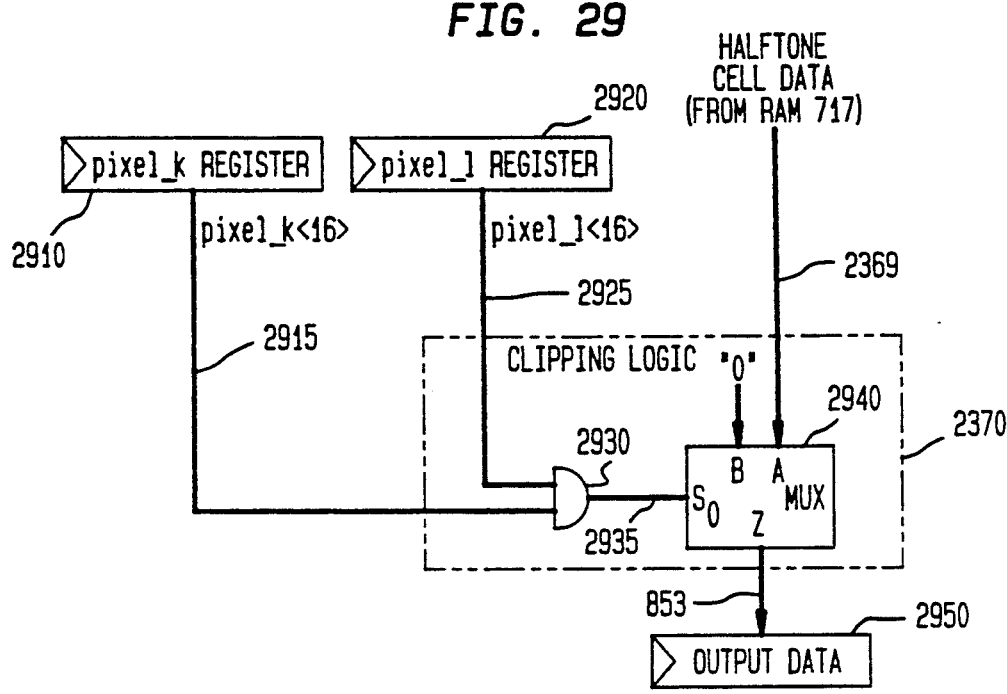
FIG. 29 depicts a block diagram of Clipping Logic 2370 contained within Pixel Processor 2350 shown in FIGS. 23A and 23B.

FIG. 29 depicts a block diagram of Clipping Logic 2370 contained within Pixel Processor 2350 shown in FIGS. 23A and 23B. Specifically, as shown in FIG. 29, this logic consists of AND gate 2930 that is connected to the sixteenth bit of both the pixel_k and pixel_l addresses contained within pixel_k register 2910 and pixel_l register 2920, both of these registers residing within pixel registers 2333 (see FIGS. 23A and 23B). The AND combination of these bits, appearing on lead 2935 shown in FIG. 29, is connected to the select (S$_O$) input to multiplexer 2940. The single-bit halftone cell data read from halftone reference RAM 717 is applied, via leads 2369, to the "A" input to multiplexer 2940. A zero value is applied to the other, i.e. "B" input, to this multiplexer. The output (Z) of these multiplexer is connected to output lead 853 and provides screened output data 2950. As such, if the clipping addresses indicate that the current pixel lies within a corresponding output tile,, then the signal appearing on lead 2935 is high thereby causing multiplexer 2940 to route the halftone cell output data appearing on lead 2369 to output lead 853 as the output data; otherwise multiplexer 2940 routes the zero value as output data thereto.

Figure 30:
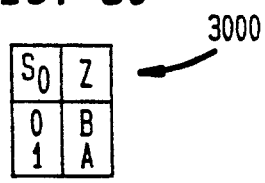
FIG. 30 depicts truth table 3000 for multiplexer contained within Clipping Logic 2370 shown in FIG. 29.

Truth table 3000, shown in FIG. 30, specifies the operation of Multiplexer 2940.

Figure 31:
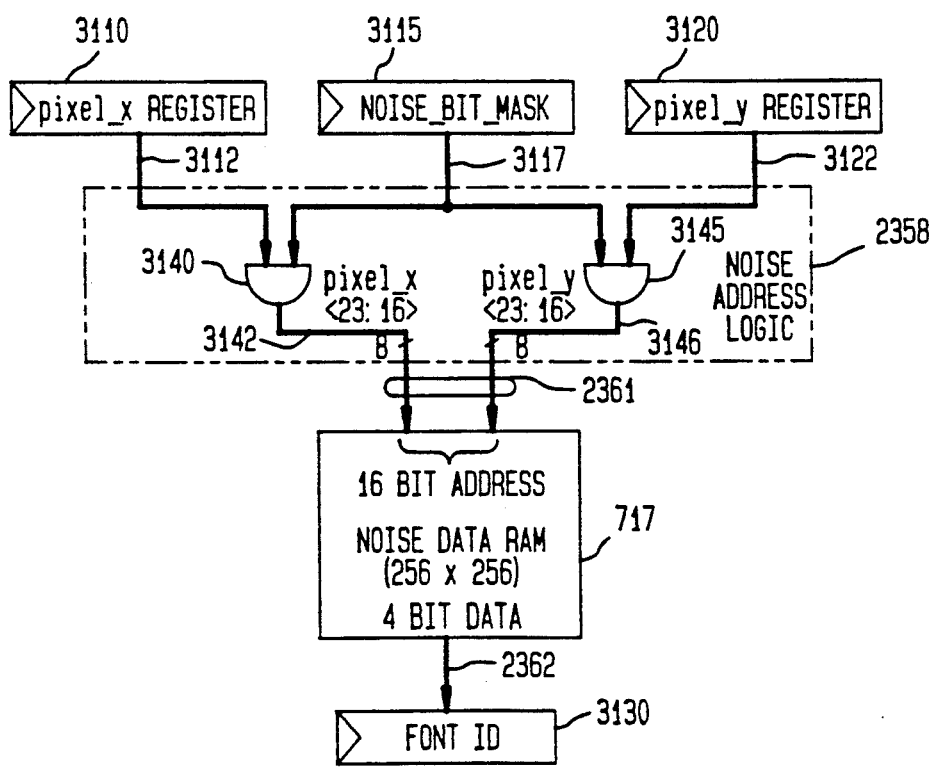
FIG. 31 depicts a block diagram of Noise Address Logic 2358 contained within Pixel Processor 2350 shown in FIGS. 23A and 23B.

FIG. 31 depicts a block diagram of Noise Address Logic 2358 contained within Pixel Processor 2350 shown in FIGS. 23A and 23B. This logic forms a memory address to 256-by-256 location noise data RAM 717 by abutting eight address bits, bits <23:16>, from the pixel_x address contained in pixle_x register 3110, as shown in FIG. 31, to eight corresponding address bits, bits <23:16>, contained in pixel_y register 3120. Specifically, registers 3110 and 3120 are situated within pixel registers 2333 in tile processor 2320 (see FIGS. 23A and 23B). The thirty-two bit addresses contained within the pixel_x and pixel_y registers are routed, as shown in FIG. 31, over respective leads 3112 and 3122 to one input of AND gates 3140 and 3145, these AND gates being contained within Noise Address Logic 2358. Noise_Bit_Mask 3115 is applied over leads 3117 to the other input of each of these AND gates. By logically combining the value of the noise_bit_mask with each of the pixle_x and pixel_y addresses, the resulting addresses appearing on leads 3142 and 3146 are eight bits <23:16> of each of these addresses. These bits are merely abutted together to form a sixteen-bit address. The resulting sixteen bit address, appearing over address leads 2361, selects one of the four-bit memory locations situated in noise data RAM 717. The resulting four bit value read from this location is FONT ID 3130 which, in turn, is applied, via leads 2362, to halftone reference address logic 2365 (see FIGS. 23A and 23B).

Lastly, FIG. 32 depicts a block diagram of Halftone Reference Address Logic 2365 contained within Pixel Processor 2350 shown in FIGS. 23A and 23B. This logic forms a twenty-four bit memory address to halftone reference cell data RAM 717 and contains, as shown in FIG. 32, AND gates 3225 and 3230. As described above, the FONT_ID value selects a particular one Of sixteen halftone stacks (fonts). The sampled contone data value selects a particular one of 256 halftone reference planes that forms this stack, with six bits of each of the pixel_x and pixel_y registers collectively selecting a current sampling location within the 64-by-64 bit selected halftone reference plane.

Specifically, the twenty-four bit memory address consists of four-bit FONT ID address appearing on leads 2362, followed by eight-bit sampled contone value 2780 appearing on leads 2366, and followed by a twelve-bit address based on six predefined low order corresponding integer address bits <15:10> contained in each of pixel_x and pixel_y address registers 3110 and 3120. These low order address bits are formed by logically combining, through AND gates 3225 and 3230, the full current values of the pixle_x and pixel_y addresses held in registers 3110 and 3120 with the value of Font_Bit_Mask 3215. In this regard, the contents of pixel_x and pixel_y registers 3110 and 3120 are applied, via respective leads 3210 and 3220, to one input of AND gates 3225 and 3230. The value of Font_Bit_Mask 3215 is applied, via leads 3218, to the other input of each of these gates. By logically combining the value of the font_bit_mask with each of the pixel_x and pixel_y addresses, the resulting addresses appearing on leads 3228 and 3233 are six bits <15:10> of each of these addresses which, in turn, are applied, via address leads 2367, as part of the twenty-four bit memory address to Halftone Reference Data RAM 717. The data stored at the addressed location within this RAM is supplied as single-bit halftone cell data which, in turn, is routed, Via lead 2369, as input data to clipping logic 2370 (see FIGS. 23A, 23B and 29), as described in detail above.

Clearly, by now, those skilled in the art will readily appreciate that the inventive two-chip architecture can be easily expanded to increase processing throughput through the use of parallel processing implemented by using multiple tile and Pixel processors (TPPs) 740 in conjunction with a common controlling microcomputer. By upwardly scaling the number of TPPs in an implementation, the degree of parallelism increases which, in turn, substantially increases the throughput of rotated, scaled and/or halftoned images.

Specifically, instead of connecting just one TPP to microcomputer 713, as shown in FIG. 8, several TPPs can be connected through, for example, a bus to and controlled by the microcomputer. While the image parameters would be the same for all the TPPS; each TPP would be appropriately instructed by the microcomputer to process a particular non-overlapping portion of the image, such as a horizontal strip thereof, with a separate starting point. Once each TPP was initialized, the microcomputer would instruct that TPP to independently process that image portion. While one TPP is undertaking its processing, the microcomputer can initialize the next successive TPP and thereafter instruct it to commence its processing, and so on for the other TPPS. As such, all the TPPs can be processing their corresponding image portions in a slightly time staggered but essentially parallel fashion. Each TPP would have its own tiling RAM which is loaded by the microcomputer with the specific image strip (or other image portion) to be used by that TPP. In addition, each TPP can be configured to write its output into a separate buffer, such as a FIFO, the contents of which are then block transferred at an appropriate time, into a common output buffer. While each TPP is processing its image portion the microcomputer would calculate the location of the corresponding portion of the output image into which output data which is currently supplied by that TPP is to be written. Once that TPP has concluded its processing, the microcomputer would initiate a block transfer of that output data into that image portion. In addition, the TPPs could be configured to process separate tiles rather than just strips. Furthermore, the TPPs could operate with a common tiling RAM wherein the TPPs process successive contone values and write data to corresponding output locations in the output image on a time staggered and output interleaved basis. For example, if four TPPs were to be used, each TPP would write every fourth output location: the first TPP would write output data for the 1st, 5th, 9th, . . . output locations, the second TPP would write output data for the 2nd, 6th, 10th . . . output locations and so on for the other TPPs throughout the output image. Output data would be written by the first TPP, followed Successively, in turn, by the second, third and fourth TPPs in repeating round robin fashion. Accordingly, by replicating the TPPs with control through a common controlling microcomputer, processing throughput can be substantially increased over use of just a single TPP alone.

Furthermore, although the halftone reference data has been discussed in terms Of multiple stacks of multiplane single bit halftone data, each stack could be replaced by a single matrix of eight-bit threshold values rather than single-bit halftone dot values. In this case, halftone reference address logic 2365 (see FIGS. 23A, 23B and 32) would be readily modified to include a comparator which would compare each sampled contone value against a corresponding sampled threshold value in a threshold matrix. A single bit result of that comparison, i.e. a high level bit if the contone value equalled or exceeded its corresponding threshold value or a zero bit otherwise, would form the single bit halftoned output data. The noise data would be used, in a similar fashion to that described above, to pseudo-randomly select the particular threshold matrix, such as one of sixteen, to use at any one time. The current pixel_x and pixel_y parameter values would define the location in the threshold Matrix that is to be read.

In addition, the inventive screener could utilize contone interpolation if the contone sampling frequency were viewed as being too coarse. In this case, within, for example, block 2135 (see FIGS. 21 and 22), parameters pixel_u and pixel_v would select successive contone values which would be collectively interpolated, based upon the fractional values of these parameters, to yield an intermediate contone value which, in turn, would be routed as output data or, if halftoning is to be used, applied as input to the halftoning process to yield an halftoned output data.

Furthermore, although the invention has been described as being used with a writing engine that produces bi-level (binary) output, a writing engine that produces a multi-bit output can also be used. In this instance, multiple screeners, that provide slightly different dot fonts, would be operated in parallel using the same incoming contone values. One dot font would generate halftone dots that are slightly larger than usual; the other dot font would generate halftone dots that are slightly smaller than usual. Each screener would run independently of the other. If both screeners generate the same signal, the writing engine would generate a writing spot or not in the usual fashion. However, if the screeners produce differing output signals, then the writing engine would generate a writing spot that has an intermediate density, i.e. at a predefined level between completely darkened and white. Consequently, the resulting three state writing engine would write halftone dots that have softened edges, i.e. with suppressed "jaggedness". Inasmuch as these dots contain significantly reduced high frequency content over non-softened dots, so-called auto-moire patterns, which would otherwise result from beating caused between the spatial distribution of ideal halftone dot patterns and the writing pattern used by the writing engine, would be substantially suppressed. Writing engines with an increased number of levels can also be used to provide even greater degrees of dot softening and auto-moire suppression. Unfortunately, use of a multi-level writing engine with multiple bi-level screeners increases, inter alia, system complexity and cost. As such, in implementing this approach, a design tradeoff will exist between the amount of auto-moire that can be tolerated against the acceptable cost and complexity of the resulting image processing system.

Although various embodiments of the present invention have been shown and described in detail herein, many other embodiments that incorporate the teachings of the invention may be easily constructed by those skilled in the art.

INDUSTRIAL APPLICABILITY AND ADVANTAGES

The present invention is useful in digital image processing systems and specifically as part of a processing system that implements a page description language. The invention advantageously allows image rotation, scaling and digital halftone screening to be performed through an implementation that is quite accurate, inexpensive, fast and very flexible. As such, the invention will find ready application to impart accurate and sophisticated image processing capabilities to output writers, including but not limited to relatively low cost laser printers.

We claim:

1. A method for producing a scaled, rotated and halftoned output image from an input continuous tone (contone) image, wherein said output image depicts said input image scaled by a pre-defined scale factor and rotated through a pre-defined angle of rotation, said method comprising the steps of:
   (A) defining pixel sampling increments, said pixel sampling increments specifying incremental movement between successive sampling locations in one of a plurality of contone tiles in said contone image, said incremental movement corresponding to movement between two adjacent pixel locations in a corresponding block of said output image, said output image being formed of a plurality of spatially overlapping blocks wherein each of said blocks spatially corresponds to and stores output data for a different one of said contone tiles; said pixel sampling increments being a function of the scale factor, the angle of rotation and the screen angle; a said contone tile being sized as a function of the scale factor and the angle of rotation such that the contone image is broken into an array of non-overlapping ones of said contone tiles, each of said contone tiles containing a portion of said contone image, and wherein the defining step comprises the step of sizing the corresponding block as a function of a size of the tile and the angle of rotation with an extent of the overlap between two adjacent ones of said blocks being governed by the angle of rotation;
   (B) in response to corresponding ones of said pixel sampling increments:
   (1) generating addresses that represent incremental movement through the corresponding block to produce a sequence of addressed output pixel locations;
   (2) sampling through said contone image to yield a sampled contone value associated with each of said addressed output pixel locations so as to produce a plurality of sampled contone values; and
   (3) producing, in response to each of said sampled contone values and a pre-defined pattern, a corresponding halftone output value for each addressed output pixel location in said sequence to yield a plurality of halftone output values; and
   (C) writing each of the halftone output values in the corresponding addressed output pixel location in the corresponding block in the event said each halftone output value is associated with a pixel location situated within the one contone tile.

2. The method in claim 1 wherein the defining step further comprises the step of: determining tile increments, wherein said tile increments specify incremental movement between corresponding locations of successive contone tiles in said contone image; said method further comprising the steps of:
in said defining step:
   (A1) establishing starting locations of a current one of the blocks in the output image that is to be written with output data and of a current one of the tiles in the contone image, corresponding to said current block, that is to be processed; and
   (D) repeating, in response to said tile increments, steps (A1), (B) and (C) for each successive output block in the output image as the current block and for each successive tile in said contone image as the current tile until the output image has been completely formed of the output data resulting from processing all of the tiles in the contone image.

3. The method in claim 2 wherein said defining step comprises the step of calculating offset values between positions of edges of one of said output blocks and corresponding corners of a corresponding one of said contone tiles; and said starting locations establishing step comprises the step of modifying the starting location of the current tile by the offset values.

4. The method in claim 3 wherein said address generating and contone values sampling and halftone output value producing steps operate along a fast scan direction to generate a row of said halftone output values for the current block and along a slow scan direction to generate the sequence of the halftone output values for the current block.

5. The method in claim 4 wherein said contone sampling and said halftone output value producing steps occur independently of each other and in first and second sampling directions, respectively.

6. The method in claim 3 wherein said pixel sampling increments also specify incremental movement between successive sampling locations in the pattern, and wherein said halftone output value producing step comprises the step of sampling through the pattern, in response to corresponding ones of said pixel sampling increments and to each of said sampled contone values, to yield the corresponding halftone output value.

7. The method in claim 3 wherein said halftone output value producing step comprises the steps of:
selecting, in response to each one of said sampled contone values, a corresponding one of a plurality of pre-defined halftone reference planes that collectively form a halftone reference stack, each of said planes storing a different depiction of a halftone dot; and
sampling said selected halftone reference plane at a pixel location defined by appropriate ones of said pixel sampling increments to yield a halftone output value.

8. The method in claim 6 wherein said halftone output value producing step comprises the steps of:
sampling, in response to appropriate ones of said pixel sampling increments, a pre-defined threshold matrix at a pixel location to yield a sampled threshold value, said threshold matrix containing a pre-defined array of threshold values; and
comparing said sampled threshold value against a corresponding one of said sampled contone values and, in response thereto, producing a corresponding halftone output value.

9. The method in claim 6 wherein said address generating, contone values sampling and halftone output value producing steps substantially occur in unison to generate an addressed output pixel location, a corresponding sampled contone value and a corresponding halftone output value.

10. The method in claim 4 wherein said writing step comprises the step of:
storing each of the halftone output values into a buffer in the event said each halftone output value is associated with a pixel location situated within the current contone tile; and
transferring, after the current tile has been processed, the stored halftone output values from said buffer to a block in a page buffer defined by the location of said current block in said output image.

11. The method of claim 10 wherein said writing step further comprises the steps of:
incrementing first and second clipping variables, by corresponding pre-determined first and second non-integer clipping increments, in conjunction with incrementation of the pixel sampling addresses associated with the contone image, wherein a range for each of the first and second clipping variables is defined and scaled such that a unit distance therein equals a corresponding distance along an edge of the current contone tile and an integer value of each of said variables equals one within the current tile and either zero or two outside the current tile, each of said first and second clipping increments being a function of the tile size, the block size and the angle of rotation;
storing said each halftone output value in the corresponding addressed output pixel location in an output buffer in the event that the integer value of both of the clipping variables equals one for the corresponding pixel location situated within the current contone tile; and
storing a zero in the corresponding addressed output pixel locations in the event that the integer value of either one of said clipping variables does not equal one whereby a zero value is stored in each of those addressed output pixel locations in the current block that are associated with pixel locations situated outside the current contone tile.

12. Apparatus for producing a scaled, rotated and halftoned output image from an input continuous tone (contone) image, wherein said output image depicts said input image scaled by a pre-defined scale factor and rotated through a pre-defined angle of rotation, said apparatus comprising:
means for defining pixel sampling increments, said pixel sampling increments specifying incremental movement between successive sampling locations in one of a plurality of contone tiles in said contone image, said incremental movement corresponding to movement between two adjacent pixel locations in a corresponding block of said output image, said output image being formed of a plurality of spatially overlapping blocks wherein each of said blocks spatially corresponds to and stores output data for a different one of said contone tiles; said pixel sampling increments being a function of the scale factor, the angle of rotation and the screen angle; said contone tile being sized as a function of the scale factor and the angle of rotation such that the contone image is broken into an array of non-overlapping ones of said contone tiles, each of said contone tiles containing a portion of said contone image, and wherein said defining means comprises means for sizing the corresponding block as a function of a size of the tile and the angle of rotation with an extent of the overlap between two adjacent ones of said blocks being governed by the angle of rotation;
means, responsive to corresponding ones of said pixel sampling increments, for:
(1) generating addresses that represent incremental movement through the corresponding block to produce a sequence of addressed output pixel locations;
(2) sampling through said contone image to yield a sampled contone value associated with each of said addressed output pixel locations so as to produce a plurality of sampled contone values; and
(3) producing, in response to each of said sampled contone values and a pre-defined pattern, a corresponding halftone output value for each addressed output pixel location in said sequence to yield a plurality of halftone output values; and
means for writing each of the halftone output values in the corresponding addressed output pixel location in the corresponding block in the event said each halftone output value is associated with a pixel location situated within the one contone tile.

13. The apparatus in claim 12 wherein said defining means comprises means for determining tile increments, wherein said tile increments specify incremental movement between corresponding locations of successive contone tiles in said contone image; and said apparatus further comprises means for establishing starting locations of a current block in the output image that is to be written with output data and of a current tile, in the contone image and corresponding to said current block, that is to be processed.

14. The apparatus in claim 13 wherein said defining means comprises means for calculating offset values between positions of edges of one of said output blocks and corresponding corners of a corresponding one of said contone tiles; and said starting locations establishing means comprises means for modifying the starting location of the current tile by the offset values.

15. The apparatus in claim 14 wherein said address generating and contone values sampling means and said halftone output value producing means operate along a fast scan direction to generate a row of said halftone output values for the current block and along a slow scan direction to generate the sequence of halftone output values for the current block.

16. The apparatus in claim 14 wherein said pixel sampling increments also specify incremental movement between successive sampling locations in the pattern, and wherein said halftone output value producing means comprises means for sampling through the pattern, in response to corresponding ones of said pixel sampling increments and to each of said sampled contone values, to yield the corresponding halftone output value.

17. The apparatus in claim 14 wherein said halftone value producing means comprises:
means for selecting, in response to each one of said sampled contone values, a corresponding one of a plurality of pre-defined halftone reference planes that collectively form a halftone reference stack, each of said planes storing a different depiction of a halftone dot; and
means for sampling said selected halftone reference plane at a pixel location defined by appropriate ones of said pixel sampling increments to yield a halftone output values.

18. The apparatus in claim 17 wherein said address generating, contone values sampling means and said halftone output value producing means substantially occur in unison to generate an addressed output pixel location, a corresponding sampled contone value and a corresponding halftone output value.

19. The apparatus in claim 17 wherein said halftone value producing means comprises:
means for sampling, in response to appropriate ones of said pixel sampling increments, a pre-defined threshold matrix at a pixel location to yield a sampled threshold value, said threshold matrix containing a pre-defined array of threshold values; and
means for comparing said sampled threshold value against a corresponding one of said sampled contone values and, in response thereto, producing a corresponding halftone output value.

20. The apparatus in claim 15 wherein said contone sampling means and said halftone output value producing means occur independently of each other and in first and second sampling directions, respectively.

21. The apparatus in claim 15 wherein said writing means comprises:
means for storing each of the halftone output values into a buffer in the event said each halftone output value is associated with a pixel location situated within the current contone tile; and
means for transferring, after the current tile has been processed, the stored halftone output values from said buffer to a block in a page buffer defined by the location of said current block in said output image.

22. The apparatus in claim 15 wherein said writing means further comprises:
means for incrementing first and second clipping variables, by corresponding pre-determined first and second non-integer clipping increments, in conjunction with incrementation of the pixel sampling addresses associated with the contone image, wherein a range for each of the first and second clipping variables is defined and scaled such that a unit distance therein equals a corresponding distance along an edge of the current contone tile and an integer value of each of said variables equals one within the current tile and either zero or two outside the current tile, each of said first and second clipping increments being a function of the tile size, the block size and the angle of rotation;
means for storing said each halftone output value in the corresponding addressed output pixel location in an output buffer in the event that the integer value of both of the clipping variables equals one for the corresponding pixel location situated within the current contone tile; and
means for storing a zero in the corresponding addressed output pixel locations in the event that the integer value of either one of said clipping variables does not equal one whereby a zero value is stored in each of those addressed output pixel locations in the current block that are associated with pixel locations situated outside the current contone tile.

* * * * *